US012299686B2

(12) United States Patent
Doraiswamy et al.

(10) Patent No.: US 12,299,686 B2
(45) Date of Patent: May 13, 2025

(54) AUTHENTICATING TRANSACTIONS USING BIOMETRIC AUTHENTICATION

(71) Applicant: Minkasu, Inc., Fremont, CA (US)

(72) Inventors: Naveen Doraiswamy, Fremont, CA (US); Karthikeyan Ramasamy, Coimbatore (IN); Anbarasan P. Gounder, Fremont, CA (US)

(73) Assignee: Minkasu, Inc, Milpitas, CA (US)

( * ) Notice: Subject to any disclaimer, the term of this patent is extended or adjusted under 35 U.S.C. 154(b) by 1048 days.

(21) Appl. No.: 17/180,785

(22) Filed: Feb. 20, 2021

(65) Prior Publication Data

US 2021/0182863 A1 Jun. 17, 2021

Related U.S. Application Data

(63) Continuation-in-part of application No. 17/008,272, filed on Aug. 31, 2020, now Pat. No. 11,887,073, (Continued)

(30) Foreign Application Priority Data

Feb. 21, 2020 (IN) .............................. 202041007533

(51) Int. Cl.
*G06Q 20/40* (2012.01)
*G06Q 20/02* (2012.01)
(Continued)

(52) U.S. Cl.
CPC ....... *G06Q 20/40145* (2013.01); *G06Q 20/02* (2013.01); *G06Q 20/3829* (2013.01);
(Continued)

(58) Field of Classification Search
CPC ............. G06Q 20/40145; G06Q 20/02; G06Q 20/3829; G06Q 20/4012; G06Q 20/0855;
(Continued)

(56) References Cited

U.S. PATENT DOCUMENTS 6,084,968 A * 7/2000 Kennedy ............... G06F 21/602
380/46
7,676,433 B1 3/2010 Ross et al.
(Continued)

FOREIGN PATENT DOCUMENTS

WO 2011146778 A1 11/2011
WO 2013179038 A1 12/2013

*Primary Examiner* — Chenyuh Kuo
*Assistant Examiner* — Yingying Zhou
(74) *Attorney, Agent, or Firm* — PATENT LAW WORKS LLP

(57) ABSTRACT

A system and method for authenticating transactions using biometric authentication is disclosed. The method includes receiving a message for a transaction from one of a user device and a trusted authority server. The message is generated on receiving preconfigured biometric data for the transaction on the user device. The message is verified in order to retrieve a prestored second Personal Identification Number (PIN) fragment associated with a PIN of the user. The second PIN fragment is transmitted to one of the user device and the trusted authority server in order to determine the PIN by using the second PIN fragment and a first PIN fragment received from the user device. In an alternate implementation, the method includes determining an authorized token using one or more token fragments stored on a plurality of entities.

24 Claims, 22 Drawing Sheets

Related U.S. Application Data which is a continuation-in-part of application No. 14/695,011, filed on Apr. 23, 2015, now Pat. No. 10,796,302.

(60) Provisional application No. 61/983,252, filed on Apr. 23, 2014.

(51) Int. Cl.
*G06Q 20/38* (2012.01)
*H04L 9/32* (2006.01)

(52) U.S. Cl.
CPC ....... *G06Q 20/4012* (2013.01); *H04L 9/3213* (2013.01); *H04L 9/3231* (2013.01); *H04L 9/3247* (2013.01); *H04L 2209/56* (2013.01)

(58) Field of Classification Search
CPC ............ G06Q 20/3226; G06Q 20/367; G06Q 20/3827; G06Q 20/401; G06Q 30/0185; G06Q 30/0609; H04L 9/3213; H04L 9/3231; H04L 9/3247; H04L 2209/56; H04L 9/085; H04L 9/0897; H04L 9/321; H04L 9/3226; H04L 9/3239; H04L 9/50; H04L 63/083; H04L 63/0861; H04L 63/123; H04W 12/068; H04W 12/084; H04W 12/106

See application file for complete search history.

(56) References Cited

U.S. PATENT DOCUMENTS

| | | | |
|---|---|---|---|
| 7,920,851 B2 | 4/2011 | Moshir et al. | |
| 8,307,210 B1 | 11/2012 | Duane | |
| 8,555,083 B1 | 10/2013 | Nanda et al. | |
| 8,577,803 B2 | 11/2013 | Chatterjee et al. | |
| 8,880,889 B1 * | 11/2014 | Ward | H04L 9/3247 713/176 |
| 9,483,656 B2 * | 11/2016 | Leggette | G06F 11/1076 |
| 11,423,400 B1 * | 8/2022 | Hutchison | G06Q 40/03 |
| 2002/0198848 A1 | 6/2002 | Michener | |
| 2002/0143634 A1 | 10/2002 | Kumar | |
| 2002/0186838 A1 | 12/2002 | Brandys | |
| 2003/0033537 A1 | 2/2003 | Fujimoto et al. | |
| 2003/0159041 A1 | 2/2003 | Yokota et al. | |
| 2003/0061170 A1 * | 3/2003 | Uzo | G06Q 20/29 705/37 |
| 2003/0074562 A1 | 4/2003 | Hansen et al. | |
| 2003/0101346 A1 | 5/2003 | Barron et al. | |
| 2003/0182566 A1 | 9/2003 | Kohara et al. | |
| 2004/0111379 A1 | 6/2004 | Hicks et al. | |
| 2005/0028064 A1 | 2/2005 | Thomas et al. | |
| 2006/0053285 A1 * | 3/2006 | Kimmel | H04L 9/3226 713/166 |
| 2006/0131385 A1 | 6/2006 | Kim | |
| 2007/0192601 A1 | 8/2007 | Spain et al. | |
| 2007/0245148 A1 | 10/2007 | Buer | |
| 2007/0255943 A1 | 11/2007 | Kern et al. | |
| 2008/0017710 A1 | 1/2008 | Silverbrook et al. | |
| 2009/0048979 A1 | 2/2009 | Al-Herz et al. | |
| 2009/0138727 A1 | 5/2009 | Campello de Souza | |
| 2009/0164796 A1 | 6/2009 | Peirce | |
| 2009/0210701 A1 | 8/2009 | Zhang | |
| 2009/0214037 A1 | 8/2009 | Tuttle | |
| 2010/0034434 A1 | 2/2010 | von Mueller et al. | |
| 2011/0137803 A1 | 6/2011 | Willins | |
| 2011/0161233 A1 | 6/2011 | Tieken | |
| 2011/0246766 A1 * | 10/2011 | Orsini | H04L 67/1097 713/160 |
| 2011/0252243 A1 | 10/2011 | Brouwer et al. | |
| 2011/0302646 A1 | 12/2011 | Ronda et al. | |
| 2012/0166333 A1 | 6/2012 | von Behren et al. | |
| 2013/0054320 A1 | 2/2013 | Dorso et al. | |
| 2013/0124364 A1 | 5/2013 | Mittal | |
| 2013/0212385 A1 | 8/2013 | Schechter | |
| 2013/0226812 A1 | 8/2013 | Androk et al. | |
| 2014/0089196 A1 * | 3/2014 | Paya | G06Q 20/3827 705/44 |
| 2014/0164243 A1 | 6/2014 | Aabye et al. | |
| 2015/0269701 A1 * | 9/2015 | Malhotra | G06Q 40/02 705/325 |
| 2015/0278814 A1 | 10/2015 | Jaffe | |
| 2015/0295921 A1 | 10/2015 | Cao | |
| 2016/0261408 A1 | 9/2016 | Peddada et al. | |
| 2019/0303910 A1 * | 10/2019 | Asbe | G06Q 20/10 |
| 2020/0127821 A1 * | 4/2020 | Dolev | H04L 9/0861 |
| 2021/0182272 A1 * | 6/2021 | Shpurov | H04L 9/30 |

* cited by examiner

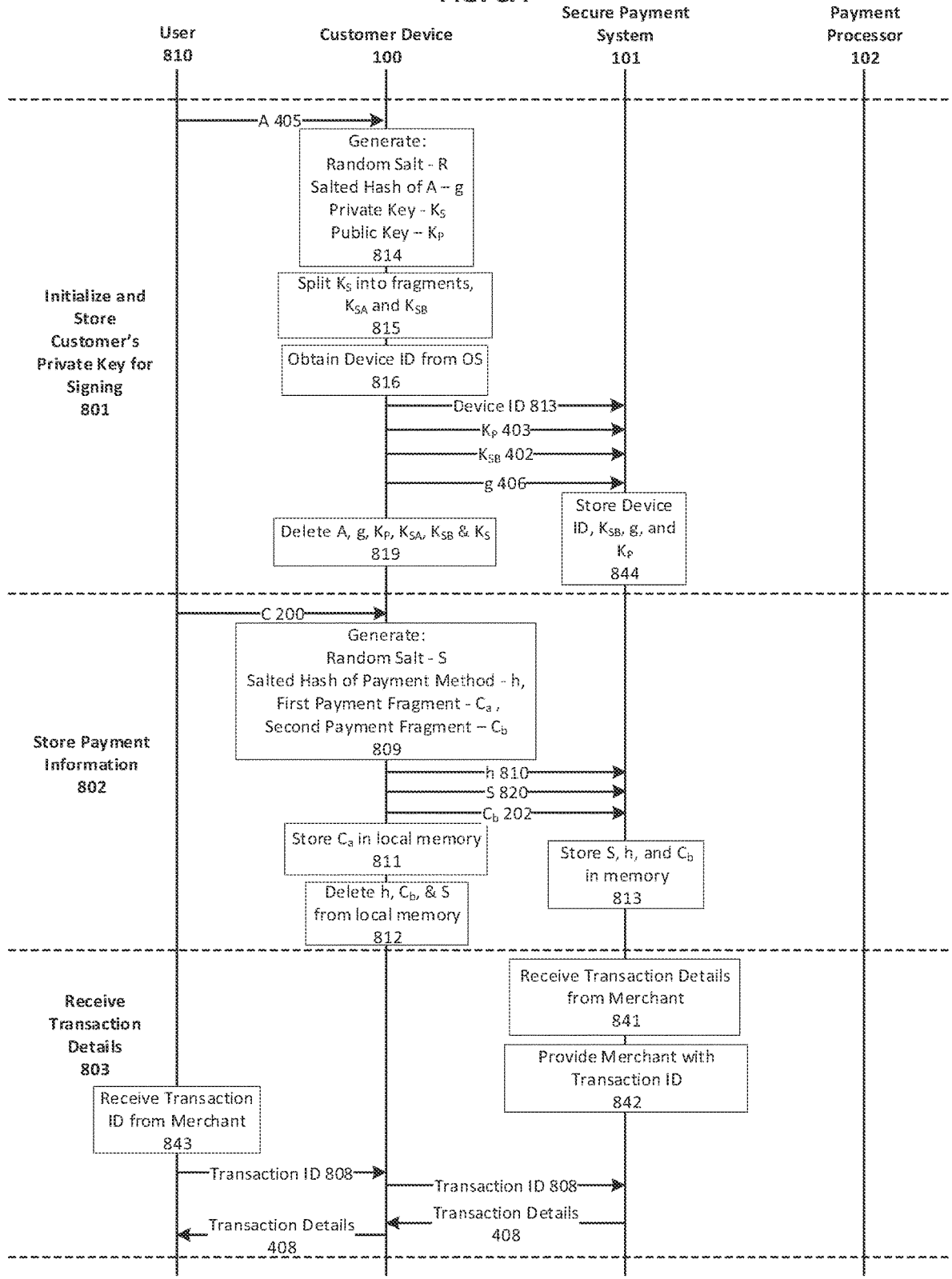

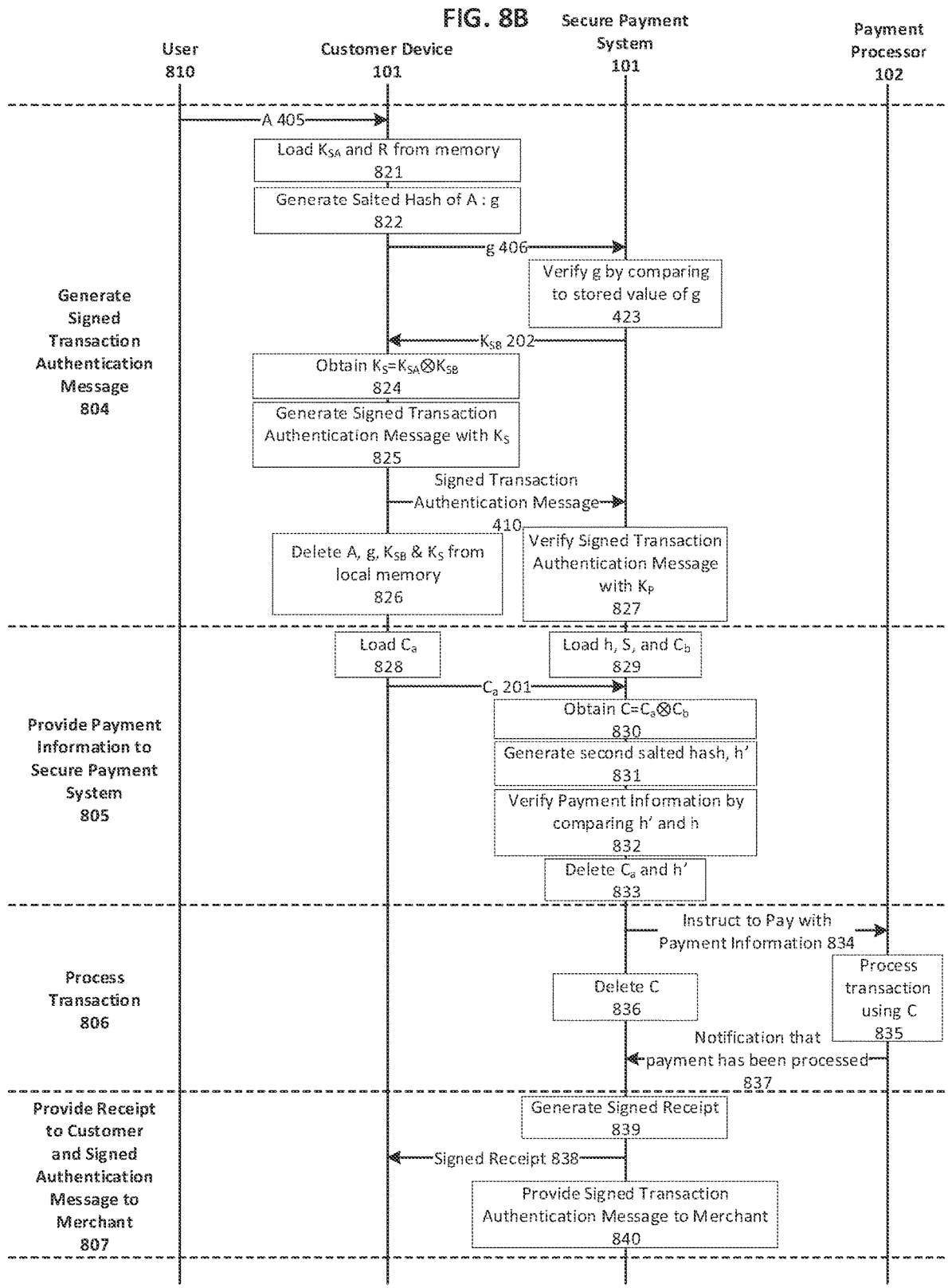

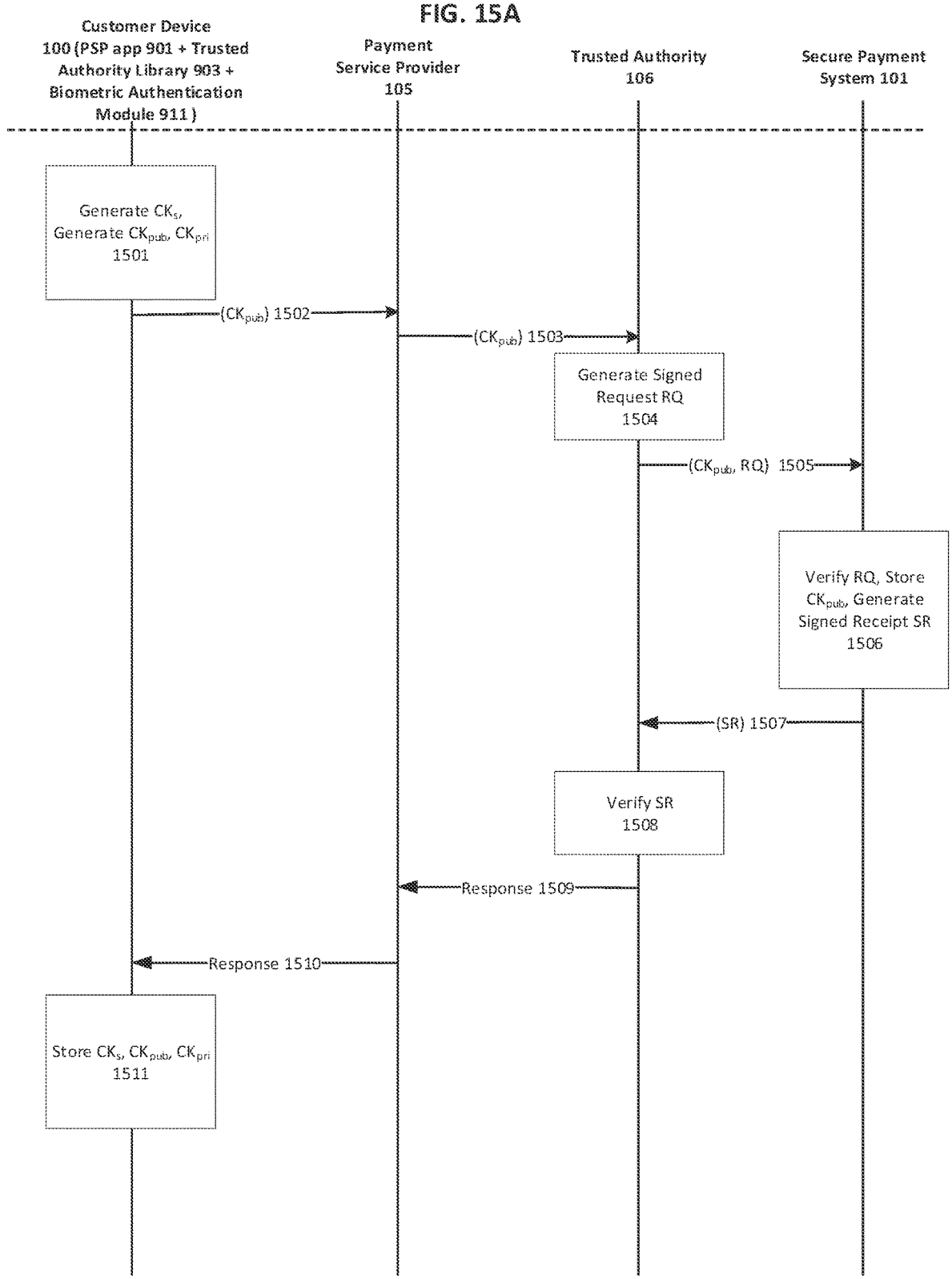

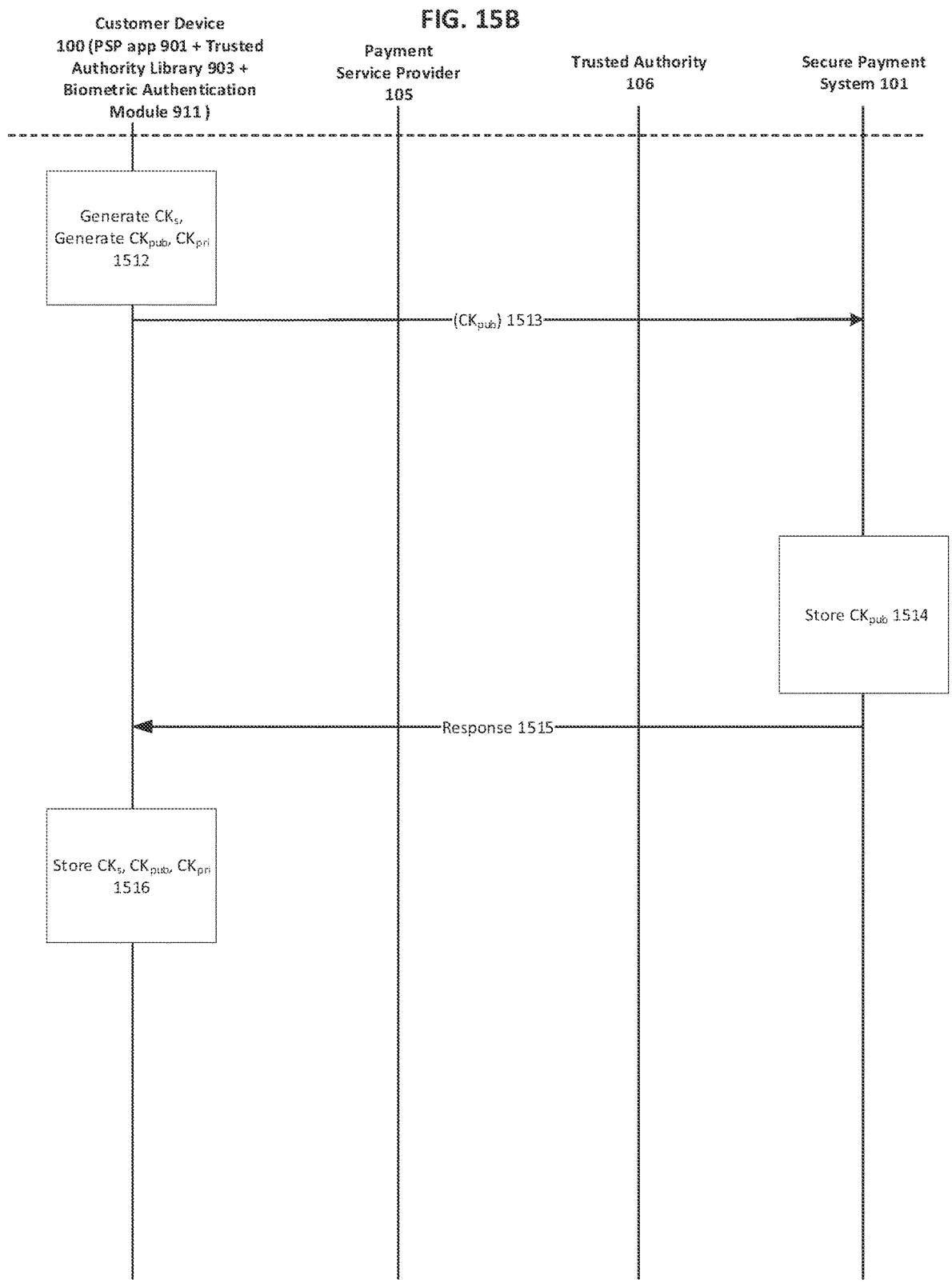

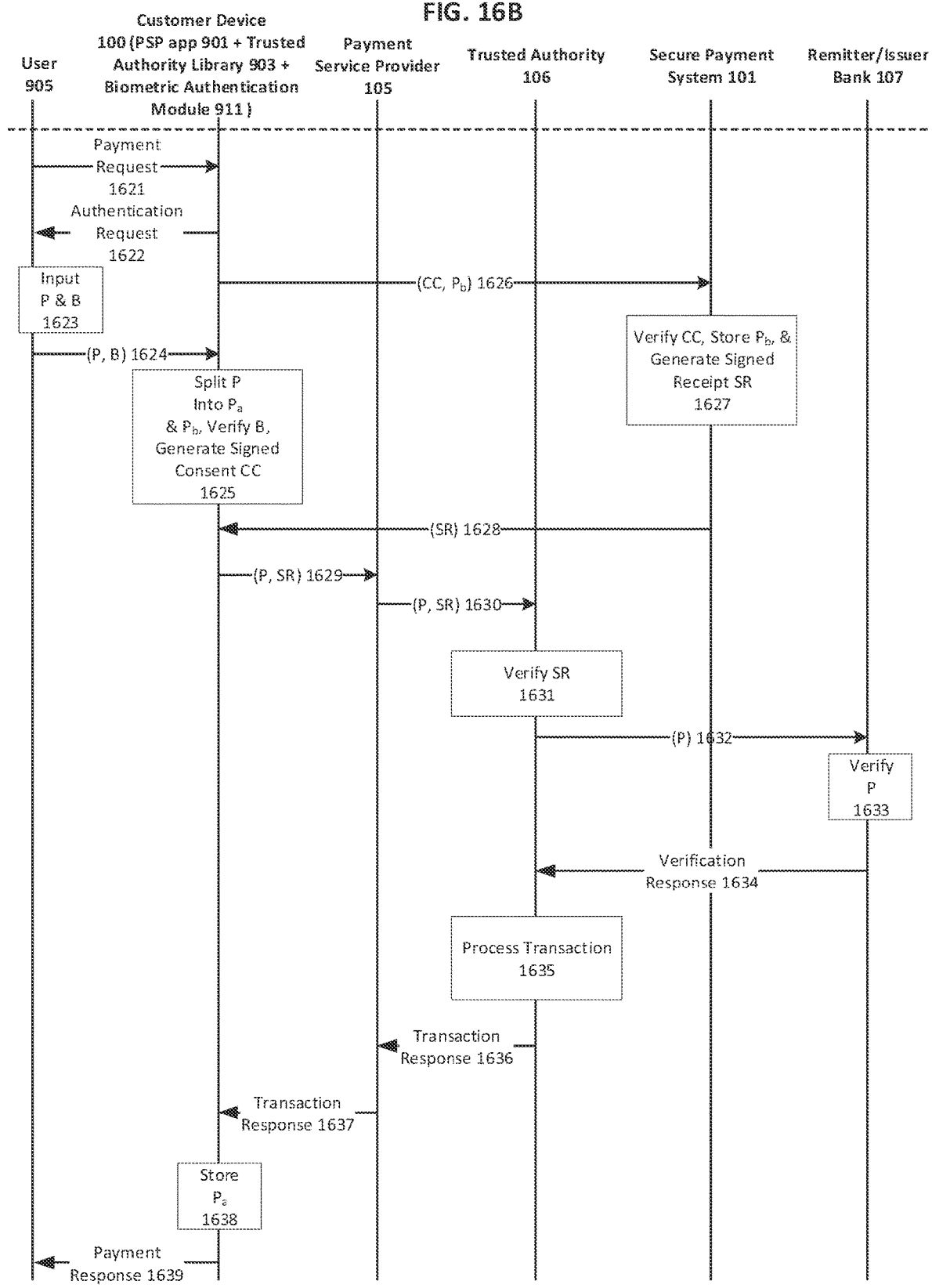

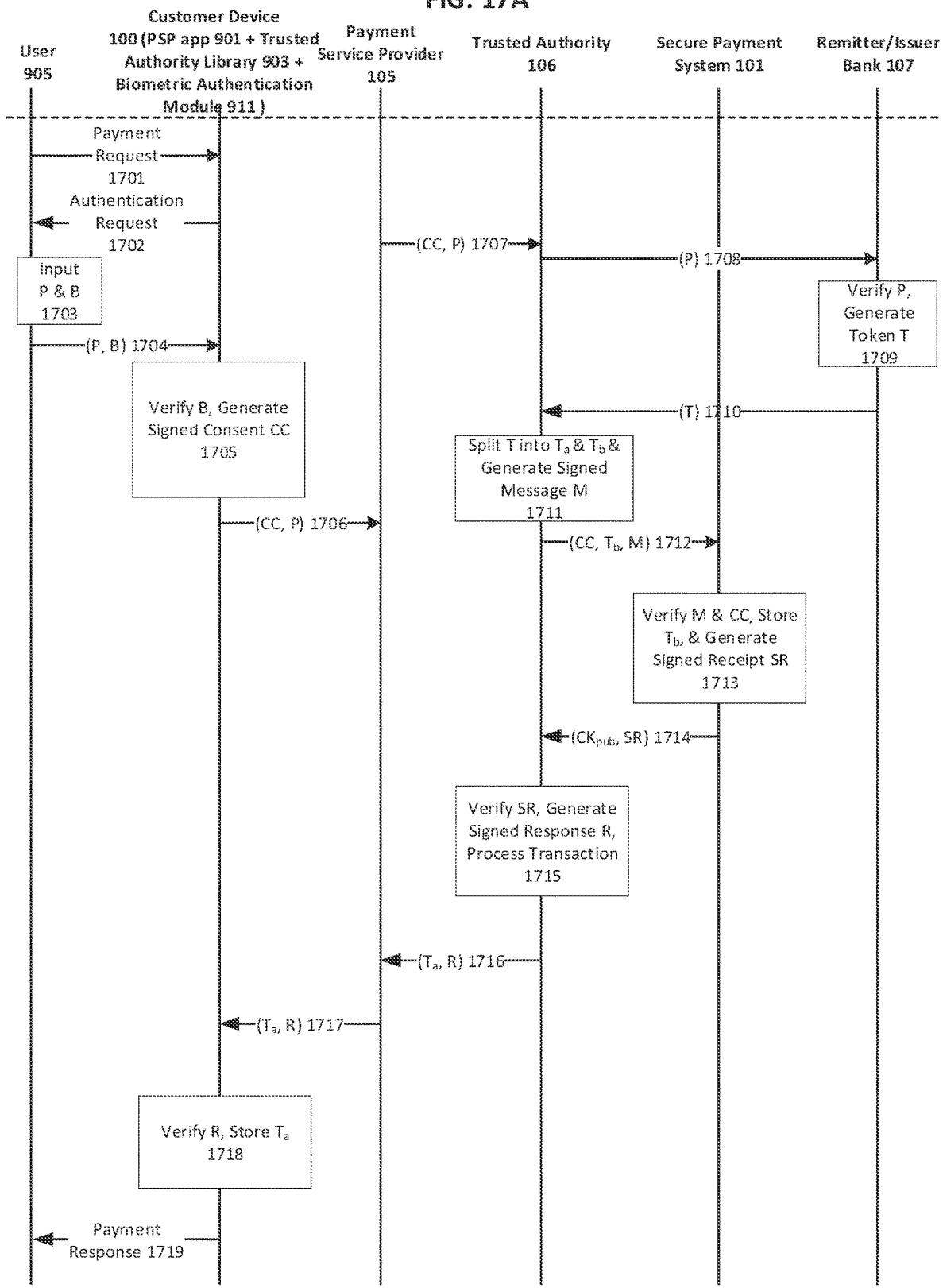

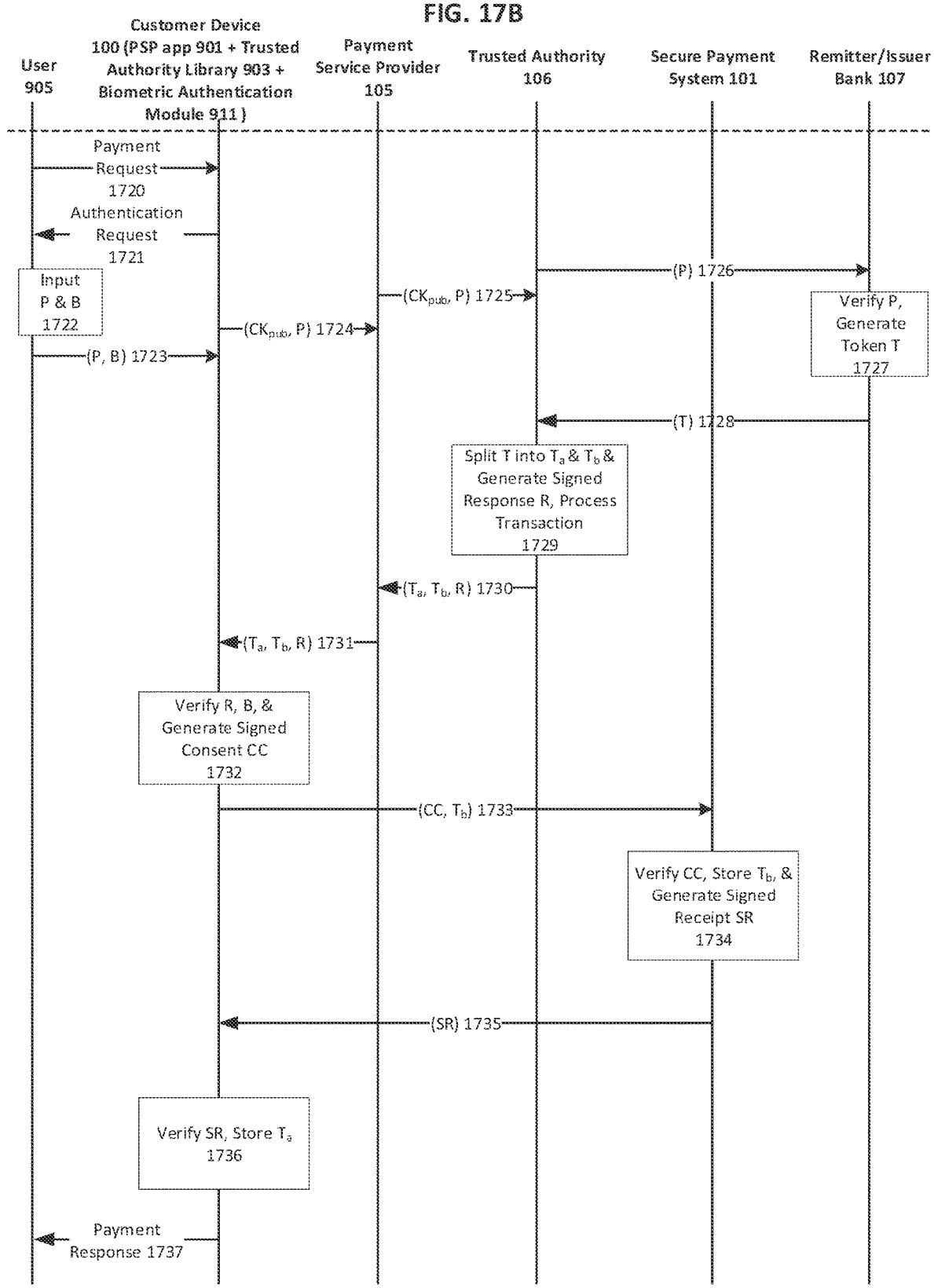

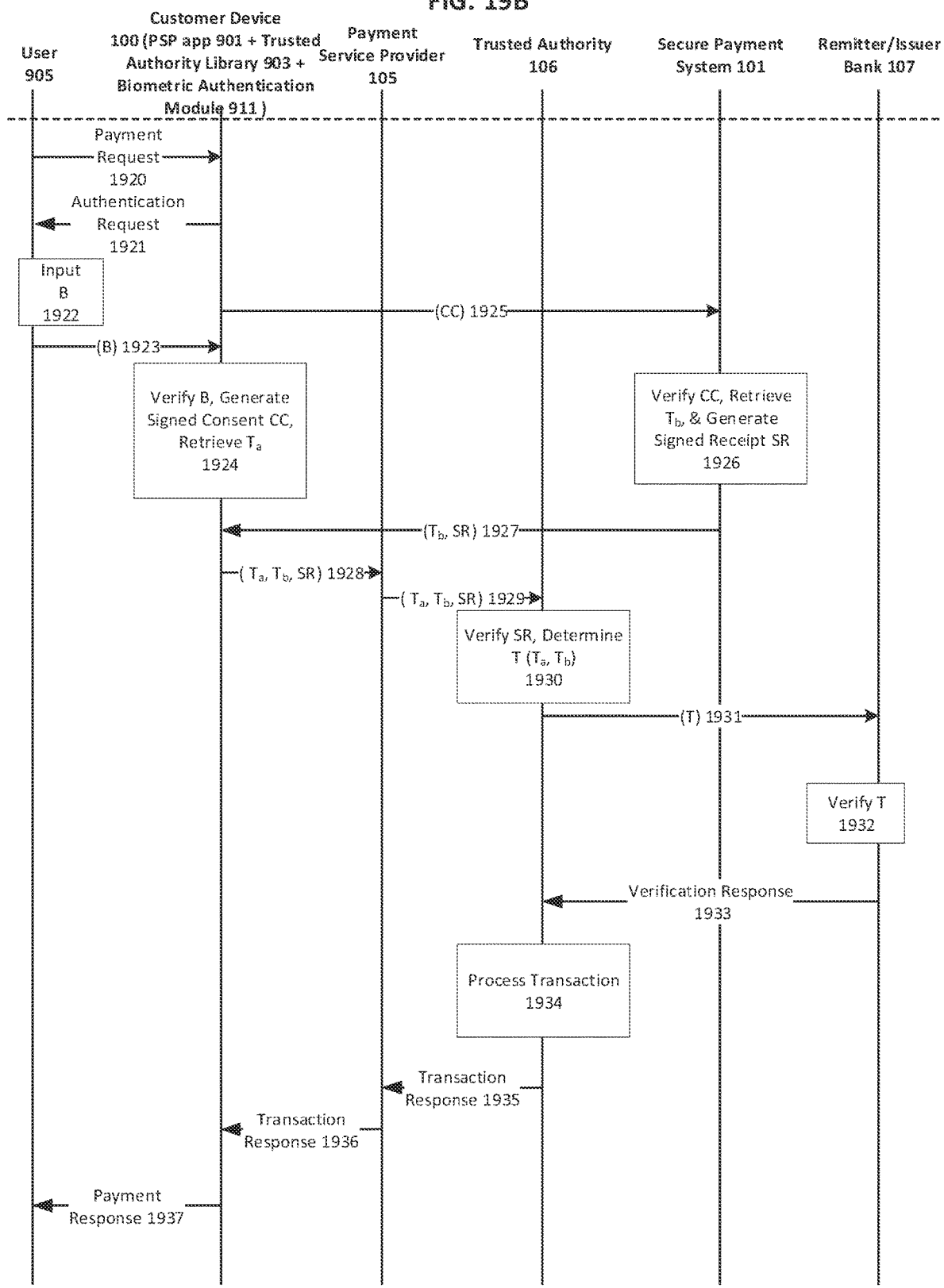

AUTHENTICATING TRANSACTIONS USING BIOMETRIC AUTHENTICATION

CROSS REFERENCE TO RELATED APPLICATIONS

This application is a continuation-in-part of U.S. patent application Ser. No. 17/008,272, filed Aug. 31, 2020, and entitled "Securely Storing and Using Sensitive Information for Making Payments Using a Wallet Application" which is a continuation-in-part of U.S. patent application Ser. No. 14/695,011, filed Apr. 23, 2015, and entitled "Securely Storing and Using Sensitive Information for Making Payments Using a Wallet Application" which claims the benefit of U.S. Provisional Application No. 61/983,252, filed Apr. 23, 2014, all of which are hereby incorporated by reference in their entirety.

BACKGROUND

Field

This disclosure relates generally to secure payments between a customer and a merchant and more specifically to securely storing payment information using data splitting techniques and recovering the payment information to process a transaction.

Description of the Background Art

Today, credit and debit cards are a widely used service, providing a valuable and convenient payment option that consumers depend on. Many consumer purchases are performed using a credit or debit card as a payment method. Credit and debit cards further provide a convenient means for purchasing goods and services over a network, which would be inconvenient or impossible using physical payment means.

However, existing payment methods distribute responsibility for security across many different systems. The distributed nature of security allows malicious individuals multiple avenues of attack with which to procure sensitive consumer financial data. It is challenging for a customer to assess the security of the systems which process their sensitive information over the course of a transaction. These existing systems have been shown to be vulnerable to attack, and weaknesses have been exploited in existing systems to reveal customer payment information to attackers. Oftentimes, these systems store sensitive data in such a way that a single point of failure can allow an attacker to gain access to a consumer's sensitive payment information.

The customer is forced to either entrust the security of their data to these multiple security systems, of which they are very unlikely to have knowledge of, or to forego the convenience and advantages of credit cards. A single unified system that mitigates the insecurities inherent in a distributed system would be advantageous to consumers who do not want to undertake financial loss or the tedious process of verifying fraud as well as to merchants who are adverse to the loss of trust and heavy financial cost that results from a large scale security breach. A distributed storage scheme on such a system would further increase the difficulty of stealing the payment information of consumers by requiring access to a plurality of secure systems in order to recover the consumer's payment information.

SUMMARY

A payment system provides a secure means for a customer, using a mobile device, to make payments via a credit or debit card at both brick-and-mortar and online merchants, without entrusting their sensitive financial information to a merchant or exposing themselves to the security vulnerabilities intrinsic to storing financial information online. In some embodiments, a payment system stores the payment information of a customer in a distributed way such that the information is inaccessible without access to data on both a secure payment system and that customer's mobile device. Additionally, a payment system can allow a user to link an identifier, uniquely associated with a mobile device, with payment information, and to authenticate that the payment information belongs to the aforementioned user, which assures that transactions authenticated by the associated device are authenticated by the user. Furthermore, some embodiments of the disclosure provide a means for merchants to obtain a cryptographically signed message, known to originate from a customer's device, that authorizes the payment, which greatly reduces vulnerability to fraud.

BRIEF DESCRIPTION OF THE DRAWINGS

FIGS. 8A and 8B show a timing diagram illustrating the initialization of a secure payment system and a customer device and a transaction being processed by the secure payment system and the customer device in accordance with some embodiments.

FIGS. 15A and 15B show a timing diagram for onboarding a payment service provider (PSP) application in accordance with some embodiments.

FIGS. 16A and 16B show a timing diagram for onboarding a VPA or bank account using PIN fragments in accordance with some embodiments.

FIGS. 17A and 17B show a timing diagram for onboarding VPA or bank account using PIN tokenization in accordance with some embodiments.

FIGS. 19A and 19B show a timing diagram of a biometric authentication mechanism for facilitating a transaction using PIN tokenization in accordance with some embodiments.

The figures depict various embodiments of the present disclosure for purposes of illustration only. One skilled in the art will readily recognize from the following discussion that alternative embodiments of the structures and methods illustrated herein may be employed without departing from the principles described herein.

DETAILED DESCRIPTION

Overview

Figure 1:
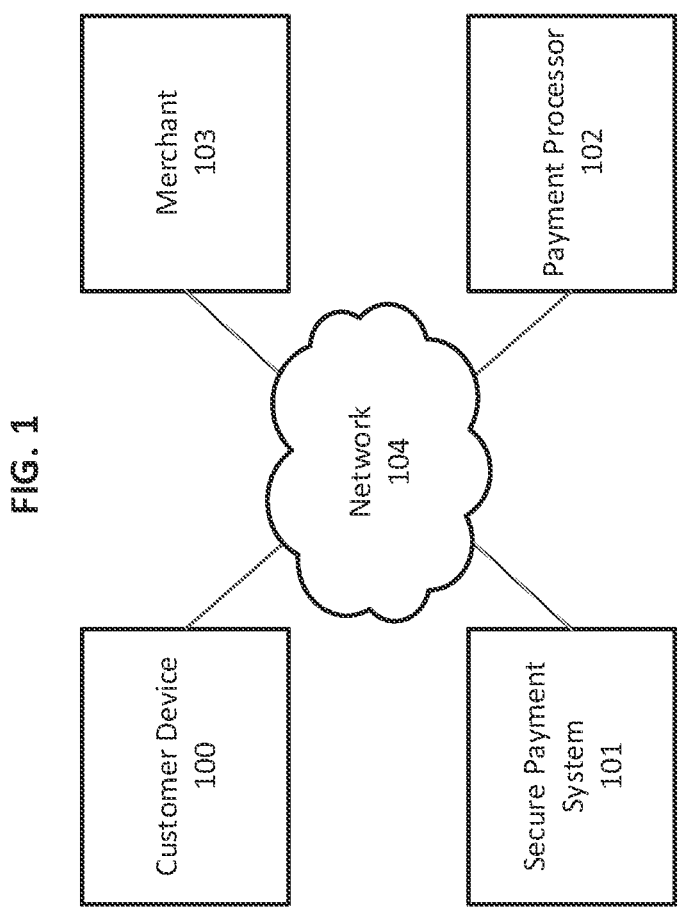
FIG. 1 is a block diagram of a network infrastructure configured to process transactions in accordance with some embodiments.

FIG. 1 is a block diagram of a network infrastructure configured to process transactions in accordance with some embodiments. The network infrastructure comprises a customer device 100, a merchant 103, a secure payment system 101, and a payment processor 102, all connected via a network 104. During a transaction, the merchant 103 provides transaction details to the secure payment system 101. The secure payment system 101 then provides the transaction details to the customer device 100, which verifies the transaction. The secure payment system 101 provides the payment processor 102 with the necessary information to process the transaction. Optionally, a transaction receipt can be provided to the customer device 100 and a signed or doubly-signed transaction authorization message can be provided to the merchant 103.

In some embodiments, before a transaction can be processed, the customer device 100 is initialized. In some embodiments, initialization can include downloading a mobile application to the customer device 100 and receiving user-input payment information to the mobile application. The payment information may differ based on the type of payment method. For example, the payment information can include a credit card number, a debit card number, a bank account number, an expiration date of a payment card, an identification number for a gift card, or any other sensitive information used to process a transaction. Initialization can also include generating, via the mobile application, a private-public key pair, wherein the public key is provided to the secure payment system 101 and the private key is used by the customer device 100 to sign transaction authorization messages that can be verified by the secure payment system 101 using the public key. Initialization can further include providing customer verification information or a device ID to the secure payment system 101 to be verified and associated with the public key. These steps and processes for authorizing a transaction are further described below.

Data Splitting Overview

As used herein, splitting data refers to a method in which sensitive data, represented herein as X, is used to produce a set of n data "fragments," $\{X_1, X_2, \ldots, X_n\}$, in such a way that any individual data fragment cannot be used to recover the sensitive data, X, but some subset of $\{X_1, X_2, \ldots, X_n\}$ can be used to recover X. The subset of $\{X_1, X_2, \ldots, X_n\}$ needed to recover X may be the entire set. Some methods of splitting data have the property that any subset of the fragments $\{X_1, X_2, \ldots, X_n\}$, which is insufficient to reproduce X, provides no information about X. These methods of splitting are referred to as information theoretically secure. Such a scheme provides advantages over other obfuscation methods such as encryption, because an attacker who receives less than the requisite number of fragments cannot recover X, even with unlimited computing power and time. Data splitting schemes that are not information theoretically secure can also be used, and these schemes can be configured such that they have an acceptable threshold of security.

Figure 2A:
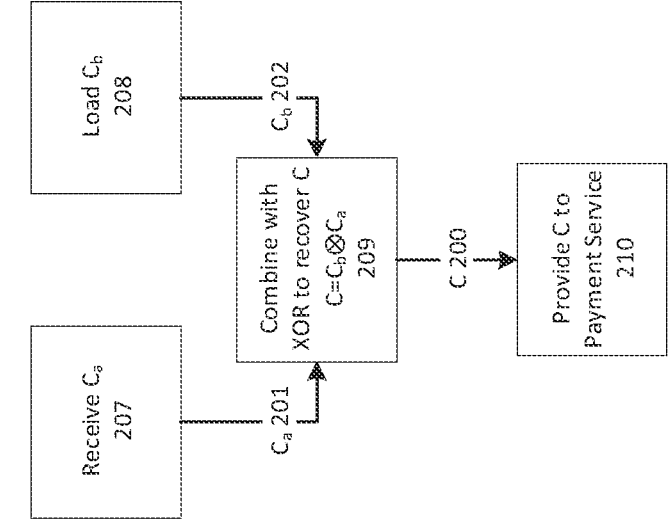
FIG. 2A is a block diagram illustrating a method for splitting payment information into two payment fragments.

A simple case of data splitting involves splitting the sensitive data, X, into only 2 segments (i.e., n=2). One way to accomplish this is the bitwise XOR operator. $X_1$ and $X_2$ are chosen such that $X_1 \otimes X_2 = X$. For best security, $X_1$ or $X_2$ should be generated randomly so that they have a uniform probabilistic distribution over all possible output values. In this case, this data splitting scheme is information theoretically secure. One algorithm to generate $X_1$ and $X_2$ with these property is shown in FIG. 2A. In addition to the XOR operation, there are other types of operators which can provide equivalent results, such as a modular addition operation (i.e., $X = X_1 + X_2$), or a modular multiplication operation.

This approach may be extended to any value of n in which it is intended that the full set of $\{X_1, X_2, \ldots, X_n\}$ be required to reconstruct X. For example, $X = X_1 \otimes X_2 \otimes \ldots \otimes X_n$. However, it might be desirable to distribute data to users in such a way that users can reconstruct X without requiring every user to provide their fragments. Such a system could be configured to be able to reconstruct X with the fragments of any set of p users, where p<n. This can be accomplished by a system that creates more fragments than users and then distributes a subset of the fragments to each user. Each fragment must be marked so that it is known which fragment it is. An example embodiment divides three fragments $\{X_1, X_2, X_3\}$ into three subsets and sends each subset to one of three users. Suppose the first user receives $\{X_1, X_2\}$, the second user receives $\{X_2, X_3\}$ and the third receives $\{X_1, X_2\}$. Any combination of two of these users can reconstruct X.

There are other data splitting systems which can be used to split data into n fragments and require only p users to contribute fragments in order to reconstruct the information. Examples of these systems include Shamir's secret sharing scheme, Blakley's scheme, Mignotte's scheme, and Asmuth-Bloom's scheme. These schemes have the desirable property that they only distribute one fragment to each user. Any of these schemes can be implemented consistent with this disclosure.

A hierarchical authorization system can be provided for by distributing the fragments unevenly. For example, by splitting X into $X_1$ and $X_2$ and distributing $X_1$ to user A, and distribute $X_2$ to user B and user C. The combination of user A and B will be able to reconstruct X, as will the combination of user A and C, but the combination of user B and C will not be able to reconstruct X, thus A is hierarchically above B and C. Many other embodiments can incorporate similar principles with different numbers of users and different user hierarchy requirements. If a set of fragments, rather than a single fragment, is distributed to each user, then with a large enough number of fragments, any system in which any chosen combination of users are allowed or prevented from reconstructing X can be designed. One embodiment allows a controlling user to select which combinations of users can reconstruct X and which combinations cannot and then generates a set of fragments and distributes them in a way such that only those combinations of users which were selected by the controlling user are able to reconstruct X.

The term "user" is used above for an entity that holds a fragment, although such a "user" could be a mobile device, a secure payment system, or any other device.

Splitting Payment Information

FIG. 2A depicts one embodiment for splitting the payment information C 200 into payment fragments, $C_a$ 200 and $C_b$ 201, on the customer device 100. The payment information C 200 is received 203. Receiving 203 the payment information C 200 can involve allowing a user to type in the payment information C 200, scanning a card with a camera and applying optical character recognition (OCR) techniques to obtain the payment information C 200, or receiving the payment information C 200 from a network 104. The payment information C 200 can be any sort of data that can be used to process a transaction such as a credit card number, a debit card number, a bank account number, a gift card number, a credit card expiration date, or any other sensitive information. Similarly, an embodiment may receive and split multiple different types of payment information. A random number $C_a$ 201, which will function as the first payment fragment, is generated 204 via a random number generator. The second payment fragment $C_b$ 202 is generated by combining 205 the first payment fragment $C_a$ 201 and the payment information C 200 via a bitwise XOR operation (i.e., $C_b = C \otimes C_a$). The first payment fragment $C_a$ 201 is then sent 206 to the secure payment system 101. The first and second payment fragments, $C_a$ 201 and $C_b$ 202, are indistinguishable in terms of function and distribution and thus, although FIG. 2A shows the second payment fragment $C_b$ 202 being sent 206 to the secure payment system 101, in this embodiment either payment fragment may be transmitted to the secure payment system 101.

Other methods of splitting the card information, in addition to the method depicted in FIG. 2A, may also be used. For example, an equivalent algorithm for generating the payment fragments, $C_a$ 201 and $C_b$ 202, involves initializing the first and second payment fragments, $C_a$ 201 and $C_b$ 202, into vectors of bits with lengths equal to that of the payment information C 200. Then, for each bit of the payment information C 200, if a given bit of payment information C 200 has a value of 0, the corresponding bits in both payment fragments, $C_a$ 201 and $C_b$ 202 are both set to 0, with a probability 0.5 and the corresponding bits in both payment fragments, $C_a$ 201 and $C_b$ 202, are both set to 1 with probability 0.5. If a given bit in the payment information C 200 has a value of 1, then the corresponding bits in the payment fragments, $C_a$ 201 and $C_b$ 202, are set to 0 and 1, respectively, with probability 0.5 and set to 1 and 0, respectively, with probability 0.5. In this way, the distribution of values is random across each of the fragments but may still be combined to generate the payment information. In addition to these two embodiments, there are many other algorithms that are functionally equivalent. In some embodiments, the secure payment system 101 is also provided with a salted hash of the payment information C 200, which it can use to verify that the payment information C 200 is correct. In some embodiments, the secure payment system 101 is also provided with the salt used to create the hash to store. In an alternate embodiment, the salt is stored on the customer device 100 and is provided to the secure payment system 101 along with the payment fragment $C_a$ 200 during a transaction.

Also, alternate embodiments can use binary operators other than the bitwise XOR operator. The modulo addition operator or the modulo multiplication operator can be used to generate the payment fragments, $C_a$ 201 and $C_b$ 202. In some embodiments, a combination of operators is used, each on a different part of the payment information C 200. In one embodiment a first portion of C 200 is split into two payment fragment portions using the XOR operator, a second portion of C 200 is split into two other payment fragment portions using a modular addition operator, a third portion of C 200 is split into two more payment fragment portions using the modular multiplication operator, and the six portions are appended together to form the payment fragments, $C_a$ 201 and $C_b$ 202.

After the second payment fragment $C_b$ 202 is sent to the secure payment system 101, it is stored in the secure payment system 101. In some embodiments, the secure payment system 101 further splits the payment fragment $C_b$ 202 and stores the resultant fragments on a plurality of different servers. In some embodiments, the servers require different credentials to access and are encrypted with different encryption keys. In some embodiments, logs of the transactions are also stored by the secure payment system 101. These logs are often sensitive data and may be stored in a distributed, encrypted manner in the same way the second payment fragment $C_b$ 202 is stored.

Recover the Payment Information on the Secure Payment System

Figure 2B:
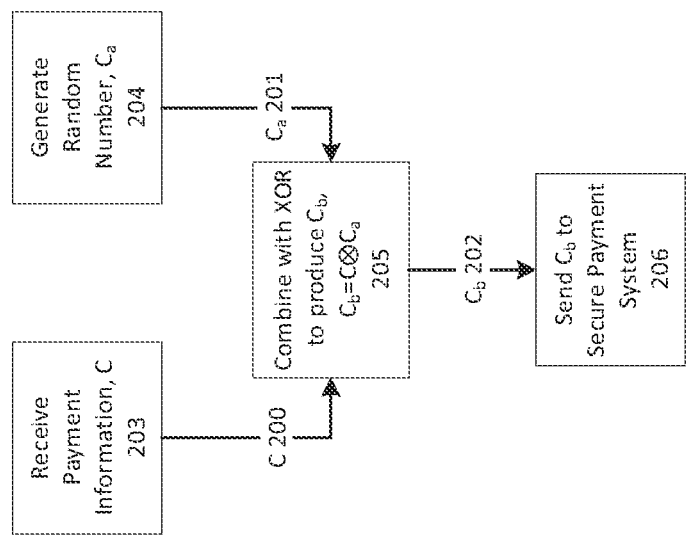
FIG. 2B is a block diagram illustrating a method for reconstituting payment information from two payment fragments.

FIG. 2B depicts a method to recover the payment information C 200 from the payment fragments, $C_a$ 201 and $C_b$ 202. The secure payment system 101 receives 207 the first payment fragment $C_a$ 201 from the customer device 100 and the second payment fragment $C_b$ 202 is loaded 208. Then, the payment fragments, $C_a$ 201 and $C_b$ 202, are combined 209 using the bitwise XOR operation to produce the payment information C 200 (i.e., $C = C_a \otimes C_b$). The payment information C 200 is recoverable using this method because $C_a \otimes C_b = (C \otimes C_b) \otimes C_b = C \otimes (C_b \otimes C_b) = C \otimes \vec{0} = C$, where $\vec{0}$ denotes the zero vector. The payment information C 200 can then be provided to the payment processor 102 to facilitate the transaction. An analogous method can be used to recover the private key $K_S$ 400 from the private key fragments $K_{SA}$ 401 and $K_{SB}$ 402. A comparable method can be applied for a larger number of fragments. E.g., if C is divided into N fragments, $\{C_1, C_2, \ldots, C_N\}$ via the XOR operator, then C can be recovered by $C = C_1 \otimes C_2 \otimes \ldots \otimes C_N$. These fragments can be distributed among a plurality of customer devices, so that authorization is required from the plurality of customer devices, or some subset of the customer devices, to recover the payment information C 200. In embodiments where the secure payment system 101 has a salted hash of the payment information C 200 stored in memory, then the veracity of the payment information can be verified by the secure payment system 101 by salting and hashing the payment information C 200 and comparing the resultant hash to the hash stored in the memory of the secure payment system 101.

Update the Payment Fragments

Figure 3:
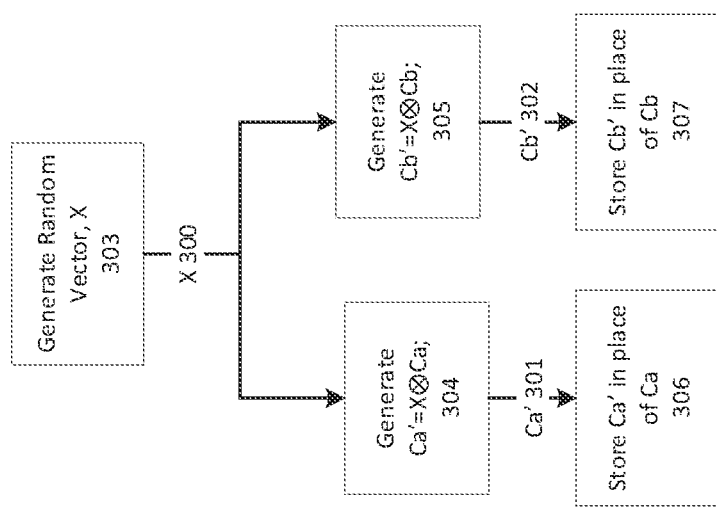
FIG. 3 is a block diagram illustrating a method for updating the payment fragments.

If either of the payment fragments, $C_a$ 201 or $C_b$ 202, is obtained by an attacker in a data breach, it would be prudent to update the payment fragments, to prevent the old values from being used to produce the payment information C 200. Because an intrusion might go unnoticed, a system can update the payment fragments, $C_a$ 201 or $C_b$ 202, periodically so that an attacker would only have a small window of time to obtain both payment fragments, $C_a$ 201 and $C_b$ 202. FIG. 3 shows a method for updating the payment fragments, $C_a$ 201 or $C_b$ 202, without splitting the data again. First a random number X 300 is generated 303. The random number X 300 can be generated by any secure system, such as the secure payment system 101, the customer device 100, or a separate secure system. The random number X 300 is then sent to the secure payment system 101 or the customer device 100. Once the random number X 300 is known to both the secure payment system 101 and the customer device 100, the payment fragments, $C_a$ 201 and $C_b$ 202, are updated to updated payment fragments, $C'_a$ 301 and $C'_b$ 302. The first updated payment fragment $C'_a$ 301 is generated 304 by $C'_a = X \otimes C_a$. And the second updated payment fragment $C'_b$ 302 is generated 305 by $C'_b = X \otimes C_b$. Then the old payment fragments, $C_a$ 201 and $C_b$ 202, are replaced by the updated payment fragments, $C'_a$ 301 and $C'_b$ 302, by storing 306 the first updated payment fragment $C'_a$ 301 in place of the first old payment fragment $C_a$ 201 and by storing 307 the second updated payment fragment $C'_b$ 302 in place of the first old payment fragment $C_b$ 202. The updated payment fragments, $C'_a$ 301 and $C'_b$ 302 may still be used to recover the payment information C 200 because $C'_a \otimes C'_b = (C_a \otimes X) \otimes (C_b \otimes X) = (C_a \otimes C_b) \otimes (X \otimes X) = C \otimes \vec{0} = C$. After the updated payment fragments, $C'_a$ 301 and $C'_b$ 302, are generated, the old payment fragments $C_a$ 201 and $C_b$ 202, and the random number X 300 should be deleted from the memory of the secure payment system 101 and the customer device 100. Updating, in this manner, may be performed any number of times without ever requiring the payment information C 200 to be accessed on any particular system. Additionally, a comparable method may be used to update the private key fragments, $K_{SA}$ 401 and $K_{SB}$ 402, or any other fragments of sensitive information.

This method can also be extended if there are more fragments of a piece of sensitive information. For example, suppose Y, is divided into N fragments, $\{Y_1, Y_2, \ldots Y_N\}$ such that $Y = Y_1 \otimes Y_2 \otimes \ldots \otimes Y_N$. Y may be any sensitive data, such as the payment information C 200 or the private encryption key $K_s$ 400. A random number X, may be generated as before. If N is even, then for every $i \in \{1, \ldots, N\}$, $Y'_i = X \otimes Y$. However, if N is odd, then one (or some odd number) of the fragments will need to be left unaltered. For example, $Y_1$ may be left unaltered, which would mean that $Y'_i = Y_i \otimes X$, for every $i \in \{2, \ldots, N\}$, and $Y'_1 = Y_1$. In both cases $Y_i$ is replaced with $Y'_i$, as before. In case of odd N, the process may be iterated twice, where a different value is left unaltered in each iteration. In one example, N is odd and $X_1$ and $X_2$ are independent random numbers. $Y'_1 = Y_1 \otimes X_1$, $Y'_2 = Y_2 \otimes X_2$, and $Y'_i = Y_i \otimes X_1 \otimes X_2$, for all $i \in \{3, \ldots, N\}$. In another embodiment, a set of random numbers $\{X_1, \ldots, X_N\}$ is generated, where $X_1 \otimes X_2 \otimes \ldots \otimes X_N = 0$. Then, $Y_i$ is replaced with $Y'_i = Y_i \otimes X_i$ for all $i \in \{1, \ldots, N\}$.

A similar method may be used in cases in which an operator beside XOR is used. For example, suppose Y is divided into N fragments, $\{Y_1, Y_2, \ldots Y_N\}$ such that $Y = Y_1 + Y_2 + \ldots + Y_N$, where "+" denotes the modular addition operator. In this case a set of random numbers $\{X_1, X_2, \ldots, X_N\}$ may be chosen such that $X_1 + X_2 + + X_N = \vec{0}$. i.e., the zero vector (or, in modular algebra terms, simply 0). Thus, for every $i \in \{1, \ldots, N\}$, if $Y'_i = Y_i + X_i$, then $Y_i$ may be replaced by $Y'_i$. In addition to the modular addition operator, and the XOR operator, every binary linear operation may be replaced using analogous methods.

Initialization of the Private Signing Key

Figure 4A:
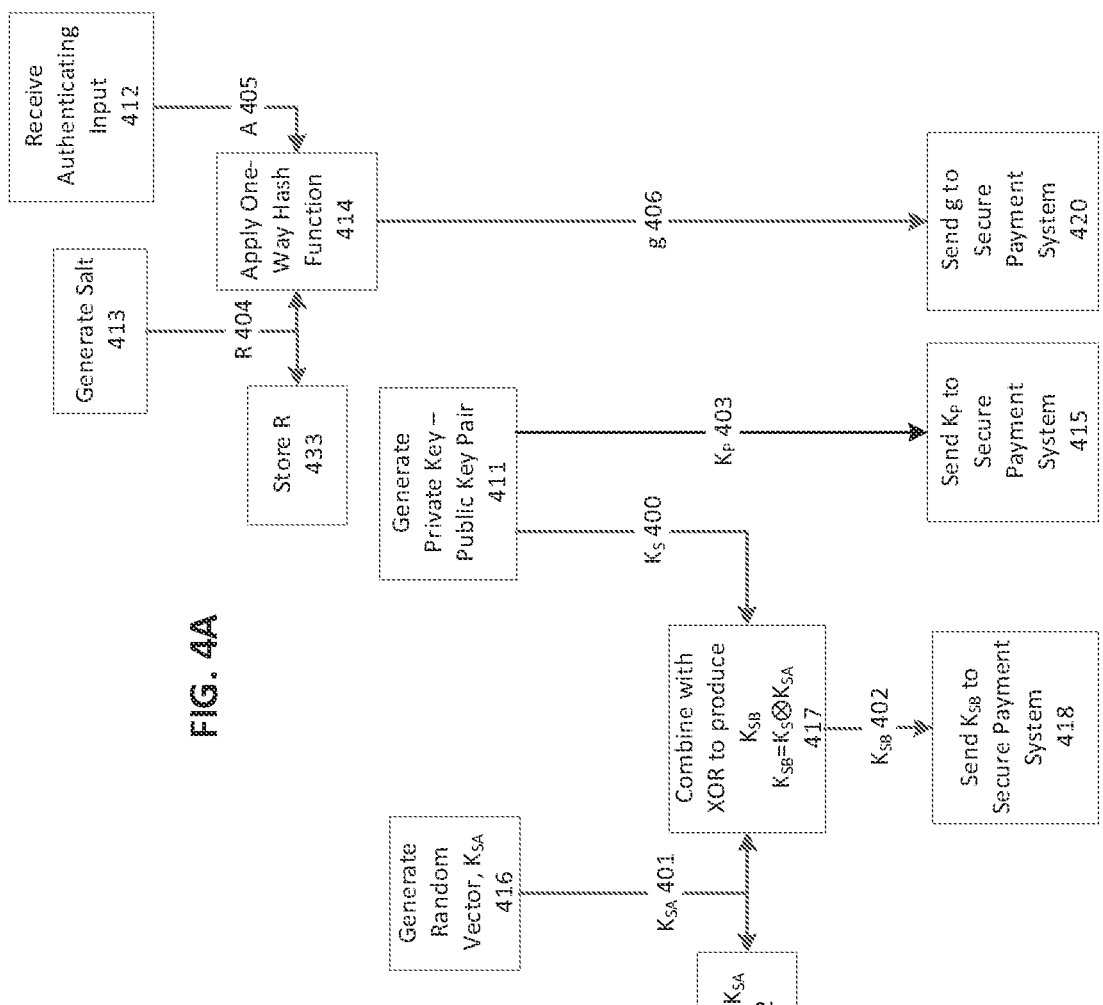
FIG. 4A is a block diagram illustrating a method for generating a pair of private and public encryption keys, splitting the private key into fragments, and storing the fragments.

FIG. 4A is a block diagram illustrating an embodiment of a method for generating 411 a pair of private and public encryption keys, splitting the private key, and storing the fragments of the private key on a customer device 100 and the secure payment system 101. This method includes receiving 412 an authenticating input A 405. The authenticating input A 405 can be a PIN which is input by a user. In some embodiments, the user can be restricted from entering a PIN deemed to be insecure, such as very common PINs like "1234" or "0000" or a PIN that consists of the user's birthday. In some embodiments, other types of authenticating inputs may be used instead of, or in addition to, a PIN. The authenticating input A 405 can comprise or be generated from at least one of a fingerprint, a facial recognition profile, a retina scan, an unlock pattern, and a password. A salt R 404 is generated 413, via a random number generator. The salt R 404 and the authenticating input A 405 are combined by applying 414 a one-way hash function to produce a hash g 406. For best security, the hashing function should have an output that is probabilistically uniform, or near uniform, given inputs that are uniformly distributed. This increases the difficulty of using a brute force attack to guess the authenticating input A 405 or g 406.

A random number generator is used to generate a private-public key pair, $K_S$ 400 and $K_P$ 403. A private key-public key pair comprises two encryption keys, a private key $K_s$ 400 and a public key $K_P$ 403. A private key cannot be derived from its corresponding public key. The private key-public key pair, $K_S$ 400 and $K_P$ 403, may be produced via the RSA cryptosystem, the Digital Signature Algorithm (DSA), or any other public-private key cryptosystem suitable for cryptographic signing. The public key $K_P$ 403 is sent 415 to the secure payment system 101. The salt R 404 is stored 433 in the local memory of the customer device 100.

In the embodiment shown in FIG. 4A, a random number $K_{SA}$ 401, which functions as the first private key fragment is generated 416 via a random number generator. The second private key fragment $K_{SB}$ 402 is generated by combining 416 the first private key fragment $K_{SA}$ 401 with the private key $K_S$ 400 via a bitwise XOR operation where $K_{SB} = K_S \otimes K_{SA}$. The second private key fragment $K_{SB}$ 402 is sent 418 to the secure payment system 101. The hash g 406 is also sent 420 to the secure payment system 101. The un-encoded private encryption key $K_S$ 400, the hash g 406, and the authenticating input A 405 are typically deleted from the volatile and non-volatile memory of the device. The private key fragment $K_{SA}$ 401 can be stored 432 in the memory of the customer device 100.

In some embodiments the public key $K_P$ 403 is registered to a device ID, a phone number, or a customer ID. The device ID can be sent along with the public key $K_P$ 403. In some embodiments, the device ID is an identifier unique to each customer device which is generated by the operating system of the customer device 100. The customer device 100 may send any access token necessary for the secure payment system 101 to send a push notification to the customer device 100, along with device ID. The secure payment system 101 then sends a device verification message to the customer device 100 using the push notification services built into the operating system of the customer device 100. The device verification message can contain a one-time random number encrypted using the customer's public key. The customer device 100 then receives the customer verification message, decrypts the number using the private key $K_S$ 400 and sends back the original random number to the secure payment system 101. The secure payment system 101 then deems the customer device 100 as verified for the customer and associates the public key $K_P$ 403 with the device ID.

In some embodiments, the customer's phone number is verified, so that that the public key $K_P$ 403 is associated by the secure payment system 101 with the specific phone number, and consequentially with a specific customer. One such method for verifying the phone number of the customer device 100 constitutes asking the customer to input the mobile device phone number or obtaining the device number through a command to the operating system of the customer device 100. The phone number is then sent to the secure payment system 101. The secure payment system 101 can then send a text message to the received phone number. The text message can contain a random number encrypted using the public key $K_P$ 403. Alternately, the encrypted random number can be transmitted via a phone call. The encrypted random number can be viewed by the user and typed into an application or can be retrieved automatically by the application. The random number is then decoded using the private key $K_S$ 400 and sent back to the secure payment system 101, which then deems the phone number as verified and associates the public key $K_P$ 403 with the phone number. The phone number can also be verified in the other direction. I.e., the customer device 100 can receive the encrypted random number from the secure payment system 101 and send a text message or phone call with the decoded random number to a phone number that the secure payment system 101 is configured to receive.

In some embodiments, the customer ID is verified, so that that the public key $K_P$ 403 is associated by the secure payment system 101 with a specific customer ID. The customer ID can constitute many things such as a name of a customer, a username, a social security number, or any identifying information that can be mapped to a customer. The customer can be asked to input details into the customer device 100 about their identity such as a full name, address, or part of a social security number, which is then sent to the secure payment system 101. The secure payment system 101 can then pose questions to the customer to verify the customer's identity. In some embodiments, these questions can be related to the customer's financial history and can be obtained from an identity verification service or a credit reporting agency. The answers can also be verified using these services. The answers to these questions can be signed using the private key $K_S$ 400 and sent to the secure payment system 101 which verifies the signature and then deems the customer as verified and associates the public key $K_P$ 403 with the customer ID.

In some embodiments, the public key $K_P$ 403 is bound, via the issuance of a public key certificate, to the customer's identity, wherein the customer's identity is established by at least one of a full name, an address, part of a social security number, a phone number, or a device ID. The public key certificate can include this identifying information. This information can be included in the public key certificate as plaintext or a hashed version of the information can be included in the public key certificate. In some embodiments, this public key certificate is provided by the secure payment system 101 to the merchant 103 along with a signed message that authenticates a transaction, which will allow the merchant 103 to verify and prove that the given customer did provide authorization for a transaction. The secure payment system 101 can sign the public key certificate with its own private key, wherein the secure payment system's private key is, in turn, certified by a trusted certificate authority.

Authorize a Transaction

Figure 4B:
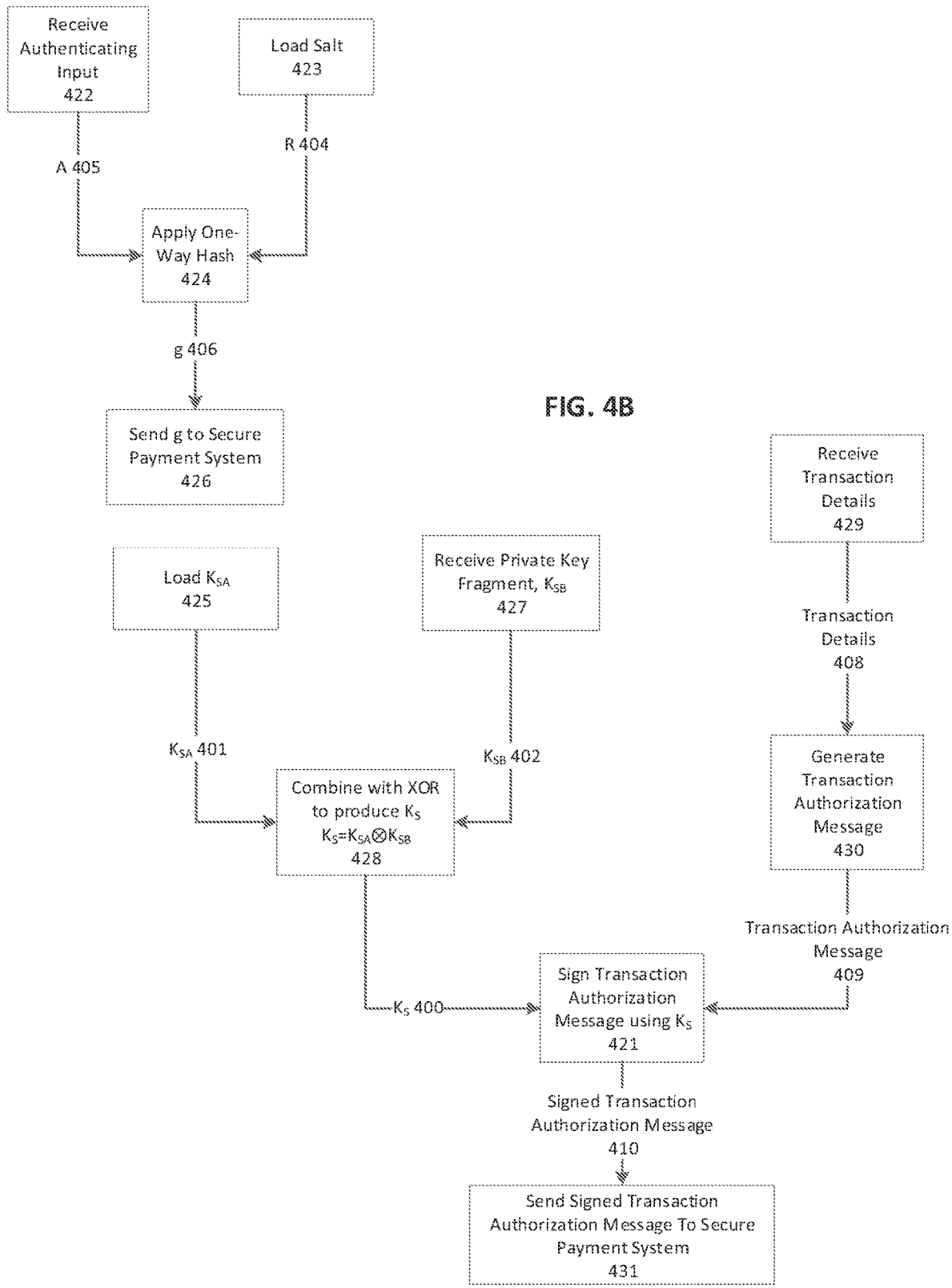
FIG. 4B is a block diagram illustrating a method for recovering the private encryption key on the customer device and using it to create a signed transaction authorization message.

Once a transaction is initiated, the customer device 100 signs the transaction using the private key $K_s$ 400. To do so, the customer device 100 recovers the private key $K_S$ 400 in order to digitally sign a transaction authorization message 409. FIG. 4B is a block diagram illustrating a method for recovering the private encryption key $K_S$ 400 on the customer device 100 from the private key fragment $K_{SA}$ 401 and the private key fragment $K_{SB}$ 402 and using the private encryption key $K_S$ 400 to sign 421 a transaction authorization message 409 in accordance with an embodiment. The authenticating input A 405 is received 422 from the user. The salt R 404 is loaded 423 by the customer device 100. The one way-hashing function is applied 424 to some combination of the salt R 404 and the authenticating input A 405 to produce the hash g 406. The one-way hashing function must be the same as that which was used to produce the hash g 406 during initialization. The authenticating input A 405 and the salt R 404 must likewise be combined in the same way as during initialization, to ensure that the hash g 406 is consistent with its value during initialization. The hash g 406 is sent 426 to the secure payment system 101. The secure payment system 101 verifies that the hash g 406 is correct by comparing it to the stored value of the hash g 406. In response to receiving the correct hash g 406, the secure payment system 101 provides the second key fragment $K_{SB}$ 402 to the customer device 100. After receiving 427, the second private key fragment $K_{SB}$ 402, the customer device 100 combines 428 the two private key fragments, $K_{SA}$ 401 and $K_{SB}$ 402, to produce the private key $K_S$ 400. In some embodiments, combining 428 includes a linear operator such as the bitwise XOR (i.e., $K_S K_{SA} \otimes K_{SB}$) or the modular addition operator. In some embodiments, the secure payment system 101 tracks the number of incorrect authentication attempts (i.e., a hash is received that does not match the hash g 406). The secure payment system may take security measures under certain conditions, such as the number of failed authentication attempts exceeds a certain number without a correct authentication taking place, or a certain number of failed authentication attempts within a timeframe. The security measures may be disallowing authentication attempts for a certain period of time or deleting the second key fragment $K_{SB}$ 402.

In an alternate embodiment, rather than generating the hash g 406, a customer device 100 that supports operating system (OS)-managed encrypted non-volatile storage, uses the encrypted storage to store and recover the hash g 406 (which can be replaced by a random value), rather than reconstructing it using an authenticating input A 405. However, even when storing the hash g 406 directly through the OS managed encrypted storage, it might still be desirable to require the user to input an authenticating input A 405.

Transaction details 408 are received 429 from the secure payment system 101. These transaction details 408 are used to generate the transaction authorization message 408. The transaction authorization message 409 or the transaction details 408 can contain certain details about the transaction, such as an amount of money, a time, a location, the identity of the merchant 103 that will be receiving the funds, or any other information relevant to the details of the transaction. The transaction authorization message 409 can simply be a copy of the transaction details 408. The transaction details 408 can be displayed to the user prior to prompting the user to authorize the transaction by typing in the authenticating input A 405. The transaction details 408 can also be displayed to the user prior to allowing the user to select among a plurality of payment options (e.g., select which credit card to use) with which to process the transaction.

The transaction authorization message 409 is digitally signed 421 with the private key $K_S$ 400 and the signed transaction authorization message 410 is sent 431 to the secure payment system 101. The authenticating input A 405, the hash g 406, the private key fragment $K_{SB}$, and the plaintext private key $K_S$ 400 can be removed from the memory of the customer device 100 once the signed transaction authorization message 410 is generated. In some embodiments, the payment information fragment $C_a$ 201 is only provided to the secure payment system after $K_{SB}$ 402 has been received 427. In some embodiments $K_{SA} \otimes K_{SB}$ produces an output that contains both the private key $K_S$ 400 and a salt, wherein the salt is stored by the customer device 100 to verify that the private key $K_S$ 400 has been recovered correctly. In an alternate embodiment, a salted hash of the private key $K_S$ 400 is stored by the customer device 100 and is used for verification. In still another embodiment, the public key $K_P$ 403 is stored on the customer device 100 and is used to verify the correct decoding of the private key $K_S$ 400.

In some embodiments, the customer device 100 generates a second pair of public-private keys, $K_{WS}$ and $K_{WP}$, during initialization. As with the first public key $K_P$ 403, the second public key $K_{WP}$ is provided to the secure payment system 101. A public key certificate may be issued for the second public $K_{WP}$ in the same manner as it was for the first public key $K_P$ 403. However, the second private key $K_{WS}$ is not split or encrypted, but rather stored in plaintext form on the customer device 100. When the transaction details 408 fulfill certain requirements, such as the payment amount being less than a certain amount, the second private key $K_{WS}$ is used to sign a transaction authorization message 409 without requiring the user to input an authenticating input A 405. In some embodiments, the requirements for a transaction to be authorized with the second private key $K_{WS}$ are specified by the user. In some embodiments, the secure payment system 101 determines which of the two private keys with which to sign the transaction authorization message 409. The secure payment system 101 can determine whether or not to use the second private key $K_{WS}$ based on a risk level of the transaction. The risk level may be based on various features of the transaction, such as the amount, merchant, location of merchant, and so forth. In some embodiments, the message in which the customer device 100 sends the hash of the authenticating input g 406 to the secure payment system in order to obtain the private fragment key $K_{SB}$ 402 is signed by the second private key $K_{WS}$. In some embodiments, the request for payment details corresponding to a transaction ID can be signed with the second private key $K_{WS}$. In this manner, spurious authentication attempts or attempts to receive transaction details can be prevented.

Distributed Authorization

Figure 5:
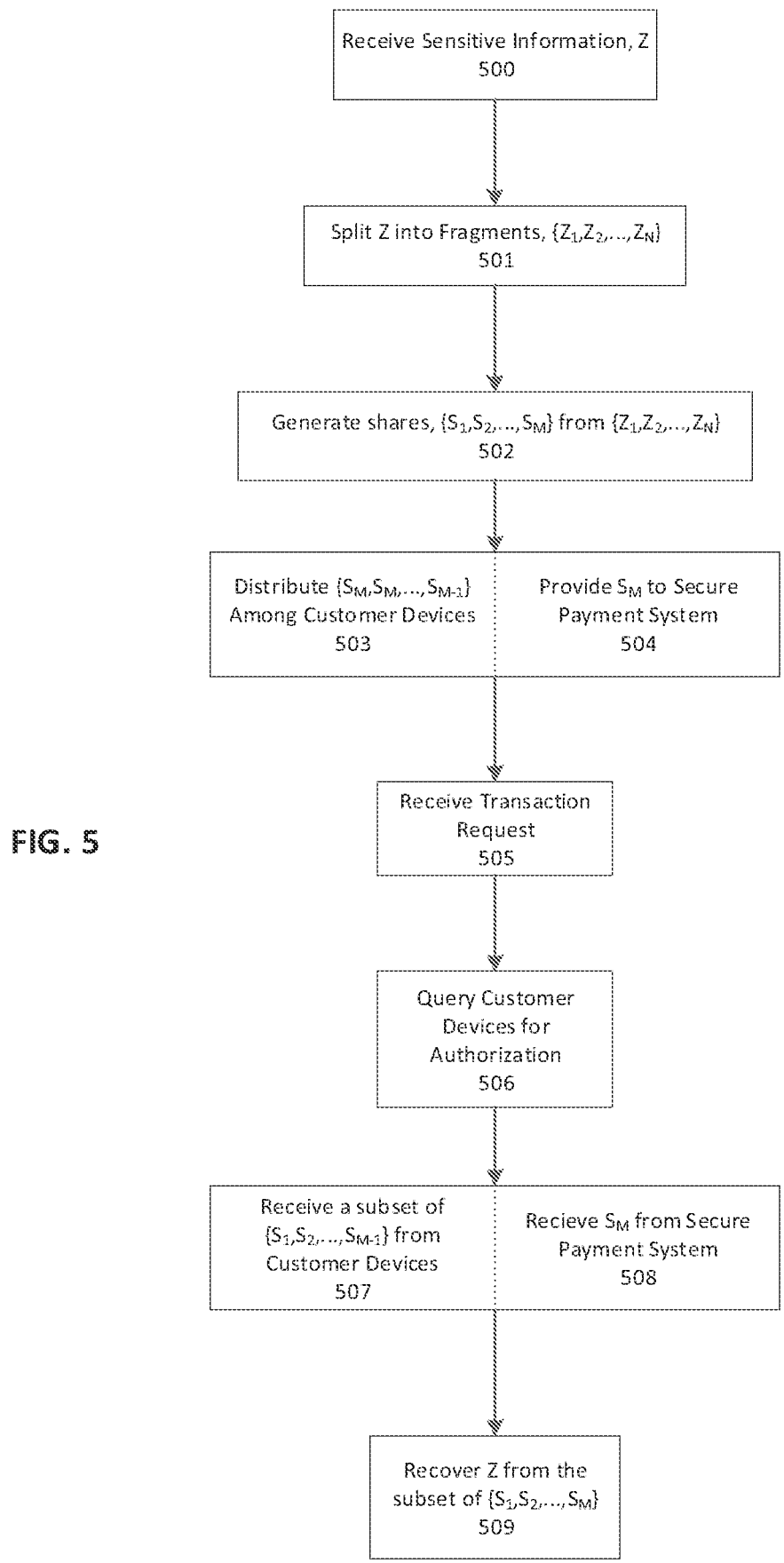
FIG. 5 is a block diagram illustrating a method for receiving sensitive information, generating shares of the information, distributing the shares among a plurality of devices, and recovering the sensitive information from a subset of the shares.

FIG. 5 shows an embodiment which supports a distributed authorization scheme in which sensitive data, Z, is split into N fragments which are distributed among a plurality of customer devices and the secure payment system 101. In this manner access to some subset of the fragments is required to reconstruct the sensitive information, Z. In some embodiments, the sensitive data Z is at least one of the payment information C 200 or the private key $K_S$ 400. The sensitive information, Z, is received 500 by one of a customer device and the secure payment system 101. The sensitive information, Z, is then split 501 into N fragments, $\{Z_1, Z_2, \ldots, Z_N\}$ by the device that received the sensitive information. A set of M shares, $\{S_1, \ldots, S_M\}$ is generated 502 from the set of fragments, wherein each share contains a subset of the fragments (i.e., $S_i \subseteq \{Z_1, \ldots, Z_N\}$ for all $i \in \{1, \ldots, M\}$). In some embodiments, M=N and each share contains exactly one fragment (in this case the step of creating shares in unnecessary and the fragments can be treated as shares). In another embodiment, N=M and at least one fragment is contained in two or more shares and at least one share contains two or more fragments. In other embodiments, N>M and at least one share contains more than one fragment. In another embodiment, N<M and at least two shares contain an identical fragment. In the embodiment shown in FIG. 5, M−1 of the shares, $\{S_1, S_2, \ldots, S_{M-1}\}$, are distributed 503 among M−1 customer devices (one share for each customer device) and one share, S, is provided 504 to the secure payment system 101. In an alternate embodiment, all of the shares are distributed among M customer devices and no share is provided to the secure payment system 101.

After the shares are distributed, a transaction is initiated and a decoding device receives 505 a transaction request. The decoding device can be one of the customer devices that was issued a share, the secure payment system 101, a different customer device, or some other device or system. The decoding device can query 506 the customer devices that have a share for authorization by issuing a request for shares to all of the customer devices (or at least some of them) and the secure payment system 101. In some embodiments, when a customer device receives a request for a share, a request for authorization is displayed to the user of the customer device, and, responsive to authorization, the customer device's share is sent to the decoding device. Once some subset of the shares are received 507 from the customer devices and a share is received 508 from the secure payment system 101, the sensitive information, Z, can be recovered 509 from the fragments, $\{Z_1, \ldots, Z_N\}$. In the case where the decoding device receives its own share, receiving is synonymous with loading from a memory. The fragments are taken from the received shares to form a subset of the set of fragments, $\{Z_1, \ldots, Z_N\}$.

Only certain subsets of the set of fragments can be used to recover the sensitive data, Z. Exactly what subsets of $\{Z_1, \ldots, Z_N\}$ are suitable for decoding will depend on the scheme that was used to split the sensitive data. Consequently, only certain subsets of the set of shares, $\{S_1, \ldots, S_M\}$, are suitable for recovering the sensitive data, Z. Exactly which subsets of the set of shares are valid will depend on the scheme that was used to split the sensitive data and the way that the fragments are allocated among the shares. In principle, the sensitive data can be split into fragments and allocated to shares in such a way so that any desired combination of shares can be valid. In some embodiments, a user is allowed to provide instructions which will determine which combinations of shares are capable of providing authorization for the transaction. The device which splits the sensitive data, Z, and allocates the data among the shares can receive these instructions and generate the shares accordingly. For example, a user can select that the authorization of a user A is required for a transaction and that the authorization from only one of users B and C is required for a transaction. The splitting device can generate and distribute shares such that if users A and B provide their shares or users A and C provide their shares to the secure payment system 101, then the secure payment system 101 is able to recover the payment information C 200 and proceed with the transaction. In some embodiments, all the shares, including the share distributed to the secure payment system 101, (i.e., $\{S_1, \ldots, S_M\}$ are hierarchically equivalent (i.e., any subset of the shares with p or more shares can be used to recover Z, but any subset with less than p shares cannot be used to recover Z). In such an embodiment, the decoding device can recover Z after receiving p shares, where one of the p shares can be provided by the secure payment system 101 and where p≤M. In some embodiments, the sensitive data Z cannot be decoded without the share distributed to the secure payment system 101 (i.e., $S_M$). In some embodiments, the sensitive data is payment information C 200 and the secure payment system 101 receives the shares and decodes to recover the payment information C 200.

Customer Device

Figure 6:
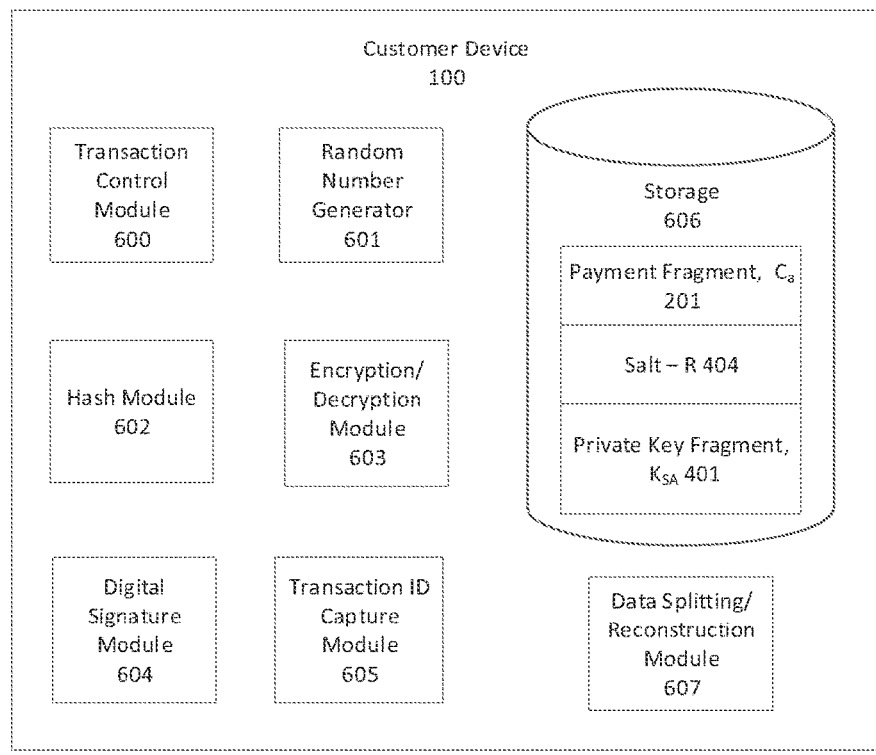
FIG. 6 is a block diagram of a customer device in accordance with some embodiments.

FIG. 6 shows an embodiment of the customer device 100. The customer device 100 comprises a transaction control module 600, a random number generator 601, a hash module 602, an encryption/decryption module 603, a digital signature module 604, a transaction ID capture module 605, a storage 606, and a data/splitting reconstruction module 607.

The transaction control module 600 contains the primary logic that facilitates the transaction at a high level. It provides and receives data to and from the other modules on the customer device 100. It also instructs the storage 606 to store or load data. It includes an interface for sending and receiving data through the network 104. The interface for sending and receiving data can utilize transport layer security such as is provided by a SSL (Secure Socket Layer) connection.

The random number generator 601 is a module which generates numbers randomly and can operate via random or pseudo-random processes. In one embodiment, a seed of a cryptographically secure pseudo-random number generator is generated using a hardware random number generator, and the pseudo-random number generator is used to produce numbers. The random number generator 601 can produce elements such as random numbers, salts, symmetric encryption keys, initialization vectors, and private-public key pairs. The random number generator 601 can be composed of multiple random number generators.

The hash module 602 is capable of mapping inputs to an output of a fixed bit-length, called a hash. The hash module 602 employs a one-way, cryptographically secure hashing function to map inputs to hashes. A hash is a string of bits or characters of a set length. The hash functions implemented by the hash module 602 can take a single input or multiple inputs. In some embodiments, a hash function takes in two inputs: a value and a seed. The hash module can employ a single hash function or multiple hash functions.

The encryption/decryption module 603 is used to encrypt or decrypt data using encryption keys. The encryption/decryption module 603 can encrypt using a symmetric encryption scheme or an asymmetric scheme. The encryption/decryption module can utilize symmetric schemes such as Twofish, Serpent, AES, Blowfish, CAST5, RC4, 3DES, Skipjack, Safer+/++, and IDEA, or any other symmetric encryption algorithm. The asymmetric encryption scheme can comprise RSA, Diffie-Hellman, DSS (Digital Signature Standard), ElGamal, any elliptic curve techniques, Paillier, Cramer-Shoup, YAK, or any other private-public key encryption scheme.

The digital signature module 604 is used to cryptographically sign a message. The digital signature module 604 may use a hashing algorithm and an encryption algorithm to create a signature, and may use the hash module 602 and encryption/decryption module 603 for these respective purposes. The digital signature module 604 signs a message with a private key (e.g., $K_S$ 400). The signed message can then be verified by any system with access to a public key (e.g., $K_P$ 403), wherein the public key corresponds to the private key. The private key-public key pair can be produced by the random number generator 601. The digital signature module 604 can sign the message via the RSA cryptosystem, the Digital Signature Algorithm (DSA), or any other public-private key cryptosystem suitable for cryptographic signing. In some embodiments, the transaction authorization message 409 is hashed to produce a hash. The hash is then encrypted with the private key $K_S$ 205. The encrypted hash is the signature and is appended to the transaction authorization message 409, which is then considered signed. A system with access to the public key can decode the signature portion to receive the hash and hash the message portion to receive a second hash, which will match the first hash if the signature is valid.

The transaction ID capture module 605 is a module used to receive a transaction ID from a merchant 103. One means of receiving a transaction ID from a merchant 103 is by scanning a merchant-provided QR code, where a QR code is a two-dimensional barcode that can be parsed by a machine vision system. In alternate embodiments, the transaction ID capture module 605 reads an alternate type of barcode, or any kind of encoded data format that can be parsed via a machine vision system. In some embodiments, the QR code scanner is able to read multiple types of barcodes. The transaction ID capture module 605 can scan an image, via a digital camera. Scanning an image can constitute capturing a single image or continuously sampling images until the machine vision system is able to decode the data encoded in the QR Code. In some embodiments, a QR code is presented to the customer by the merchant 103 via a display screen. The customer device 100 scans the QR code to extract the transaction ID, which it then provides to the secure payment system 101 to receive the transaction details corresponding to the transaction ID. In alternate embodiments, the transaction ID is displayed by the merchant 103 as a number, code, or passphrase via a display screen and the customer types the transaction ID into the customer device 100, which is received by the transaction ID capture module 605. In another embodiment, the transaction ID capture module 605 receives the transaction ID from the merchant 103 through a short-range wireless communication technology such as NFC, Bluetooth, or BLE (Bluetooth Low Energy). In some embodiment, when the transaction is taking place in a virtual online marketplace, which is being accessed on the customer device 100 through a browser or shopping application, the transaction ID is provided automatically to the transaction ID capture module 605. In some embodiments, a user can select between a variety of methods to receive a transaction ID.

The storage 606 stores information for the customer device 100. The storage 606 contains non-volatile memory, but can also contain volatile memory. The storage 606 stores the first payment fragment $C_a$ 201, a salt R 404, and the private key fragment $K_{SA}$ 401. During a transaction, the first payment fragment $C_a$ 201 is sent to the secure payment system 101, where it combined with $C_b$ 202 to regenerate the payment information C 200 which is then provided to the payment processor 102. The salt, R 404, is used during a transaction, along with an authenticating input A 405, to generate a hash g 406, via the hash module 602. The hash g 406 is used to authenticate the user to the secure payment system 101. The private key fragment $K_{SA}$ 401 is used along with the second private key fragment $K_{SB}$ 402 to generate the private key fragment $K_S$ 400 which is used to sign 421 a transaction authorization message 409, which establishes that the user authorized the transaction. In some embodiments, the customer device 100 receives the second private key fragment $K_{SB}$ 402 from the secure payment system 101 only after providing the hash g 406 or the authenticating input A 405 to the secure payment system 101 for authentication.

The data splitting/reconstruction module 607 is used to split sensitive data into a set of data fragments. The sensitive data that is split into different fragments can be payment information C 200 or a private signing key $K_S$ 400. Splitting data and storing the data fragments on two different systems (e.g., the customer device 100 and the secure payment system 101) will require an attacker to compromise both systems in order to gain access to the data. The data splitting/reconstruction module 607 also can perform the inverse operation, which comprises taking the fragments (or a subset of the fragments) and recovering the sensitive data from them.

Secure Payment System

Figure 7:
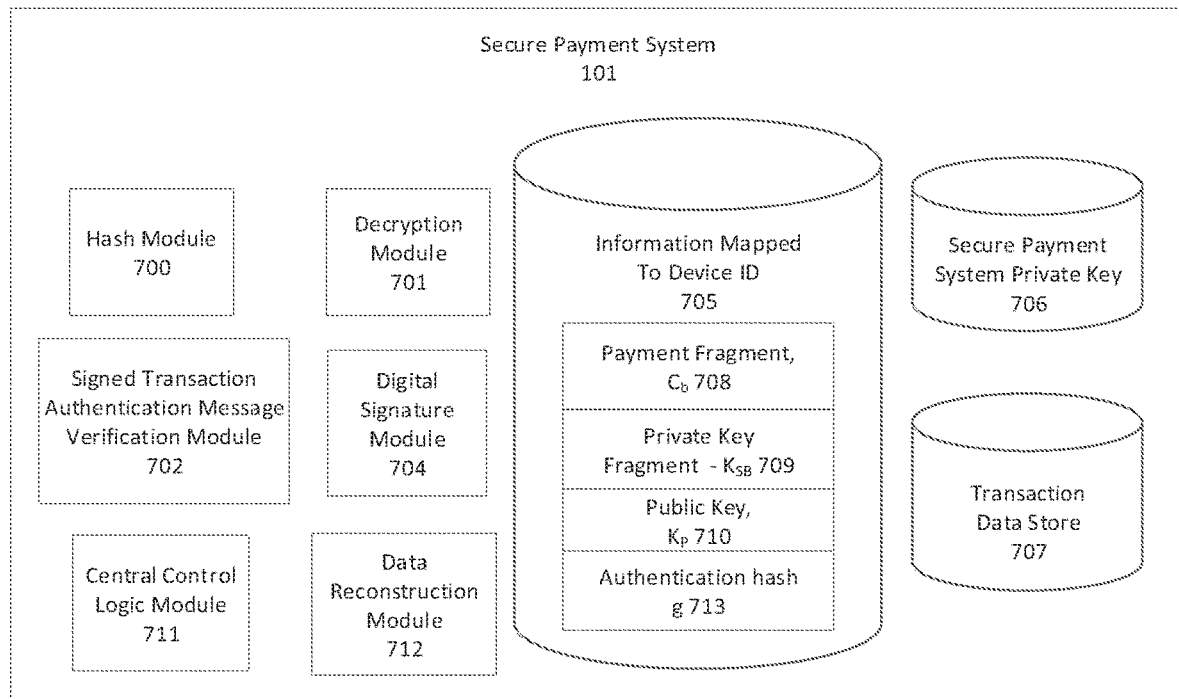
FIG. 7 is a block diagram of a secure payment system in accordance with some embodiments.

FIG. 7 depicts an embodiment of the secure payment system 101, which comprises a hash module 700, a decryption module 701, a signed transaction authorization message verification module 702, a digital signature module 704, information mapped to device ID 705, a secure payment system private key 706, a transaction data store 707, a central control logic module 711, and a data reconstruction module 712. In some embodiments, the secure payment system 101 may be a server.

The hash module 700 fulfills a similar function to the hash module 602 of the customer device 100. It implements the same hashing functions as those that are implemented by the customer device 100.

The signed transaction authorization message verification module 702 verifies the signed transaction authorization message 410 that is received from the customer device 100 in the course of a transaction. The signed transaction authorization message 410 is verified using the public key $K_P$ 710. In some embodiments, the signed transaction authorization message 410 constitutes a message portion and a signature portion. The signature portion is the result of encrypting a hash with the private key $K_S$ 400 of the customer device 100, wherein the hash is the hashed message portion. In this embodiment, the public key $K_P$ 710 is used by the decryption module 701 to decode the signature to recover the hash. The message portion of the signed transaction authorization message 410 is hashed with the hash module 700 to produce a second hash. If and only if the signature is correct, then the decoded hash and the second hash should match exactly.

The digital signature module 704 is used to cryptographically sign messages by the secure payment system 101. The messages can be signed with the secure payment system private key 706. The secure payment system 101 can provide the public key that corresponds to the secure payment system private key 706 to the merchant 103 or to customers, which would allow them to verify a message signed by the digital signature module 704. In one embodiment, the signed transaction authorization message 410, which was signed by the customer device 100, is signed a second time using the digital signature module 704 to create a doubly-signed transaction authorization message. Providing this doubly-signed transaction authorization message to the merchant 103 will establish non-repudiation from both the secure payment system 101 and the customer device 100. In some embodiments, the public key certificate for the public key $K_P$ 403 is included with the signed or doubly-signed transaction authorization message. In one embodiment, the transaction details 408 that are sent to the customer device 100 are signed with the digital signature module 704. A receipt can be provided to the customer device 100 after the transaction has been processed by the payment processor 102, and this receipt can also be signed by the digital signature module 704.

The information mapped to the device ID 705 is stored by the secure payment system 101. In alternate embodiments, the information can be mapped instead to a card ID or a customer ID. The information mapped to device ID 705 can include a payment fragment $C_b$ 708, a private key fragment, $K_{SB}$ 709, and a public key $K_P$ 710. The public key $K_P$ 710 corresponds to the private signing key $K_S$ 400 of the customer device 100. The public key $K_P$ 710 is used to verify signatures originating from the customer device 100. The payment fragment $C_b$ 708 is provided to the secure payment system 101 by the customer device 100 when the payment information is first initialized. The private key fragment $K_{SB}$ 709, the public key $K_P$ 710, and the authentication hash g 713 are provided to the secure payment system 101 by the customer device 100 when the private key is first initialized. The authentication hash g 713 is stored and used by the secure payment system 101 to verify the hash g 406 when it is received from the customer device 100 during a transaction. In some embodiments, if multiple instances of payment information are registered by the device then each instance of payment information will correspond to an instance of a payment fragment $C_b$ 708. For example, if a user has registered two credit cards and a debit card on a device, then the secure payment system 101 will have three instance of a payment fragment, $\{C_{b1}, C_{b2}, C_{b3}\}$, where each payment fragment is mapped to exactly one instance of payment information.

The transaction data store 707 stores a mapping of transaction IDs to transaction details. When a customer device 100 requests the transaction details 408 for a given transaction ID, the transaction data store 707 is queried to locate these transaction details 408. The transaction data store 707 can also store spatiotemporal information for a transaction, and can require a customer device 100 to include information about its location. The spatiotemporal information can be provided by the merchant 103 along with the transaction details 408. In some embodiments, if the location is not within some bounded geographical area, then the secure payment system 101 will not send the transaction details to the customer device 100. Also, if the timing of the request for transaction details is not within some timeframe, then the secure payment system 101 can reject the request and not send the transaction details 408408. In other embodiments, location and time can be used, along with a transaction ID, to map to different transaction details. For example, a transaction detail request originating in California might map to one set of transaction details, while a transaction detail request originating in Chechnya might map to a different set of transaction details, despite the two requests including the same transaction id. This technique can be used to limit the space of transaction IDs or to prevent attackers from viewing transaction details of someone's transaction by repeatedly guessing transaction IDs.

The central control logic 711 contains the primary logic that facilitates the transaction at a high level. It provides and receives data to and from the other modules on the secure payment system 101. It issues instructions for storing or loading data. It includes an interface for sending and receiving data through the network 104. The interface for sending and receiving data can utilize transport layer security such as is provided by a SSL (Secure Socket Layer) connection. The data reconstruction module 712 recovers sensitive data, such as payment information C 200, from received shares (e.g., $C_a$ 201 and $C_b$ 202).

Initializing the Customer Device and Secure Payment System

FIGS. 8A and 8B show a timing diagram illustrating the initialization of a secure payment system 101 and a customer device 100 and a single transaction being processed by the secure payment system 101 and the customer device 100 in accordance with some. FIGS. 8A and 8B show one embodiment, and any ordering of steps is shown for illustrative simplicity only, and, as such, is not intended to limit the scope of the present disclosure to any specific order of steps. Unless otherwise noted, steps shown to take place in a certain order can also take place in a reversed order or simultaneously, in alternate embodiments. Note that in FIGS. 8A and 8B, boxes denote functional blocks while arrows denote the transmission of data (although transmission of data can be incorporated into the functional blocks as well). Receiving data from a user can comprise allowing a user to type in the data as an input to the customer device 100. Sending data to a user can comprise displaying information on the screen of the customer device.

The timing diagram consists of two main phases: an initialization phase and a transaction phase. In this example, the initialization phase happens prior to the transaction phase. The initialization phase comprises initializing 801 and storing the customer's private encryption key for signing and storing 802 the payment information C 200. Although FIGS. 8A and 8B only show one instance of storing 802 the input payment information, this step could happen multiple times for a multiplicity of different payment methods. For example, a customer can be allowed to input multiple credit or debit card numbers. In the embodiment shown in FIGS. 8A and 8B, storing 802 input payment information and initializing and storing 801 the customer's private encryption key for signing are logically isolated, so the input payment information can be stored after initializing the customer's private encryption key or the two steps can happen simultaneously, via two asynchronous threads.

Initializing 801 and storing the customer's private encryption key for signing involves generating a private key $K_S$ 400, and mapping its corresponding public key $K_P$ 403 to a device ID 813 in the secure payment system 101. One embodiment of the steps for initializing 801 and splitting the customer's private encryption key is shown in FIG. 4A.

Storing 802 input payment information comprises receiving payment information C 200 on the customer device 100, splitting the payment information C 200 and storing the fragments. Payment information C 200 is received on the customer device 100 from the user. The customer device 100 generates 809 a random salt S 820, a salted hash h 810, and two payment fragments, $C_a$ 201 and $C_b$ 202. The salt S 820 is generated randomly and can be generated prior to, or while, receiving the payment information C 200. The salted hash h 810 is generated by combining the salt S 820 and one of the payment information C 200 or the first payment fragment $C_a$ 201 via a one-way hashing function. The two payment fragments, $C_a$ 201 and $C_b$ 202, are generated by splitting the payment information C 200. The salted hash h 810, the salt S 820, and the second payment fragment $C_b$ 202 are sent to the secure payment system 101, which stores 813 them. The first payment fragment $C_a$ 201 is stored 811 on the customer device 100 while the salted hash h 810, the second payment fragment $C_b$ 202, and the salt S 820 are deleted 812 from the volatile and non-volatile memory of the customer device 100. In some embodiments, the payment information C 200 or the first payment fragment $C_a$ 201 is sent to the secure payment system 101 to verify that the payment information C 200 is valid, by, for example, processing a zero-sum transaction. In some embodiments, the payment information fragments, $C_a$ 201 and $C_b$ 202, contain the salt S 820 (e.g. $C_a \otimes C_b$ returns the payment information C 200 appended to the salt S 820). In this case, the salt S 820 may not be separately sent to the secure payment system 101. In some embodiments, the hash h 810 is not sent to the secure payment system 101 and instead is included in $C_a$ and $C_b$ (e.g., $C_a \otimes C_b = C|h$, where "|" denotes concatenation).

Processing a Transaction

After the customer device's private key fragments, $K_{SA}$ 401 and $K_{SB}$ 402, and at least one payment method are initialized, the customer device 100 and the secure payment system 101 can process a transaction. Some embodiments support delayed transactions and recurring transactions or requiring authorization from multiple customer devices to process a transaction. A transaction can include the following steps: receive 803 transaction details, generate 804 a signed transaction authorization message, provide 805 the payment information C 200 to the secure payment system 101, process 806 the transaction, and provide 807 the receipt to the customer device 100 and the signed transaction authorization message 410 to the merchant 103. Some of these steps can be performed in a different order than is shown in FIGS. 8A and 8B. Also, some steps can be performed simultaneously.

Receiving 803 transaction details constitutes receiving transaction details 408 on a customer device 100 from a merchant 103 through a secure payment system 101. The secure payment system 101 receives 841 transaction details 408 from a merchant 103 and provides 842 the merchant 103 with a transaction ID 808. The transaction ID 808 is received 843 via user input into the customer device 100 from the merchant 103 through any number of methods, which are described elsewhere in the specification. The transaction ID 808 is then sent to the secure payment system 101.

The secure payment system 101 responds to the transaction ID 808 with transaction details 408. In the embodiment shown in FIGS. 8A and 8B, these transaction details 408 are the same as the transaction details 408 provided to the secure payment system 101 by the merchant 103. However in some embodiments, the secure payment system 101 modifies the transaction details 408 prior to sending them to the customer device 100. The transaction details 408 are then displayed via a display of the customer device 100, for the user 810 to review. In some embodiments, the merchant 103 provides the transaction details 408 instead of, or along with, the transaction ID 808, rather than requiring the customer device 100 to fetch the transaction details 408 from the secure payment system 101.

Generating 804 a signed transaction authorization message 410 constitutes creating and sending a message from the customer device 100 to the secure payment system 101 which is signed using a private encryption key, $K_S$ 400, that can only be obtained by the customer device 100 by providing the secure payment system 101 with a hash g 406 generated from the correct authenticating input A 405. One embodiment of the steps for generating 804 a signed transaction authorization message 410 by reconstructing the customer's private encryption key $K_S$ 400 from the private key fragments, $K_{SA}$ 401 and $K_{SB}$ 402, is shown in FIG. 4B.

Providing 805 the payment information C 200 to the secure payment system 101 constitutes recovering and sending the payment information C 200 to the secure payment system 101. The first payment fragment $C_a$ 201 is loaded 828 on the customer device 100 and sent to the secure payment system 101. The salted hash h 810, the second payment fragment $C_b$ 202, and the salt S 820 are loaded 829 from memory. The secure payment system 101 obtains 830 the payment information C 200 by combining the payment fragments, $C_a$ 201 and $C_b$ 202 (i.e., $C=C_a \otimes C_b$). The secure payment system 101 generates 831 the second salted hash h' via a one-way hash on one of the payment information C 200 and the first payment fragment $C_a$ 201 using the salt S 820. The payment information C 200 can be verified 832 by comparing the values of the two salted hashes, h 810 and h'. The first payment fragment $C_a$ 201 and the second salted hash h' can be deleted 833 from memory. In some embodiments, the customer device 100 only sends the first payment fragment $C_a$ 201 to the secure payment system 101 responsive to receiving the second private key fragment $K_{SB}$ 402. In some embodiments, the secure payment system 101 only sends the payment information C 200 to the payment processor 102 after both verifying the payment information C 200 and receiving and verifying the signed transaction authorization message 410. In some embodiments, the payment fragment $C_a$ 201 and the signed transaction authorization message 410 are sent from the customer device 100 to the secure payment system 101 together or in the same SSL session.

Processing 806 the transaction constitutes sending an instruction to pay with the payment information 834 to the payment processor 102. The payment processor 102 then processes 835 the transaction with whatever financial institution is associated with the payment information C 200. The payment processor 102 then sends a notification that the payment has been processed 837 to the secure payment system 101. The payment processor 102 can include information about the transaction in this notification or send transaction information directly to the customer device 100. After sending the instruction to pay with the payment information C 200, the secure payment system 101 can delete 836 the payment information C 200 from memory.

The secure payment system 101 can provide 807 a signed receipt 838 to the customer device 100 and a signed transaction authorization message 410 to the merchant 103. The signed receipt 838 can include information from the transaction details 408 or information from the payment processor 102 regarding the transaction. This receipt is signed with the secure payment system's private key 706. After generating 839 the signed receipt 838, the signed receipt 838 is sent to the customer device 100. The signed transaction authorization message 410, which was originally received from the customer device 100, is provided 840 to the merchant 103. In some embodiments, the secure payment system 101 signs the signed transaction authorization message 410 with its private key 706 to produce a doubly-signed transaction authorization message, which is then sent to the merchant 103. This doubly-signed transaction authorization message establishes nonrepudiation for both the customer device 100 and the secure payment system 101. In some embodiments, a public key certificate corresponding to the public key $K_P$ 403 is included along with the signed or doubly-signed authorization message.

Recurring Payments

Some merchants may need to charge the customer in a recurring fashion, either because they are a subscription business or because the customer has given them authorization to store and charge their cards for all future services or goods sold. In some embodiments, a user 810 with a customer device 100 can accept a recurring transaction, which will enable a merchant 103 to initiate recurring payments without needing access to the payment information C 200 of the customer.

To initialize a recurring payment, the merchant 103 can send a request for a transaction to the secure payment system 101 and specify that this is a request for a recurring payment. When the transaction details 408 are received by the customer device 100, the transaction details 408, including the fact that this transaction is recurring, is displayed to the user 810 and authorization of the recurring transaction is requested. The merchant 103 may optionally provide parameters to define bounds on the transaction, such as a maximum amount that can be charged during any one time or a minimum amount of time between recurring transactions. The user may be allowed to define bounds on the transaction as well. These bounds, other details of the transaction, and an indication that this is a recurring transaction can be displayed to the user 810. Responsive to the user authorizing the transaction, the secure payment system 101 generates a unique token identifying this transaction and sends it to the merchant 103, which stores the token. The original transaction ID 808 itself could be embedded in the token.

The merchant 103 can then request a payment, specifying the exact amount, using the token. In some embodiments, the merchant 103 defines, in the request for the recurring transaction, future times and amounts for a transaction, so that transactions are processed automatically by the secure payment system 101, without requiring input from the merchant 103. In some embodiments, every time the server gets a request from the merchant 103 for a recurring payment, a message is sent to the customer device 100 requesting authorization for the transaction, along with the exact payment amount. If the customer provides authorization by typing an authenticating input A 405, the payment fragment $C_a$ 201 is retrieved and sent to the secure payment system 101 along with a signed transaction authorization message 410. The transaction is then processed by the secure payment system 101 and payment processor 102. This method can be extended in a similar fashion to require authorization and payment fragments from a plurality of customer devices, rather than just one.

In another embodiment, before sending the token to the merchant 103, the secure payment system 101 receives the first payment fragment $C_a$ 201 from the customer device 100 and generates a new pair of payment fragments, $C_c$ and $C_D$. In some embodiments, $C_c$ and $C_D$ are generated by the secure payment system 101 by generating the payment information C 200 from the first two payment fragments, $C_a$ 201 and $C_b$ 202, and splitting it. In another embodiment, $C_c=X_1 \otimes C_a$ and $C_D=X_2 \otimes C_b$ where $X_1$ and $X_2$ are random numbers with the property that $X_1 \otimes X_2=0$. $C_c$ can be sent to the merchant 103 as part of the token and deleted from the secure payment system 101 and $C_d$ can be stored by the secure payment system 101. In some embodiments, $C_c$ is generated prior to receiving the first payment fragment $C_a$ 201 from the customer device 100 and once the secure payment system 101 receives the first payment fragment $C_a$ 201, the system can generate and store $C_d$.

After authorization for the recurring transaction is provided, the recurring transaction can be processed automatically by reconstructing the payment information C 200 from $C_c$ and $C_D$ when the token is received from the merchant 103 without requiring communication with the customer device 100 or further authorization from the user 810. In some embodiments, the secure payment system 101 includes $C_c$ in the token sent to the merchant 103 only when the signed transaction authorization message 410 that authorizes the recurring transaction contains an automatic payment processing tag. In some embodiments, a user can choose whether or not this automatic payment processing tag is included in the signed transaction authorization message 410 when the recurring transaction is being initialized. In some embodiments, a new payment fragment $C'_c$ is sent to the merchant 103 in a new token and a new payment fragment $C'_d$ is stored on the secure payment system 101 whenever a transaction is processed. The old token, and the old payment fragments, $C_c$ and $C_d$, can be invalidated. The secure payment system 101 can delete the old payment fragment, $C_d$. The new payment fragments, $C'_c$ and $C'_d$, can be generated by splitting the payment information C 200 or by an updating operation such as: $C'_c = C_c \otimes X_1$ and $C'_d = C_d \otimes X_2$ where $X_1$ and $X_2$ are random numbers which have the property that $X_1 \otimes X_2 = 0$. These new payment fragments, $C'_b$ and $C_d$, can be used to process the transaction in the same way that the old payment fragments, $C_c$ and $C_d$, were used. In some embodiments, the user of a customer device 100 can send a message to the secure payment system to cancel the authorization, in which case the secure payment system 101 will delete the payment fragment $C_c$ and, in some embodiments, send a message to the merchant 103 that the authorization for the transaction has been rescinded.

The techniques used to facilitate recurring transactions can be modified to facilitate other types of transactions, such as capture authorization only transactions, transactions that can be cancelled, and refundable transactions. An authorization only transaction (i.e., a transaction in which payment occurs significantly later than the authorization of the transaction) can be performed using the same steps as a recurring payment, except that after the transaction has been performed once the secure payment system will delete its payment fragment $C_d$. The payment collected by the merchant 103 should be less than or equal to an amount for which the transaction was authorized. A merchant can also allow for a transaction to be refunded after it is processed. The merchant 103 can store a token containing a payment fragment $C_c$ which corresponds to a payment fragment stored in the secure payment system 101 ($C_a$). The merchant 103 can send the token to the secure payment system 101, which processes the refund via the payment processor 102. Thus, a merchant may receive a payment fragment associated with any given desired transaction (i.e., recurring payment, cancelation, refund, etc.). This permits the merchant's fragment for a transaction to be required for the secure payment system to use the payment information, while permitting the secure payment system to prevent undesired authorizations by requiring authorization for the transaction and, when required, deleting the corresponding payment fragment at the secure payment system 101.

Redirected Payments

An option can be provided for allowing a first user, using a first user device, to request for a second user, using a second user device, to facilitate a transaction. For example, a parent may want to allow a child to pay using the parent's card. In one embodiment, a first user (e.g., a child) initiates a payment by scanning a QR code or other means to obtain a transaction ID. The transaction ID is then routed to the device of the second user (e.g., the child's parent). In some embodiments, the first user can optionally include a message to further describe the transaction. The second user can authorize the transaction and provide the transaction authorization message 410 and payment fragment $C_a$ 201, as described elsewhere, which will allow the secure payment system 101 to process the transaction.

This may be extended to require approval from more than one person. For example, if the card is a corporate card requiring approval from multiple officials, the request can be routed to multiple officials. In some embodiments, the encrypted payment information needs to come only from one of the customer devices, but the secure payment system 101 requires a consent signature from all of the customer devices, or some subset of the customer devices. In some embodiments, at a request from the secure payment system 101, some subset of the customer devices can provide their respective shares which the secure payment system 101 uses to reconstruct the payment information C 200. In embodiments where location data is used to map transaction IDs to transaction details, the location data can be provided only by the customer device initiating the transaction.

Payment Codes

A payment code is the information that is provided to the customer device 100 by the merchant 103 to enable the customer device 100 to authorize a transaction. The payment code can be the same as the transaction ID or it can be a value mapped to the transaction ID by the secure payment system 101. In some embodiments, long payment codes can be problematic. A short string embedded in a QR code can increase the scan fidelity and improve the scan speed. Also, if the user decides to type the payment code, the shorter the code is, the easier and faster the typing process is. Methods for facilitating short payment codes are described herein.

Payment code length can be reduced by requiring the merchant 103 and the customer mobile devices to identify and disclose their geographic location. This can be done using one or more GPS receivers or by viewing an IP address. When location data is required, a payment code needs only to be unique within some geographical area. When the method of obtaining location data is relatively accurate these areas can be relatively small (e.g., with a GPS receiver, the area can have a 60 meter radius). Also, the payment code needs to be unique only for those transactions that are currently being processed. Payment codes may expire after a short time or after a transaction has been processed and reused for another transaction in future.

The merchant 103 may include the location information in the create-transaction request. The secure payment system 101 can generate a transaction code which is unique to a spatiotemporal area and provide it to the merchant 103. The customer device 100 will also include a current location along with its request for transaction details. The secure payment system 101 can use the combination of location data and payment code to map the customer device's request for transaction details to the correct transaction details 408.

In some embodiments, an option can be provided to remove spatiotemporal restrictions. A merchant 103 can optionally disable the requirement to include location information with a transaction, which can allow for remote or deferred payments. To facilitate remote or deferred payments, the merchant 103 can specify additional flags while creating the transaction. The flags may indicate whether this payment would be a remote or a deferred payment. If it is a deferred payment, the timeframe for which the code should be valid can also be specified. This could enable, for example, a child to call a parent on the phone and give the payment code. The parent could then enter the payment code into a customer device 100, view the payment details, and pay for the child.

In some embodiments, the space of possible payment codes, times, and locations is large compared to the number of valid payment codes, times, and locations. This would prevent a user from viewing payment details spuriously by querying the secure payment system 101 with random payment codes and locations.

Importing Payment Data

In some embodiments, a user is provided with an option to import data from a first customer device to a second customer device. This can save the user the trouble of entering card information or verification information more than once. In one embodiment, a user name and a password is used to track the customer and his devices. A user can create and register a user name and password from the first device and use that same user name and password on the second device. This secure payment system 101 can then associate the data entered by the user on the first device with the second device. The user can be presented with the option of importing information from one of the first device to the second device.

In another embodiment, the user can enter the device ID of the first device onto the second device and request the import. Alternately, the first and second devices can communicate the device ID via Bluetooth, NFC, ANT, WiFi, or BLE. In another embodiment, a user can enter the phone number of one of the devices into the other device. Any of these methods are suitable to allow the secure payment system 101 to associate the first and second device.

The second device can generate a private key, split it using aforementioned methods, and link it with an authenticating input. This authenticating input does need to be the same as that of the first device. In some embodiments, the private key of the second device is different than that of the first and the secure payment system 101 issues a new transaction public key certificate for the second device. In another embodiment, the first device provides the secret key $K_S$ 400 through the secure payment system 101 or directly to the second device. The public key certificate can be reissued by the secure payment system 101 to include the new device ID.

The secure payment system 101 can send a message to the first device requesting the import of data. The customer can authorize the import of data by entering the authenticating input A 405 on the first device. Responsive to authorization, the private key $K_S$ 400 of the first device is regenerated as described above and a message that authorizes the import of data can be generated by the first customer device and signed with the private key $K_S$ 400. The first payment fragment $C_a$ 201 can be sent to the secure payment system 101 as well.

The secure payment system 101 can verify the signature of the message that authorizes the import of data with the public key $K_P$ 403. The secure payment system 101 can then generate two more payment fragments, $C_e$ and $C_f$ from the first and second payment fragments, $C_a$ 201 and $C_b$ 202, and provide $C_e$ to the second device and store $C_f$. The payment fragments stored on the payment system 101 can be indexed by the device ID. In an alternate embodiment, $C_a$ is provided to the second device and can be used by both devices to process a transaction.

Authenticating a Transaction Using Personal Identification Number Fragments

Figure 9:
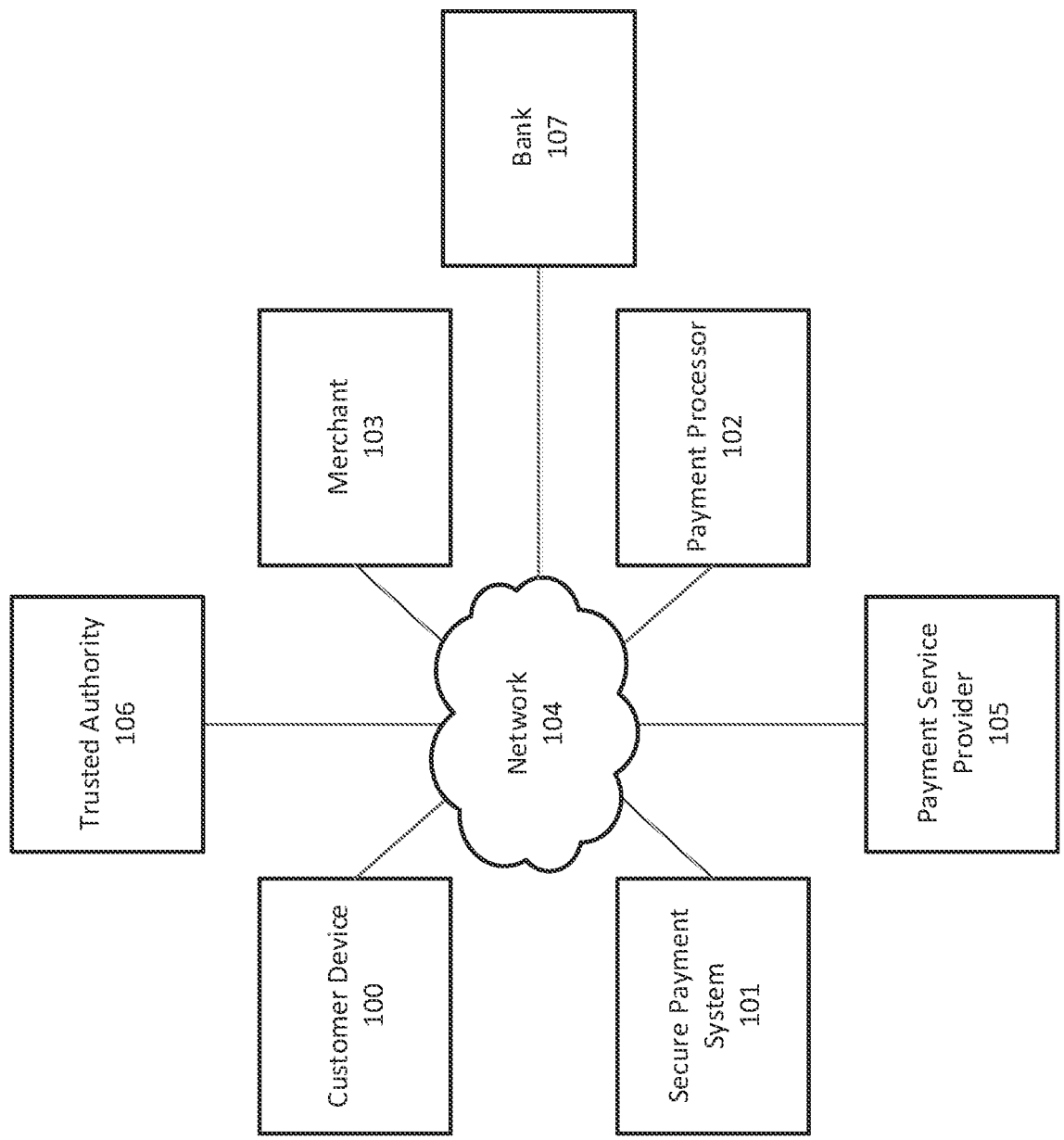
FIG. 9 is a block diagram of a network infrastructure configured to authenticate and authorize transactions in accordance with some embodiments.

FIG. 9 is a block diagram of a network infrastructure configured to authenticate and authorize transactions in accordance with some embodiments. In FIG. 9, the network infrastructure comprises a customer device 100, a merchant 103, a secure payment system 101, a payment processor 102, a payment service provider 105, a trusted authority 106, and a bank 107, all connected via a network 104. In some embodiments, the trusted authority 106 may be a server or a cluster of servers that provides architecture and platform simplifying digital payments by creating single interface and interoperability between entities of FIG. 9, such as the payment service provider 105 and the bank 107. The trusted authority 106 facilitates the use of the customer device 100 (e.g., smartphone) as a primary user device for payment authentication and authorization by a user. For example, a user of the customer device 100 may send and receive payments without sharing financial information, such as bank credentials. The trusted authority 106 facilitates for the transactions to be initiated by payer (push) and/or payee (pull). In some embodiments, the trusted authority 106 implements one or more factors of authentication for each transaction. For example, a transaction may be authenticated using one or more of a mobile phone number and a personal identification number (PIN). The PIN may be associated with a bank account of the user. For example, the PIN may be set as a four digit number or a six digit number. Setting up a PIN may have associated restrictions, such as a minimum or maximum number of digits. The mobile phone number may be verified by the payment service provider 105 during user registration process and in all subsequent transactions of the user. The payment service provider 105 may be an entity providing an online payment service for accepting electronic payments by a variety of payment methods. The payment service provider 105 may connect the customer device 100 to multiple banks 107 and payment networks, such as the trusted authority 106 to facilitate the processing of payment methods. For example, the data sent to and from a payment service provider (PSP) application 901 on the customer device 100 may pass through the payment service provider 105. The bank 107 may be an issuance entity configured to implement an online banking service for authorized users maintaining a bank account with a financial banking institution that is supporting the infrastructure and operation of the bank 107. For example, the bank account may include a checking account, a savings account, a money market account, certificate of deposit (CD) account, a credit card account, etc. In another example, the type of bank account may include a personal bank account, a joint bank account, a business bank account, etc. In some embodiments, the online banking service enables authorized users to handle account management and perform account transactions directly with the bank through the Internet via web, mobile, and/or cloud applications on the one or more customer devices 100. Some of the components of the network infrastructure in FIG. 9 have similar function and form as has been described above with reference to FIGS. 1, 6, and 7, so like reference numbers and terminology have been used to indicate similar functionality.

Figure 10:
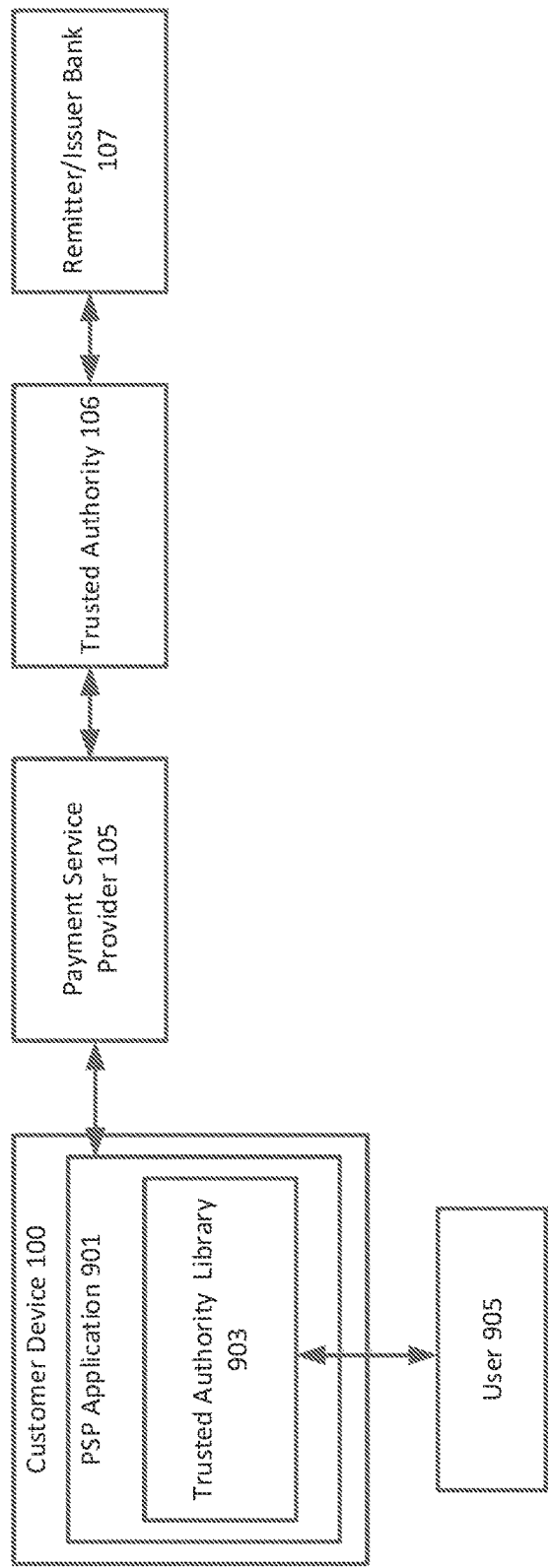
FIG. 10 is a block diagram illustrating an embodiment of a configuration for authenticating a transaction using a PIN.

FIG. 10 is a block diagram illustrating an embodiment of a configuration for authenticating a transaction using a PIN. The customer device 100 implements a payment service provider (PSP) application 901. For example, the PSP application 901 may be associated with the payment service provider 105 and downloaded onto the customer device 100 to enable the user to make and receive a payment. In some embodiments, an application on the customer device 100 that is compliant with the trusted authority 106 or implementing a PSP software development kit (SDK) may enable the user to make and receive a payment. In some embodiments, the parties involved in processing a transaction include the payment service provider 105, a payer, for example, a user 905 in the PSP application 901 who wants to make a payment, a payee, for example, a user 905 who is receiving the payment, a remitter bank 107, for example, a payer's bank from which money is debited, a beneficiary bank 107, for example, a payee's bank to which money gets credited, and the trusted authority 106 facilitating interoperability between the payment service provider 105 and the bank 107.

In order to provide the interoperability and ensure that data is secure during transaction processing, the trusted authority 106 provides a trusted authority library 903. The trusted authority library 903 may be a set of utilities or an application providing an interface to facilitate a communication with the trusted authority 106. For example, the trusted authority library 903 provides an interface to mobile applications (e.g., PSP application 901) for performing both financial and non-financial transactions between banks 107 and payment service providers 105. In some embodiments, the trusted authority 106 provides the trusted authority library 903 to one or more banks 107 on its platform. The bank 107 in turn makes it available to the payment service provider 105 associated with the bank 107 after extreme due diligence. The payment service provider 105 may embed the trusted authority library 903 in the PSP application 901, or in a similar application, through a software development kit (SDK). In some embodiments, the trusted authority 106 provides the trusted authority library 903 to the payment service provider 105 to embed it in the PSP application 901. In some embodiments, the PIN associated with a bank account is handled exclusively by the trusted authority library 903. For example, the trusted authority library 903 is a secure component that may set, reset, or change the PIN from the user 905, encrypt it, and pass it to the PSP application 901. The PSP application 901 may be configured to invoke the trusted authority library 903 based on the parties involved in a transaction and an entity owning the payment service provider 105.

In some embodiments, the trusted authority 106 may facilitate processing of a financial transaction based on any of the following details of a Payee, which may include, but not limited to, a Virtual Payment Address (VPA)—a unique payment address issued by the payment service provider 105 to each customer/merchant in their PSP application 901 (Push and Pull), a unique user identity number (Push), a bank account number and associated routing number (Push), a mobile phone number and a mobile phone identifier given to a user by a bank upon registration (Push), and QR Code (Push). There may be various types of transactions facilitated by the trusted authority 106 using PIN authentication. For example, a transaction may include a person-to-person transaction, a person-to-merchant transaction, and a non-financial transaction.

TABLE I

| S. No | Person-to-Person Transactions | Payer PSP | Remitter Bank | Payee PSP | Beneficiary Bank |
|---|---|---|---|---|---|
| 1 | Two Party model (Push & Pull) | | Entity (1) | | Entity (2) |
| 2 | Three Party Model (Push) | | Entity (1) | Entity (2) | Entity (3) |
| 3 | Three Party Model (Push) | Entity (1) | Entity (2) | | Entity (3) |
| 4 | Three Party Model (Pull) | Entity (1) | Entity (2) | | Entity (3) |
| 5 | Three Party Model (Pull) | | Entity (1) | Entity (2) | Entity (3) |
| 6 | Four Party Model (Push) | Entity (1) | Entity (2) | Entity (3) | Entity (4) |
| 7 | Four Party Model (Pull) | Entity (1) | Entity (2) | Entity (3) | Entity (4) |

For example, Table I illustrates the types of person-to-person transactions facilitated by the trusted authority 106 depending on one or more entities that control or own each of the payment service provider of the payer, the remitter bank, the payment service provider of the payee, and the beneficiary bank. In the transactions illustrated in Table I, a remitter bank may opt not to use PIN authentication offered by the trusted authority library 903.

TABLE II

| S. No | Person-to-Merchant Transactions | Payer PSP | Remitter Bank | Merchant PSP | Beneficiary Bank |
|---|---|---|---|---|---|
| 1 | Three Party Model (Push) | Entity (1) | Entity (2) | Entity (1) | Entity (3) |
| 2 | Three Party Model (Pull**) | Entity (1) | Entity (2) | Entity (1) | Entity (3) |
| 3 | Four Party Model (Push) | Entity (1) | Entity (2) | Entity (3) | Entity (4) |
| 4 | Four Party Model (Pull**) | Entity (1) | Entity (2) | Entity (3) | Entity (4) |

In another example, Table II illustrates the types of person-to-merchant transactions facilitated by the trusted authority 106 depending on one or more entities that control or own each of the payment service provider of the payer, the remitter bank, the payment service provider of the merchant, and the beneficiary bank. In the transactions illustrated in Table II, the pull transactions may be initiated from channels including but not limited to websites, point of sale (POS), mobile applications, etc.

TABLE III

| S. No | Non-Financial Transactions | Payer PSP | Remitter Bank |
|---|---|---|---|
| 1 | Balance Enquiry | | Entity (1) |
| 2 | Balance Enquiry | Entity (1) | Entity (2) |
| 3 | Change UPI PIN | | Entity (1) |
| 4 | Change UPI PIN | Entity (1) | Entity (2) |
| 5 | Forgot UPI PIN | | Entity (1) |
| 6 | Forgot UPI PIN | Entity (1) | Entity (2) |

In another example, Table III illustrates the types of non-financial transactions facilitated by the trusted authority 106 depending on one or more entities that control or own each of the payment service provider of the payer and the remitter bank.

Figure 14:
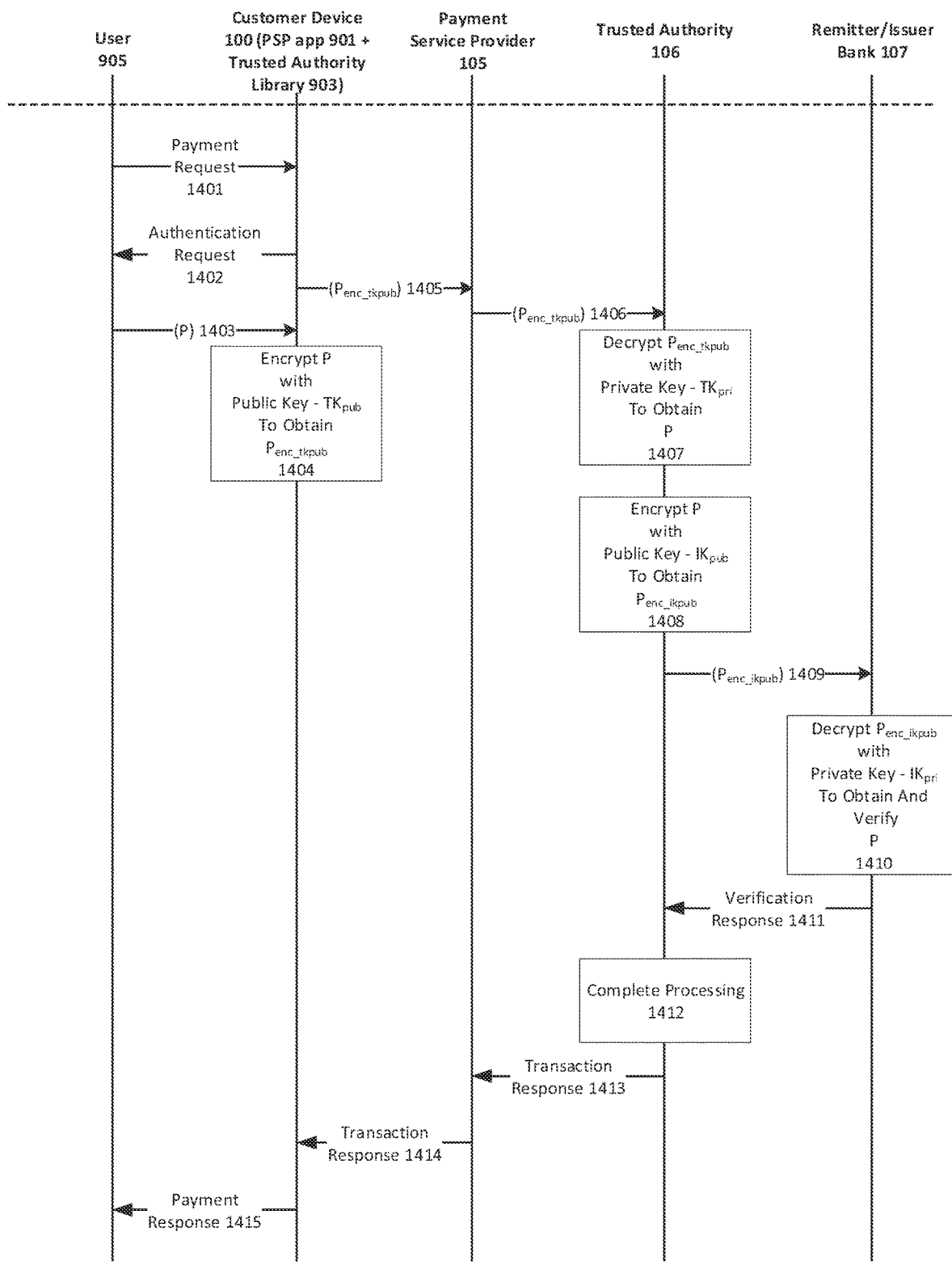
FIG. 14 shows a timing diagram for authenticating a transaction using a PIN in accordance with some embodiments.

FIG. 14 shows a timing diagram for an embodiment of authenticating a transaction using a PIN. The PSP application 901 on the customer device 100 invokes the trusted authority library 903. In some embodiments, the trusted authority library 903 may be used to set up the PIN during user registration on the PSP application 901. The PSP application 901 on the customer device 100 may request the trusted authority library 903 to prompt 1402 the user 905 to authenticate a transaction in response to receiving 1401 a payment request from the user 905. The user inputs the PIN (P) 1403 on the customer device 100. For example, the trusted authority library 903 generates a page on a display of the customer device 100 for the user to enter P. The trusted authority library 903 receives the P from the user 905 and uses public key infrastructure (PKI) to encrypt 1404 the P using a public key ($TK_{pub}$) of the trusted authority 106 to obtain $P_{enc\_tkpub}$. In some embodiments, the $TK_{pub}$ may be stored locally in the trusted authority library 903. In some embodiments, the $TK_{pub}$ may be received from the trusted authority 106. The trusted authority library 903 in the customer device 100 provides $P_{enc\_tkpub}$ to the PSP application 901. The PSP application 901 in the customer device 100 sends 1405 the $P_{enc\_tkpub}$ over the secure network or channel to the payment service provider 105, which then routes 1406 the same to the trusted authority 106 over the secure network or channel.

The trusted authority 106 decrypts 1407 the $P_{enc\_tkpub}$ using a private key ($TK_{pri}$) of the trusted authority 106 to obtain P. The trusted authority 106 then encrypts 1408 the P using a public key ($IK_{pub}$) of the issuing bank 107 to obtain $P_{enc\_ikpub}$. The trusted authority 106 sends 1409 the $P_{enc\_ikpub}$ over the secure network or channel to the issuing bank 107. The issuing bank 107 decrypts 1410 the $P_{enc\_ikpub}$ using a private key ($IK_{pri}$) of the issuing bank 107 to obtain P and verifies that P is correct. The issuing bank 107 sends 1411 a response based on verifying that P is correct over the secure network or channel to the trusted authority 106. The trusted authority 106 completes 1412 processing the transaction with other participating entities and sends 1413 a response indicating successful completion of the transaction over the secure network to the payment service provider 105, which then routes it to the PSP application 901 on the customer device 100 over the secure network. The customer device 100 provides 1415 the user 905 with a payment response.

In some embodiments, the trusted authority 106 may facilitate authenticating a transaction using biometric authentication on the customer device 100. For example, the biometric authentication may be used to replace the PIN as the second factor of authentication for transactions using PIN tokenization. The biometric authentication of transactions may be performed based on public key cryptography. Example biometric information of the user that may be captured for authenticating transactions may include fingerprint, iris, facial, voice, palm print, etc. In some embodiments, the biometric authentication may be a closed-loop biometric authentication or performed on devices other than the customer device 100, such as an ATM kiosk, a hand-held point of sale (POS) device at a merchant, a discrete biometric sensor connected to a computer, etc.

In some embodiments, performing biometric authentication on the customer device 100 for authenticating transactions requires onboarding of the PSP application 901 and each VPA or bank account number that needs to enabled for biometric authentication. Once the PSP application 901 and a VPA or bank account have been onboarded successfully, subsequent transactions that would have been authenticated by a PIN for the VPA or bank account in the PSP application 901, may now be authenticated using on-device biometrics on the customer device 100.

Figure 11:
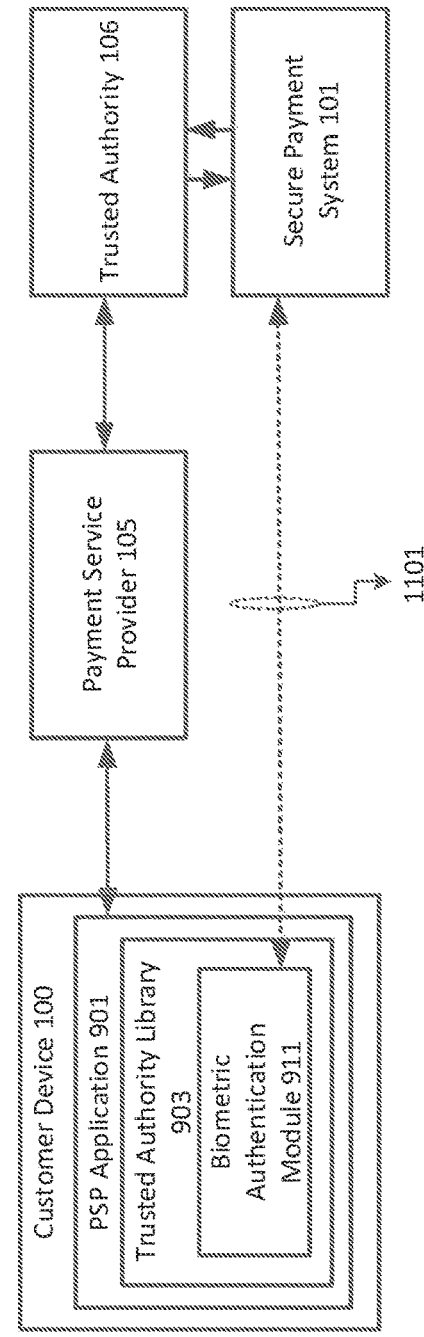
FIG. 11 is a block diagram illustrating an embodiment of a configuration for onboarding a payment service provider (PSP) application for biometric authentication.

FIG. 11 is a block diagram illustrating an embodiment of a configuration for onboarding a PSP application 901 for biometric authentication. In FIG. 11, the trusted authority library 903 in the PSP application 901 invokes a biometric authentication module 911 embedded within the trusted authority library 903 to onboard the PSP application 901. In some embodiments, the trusted authority library 903 and the biometric authentication module 911 may be combined into a single component within the PSP application 901. FIG. 15A shows a timing diagram for an embodiment of onboarding a PSP application. In FIG. 15A, the biometric authentication module 911 within the customer device 100 generates 1501 a customer symmetric encryption key ($CK_s$) and a customer public-private key pair ($CK_{pub}$, $CK_{pri}$) for the customer in association with managing an authentication flow for transactions. At 1501, the biometric authentication module 911 stores $CK_s$ and $CK_{pri}$ in a local memory of the customer device 100. The biometric authentication module 911 encrypts $CK_{pub}$ using a public key ($SK_{pub}$) of the secure payment system 101 to obtain $CK_{pub\_enc\_skpub}$ and returns $CK_{pub\_enc\_skpub}$ to the trusted authority library 903. The trusted authority library 903 in turn provides $CK_{pub\_enc\_skpub}$ to the PSP application 901.

The PSP application 901 on the customer device 100 sends 1502 the $CK_{pub\_enc\_skpub}$ over the secure network or channel to the payment service provider 105, which then routes 1503 the same to the trusted authority 106. The trusted authority 106 receives $CK_{pub\_enc\_skpub}$ from the PSP application 901 and digitally signs $CK_{pub\_enc\_skpub}$ using the private key ($TK_{pri}$) of the trusted authority 106 to obtain 1504 the signed request $CK_{pub\_enc\_skpub\_sig\_tkpri}$. The trusted authority 106 proceeds to send 1505 data including $CK_{pub\_enc\_skpub}$ and $CK_{pub\_enc\_skpub\_sig\_tkpri}$ over the secure network or channel to the secure payment system 101.

The secure payment system 101 receives the data including $CK_{pub\_enc\_skpub}$ and $CK_{pub\_enc\_skpub\_sig\_tkpri}$ and verifies 1506 $CK_{pub\_enc\_skpub\_sig\_tkpri}$ against $CK_{pub\_enc\_skpub}$ using the public key ($TK_{pub}$) of the trusted authority 106. The secure payment system 101 decrypts $CK_{pub\_enc\_skpub}$ using a private key ($SK_{pri}$) of the secure payment system 101 to obtain $CK_{pub}$ and locally stores 1506 the $CK_{pub}$. In some embodiments, the trusted authority 106 and the secure payment system 101 may be combined into a single entity in the configuration shown in FIG. 11. The secure payment system 101 proceeds to generate 1506 a receipt (SR) which includes the $CK_{pub}$, digitally signs SR using the private key ($SK_{pri}$) of the secure payment system 101 to obtain a signed receipt $SR_{sig\_skpri}$, creates a message $M_0=[SR, SR_{sig\_skpri}]$, and encrypts the message $M_0$ using the public key ($TK_{pub}$) of the trusted authority 106 to obtain $M_{0\_enc\_tkpub}$. The secure payment system 101 sends 1507 a response including $M_{0\_enc\_tkpub}$ over the secure network or channel to the trusted authority 106. The trusted authority 106 decrypts $M_{0\_enc\_tkpub}$ using the private key ($TK_{pri}$) of the trusted authority to obtain $M_0$ and verifies 1508 $SR_{sig\_skpri}$ (contained in $M_0$) against SR (contained in $M_0$) using public key ($SK_{pub}$) of the secure payment system 101. The trusted authority 106 sends 1509 a response based on the verification to the payment service provider 105 over the secure network. The payment service provider 105 routes 1510 the response over the secure network to the PSP application 901 on the customer device 100. The PSP application 901 receives the response from the payment service provider 105 and passes the response to the trusted authority library 903, which in turn passes the response to the biometric authentication module 911. If the response is indicative of success, the biometric authentication module 911 stores 1511 $CK_s$ and $CK_{pri}$ on the secure storage 606 of the customer device 100 and deletes the $CK_s$ and $CK_{pri}$ from a local memory of the customer device 100. The biometric authentication module 911 retrieves and/or allows access to $CK_s$ and $CK_{pri}$ on the secure storage 606 in response to a successful biometric authentication of the user 905 on the customer device 100. In some embodiments, the biometric authentication module 911 stores 1511 $CK_{pub}$ on the storage 606 of the customer device 100.

In an alternative implementation, FIG. 15B shows a timing diagram for another embodiment of onboarding a PSP application. In FIG. 15B, the biometric authentication module 911 within the customer device 100 generates 1512 a customer symmetric encryption key ($CK_s$) and a customer public-private key pair ($CK_{pub}$, $CK_{pri}$) for the customer in association with managing an authentication flow for transactions. The biometric authentication module 911 stores $CK_s$ and $CK_{pri}$ in a local memory of the customer device 100. At 1512, the biometric authentication module 911 encrypts $CK_{pub}$ using a public key ($SK_{pub}$) of the secure payment system 101 to obtain $CK_{pub\_enc\_skpub}$ and then directly sends 1513 the $CK_{pub\_enc\_skpub}$ over the secure network or channel to the secure payment system 101. This path is shown as indicated by the dashed line 1101 in FIG. 11, for example. The secure payment system 101 decrypts $CK_{pub\_enc\_skpub}$ using a private key ($SK_{pri}$) of the secure payment system 101 to obtain $CK_{pub}$ and locally store 1514 $CK_{pub}$ at the secure payment system 101. The secure payment system 101 then directly sends 1515 a response over the secure network or channel to the biometric authentication module 911 in the trusted authority library 903 on the customer device 100 which proceeds to store 1516 $CK_s$ and $CK_{pri}$ on the secure storage 606 of the customer device 100.

In some embodiments, the VPA or bank account may be onboarded within the PSP application 901 using PIN fragments and the biometric authentication on the customer device 100 is performed using the PIN fragments.

Figure 12:
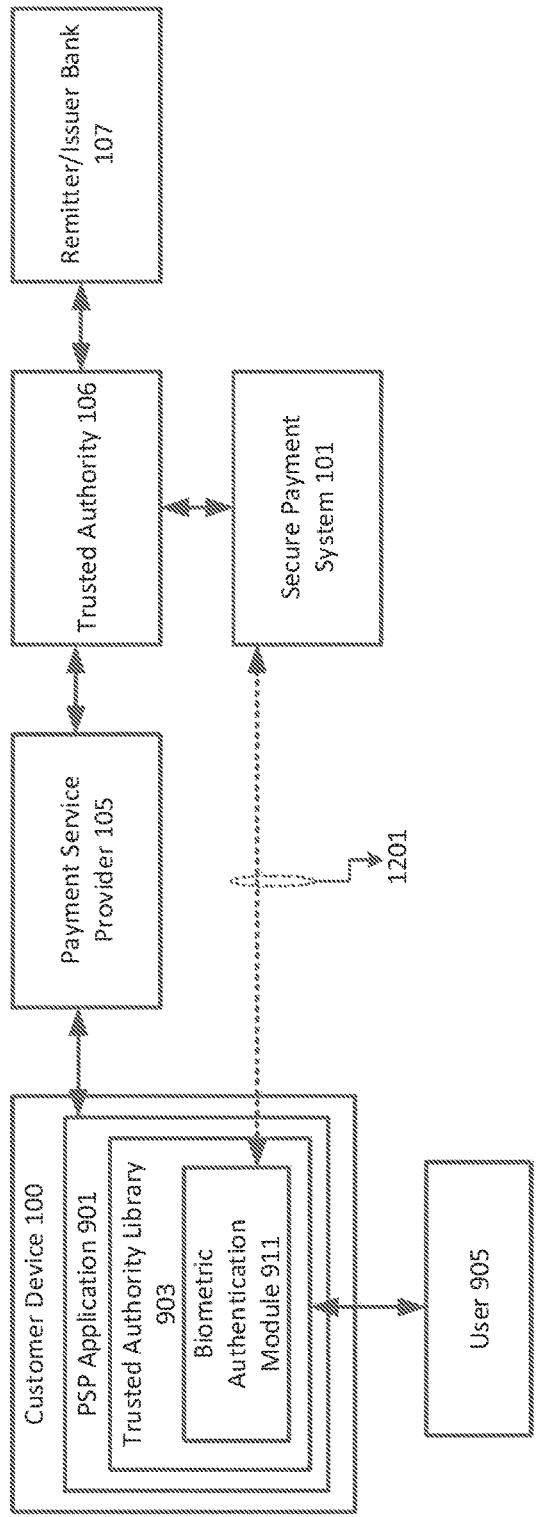
FIG. 12 is a block diagram illustrating an embodiment of a configuration for onboarding a Virtual Payment Address (VPA) or bank account using PIN fragments.
Figure 16A:
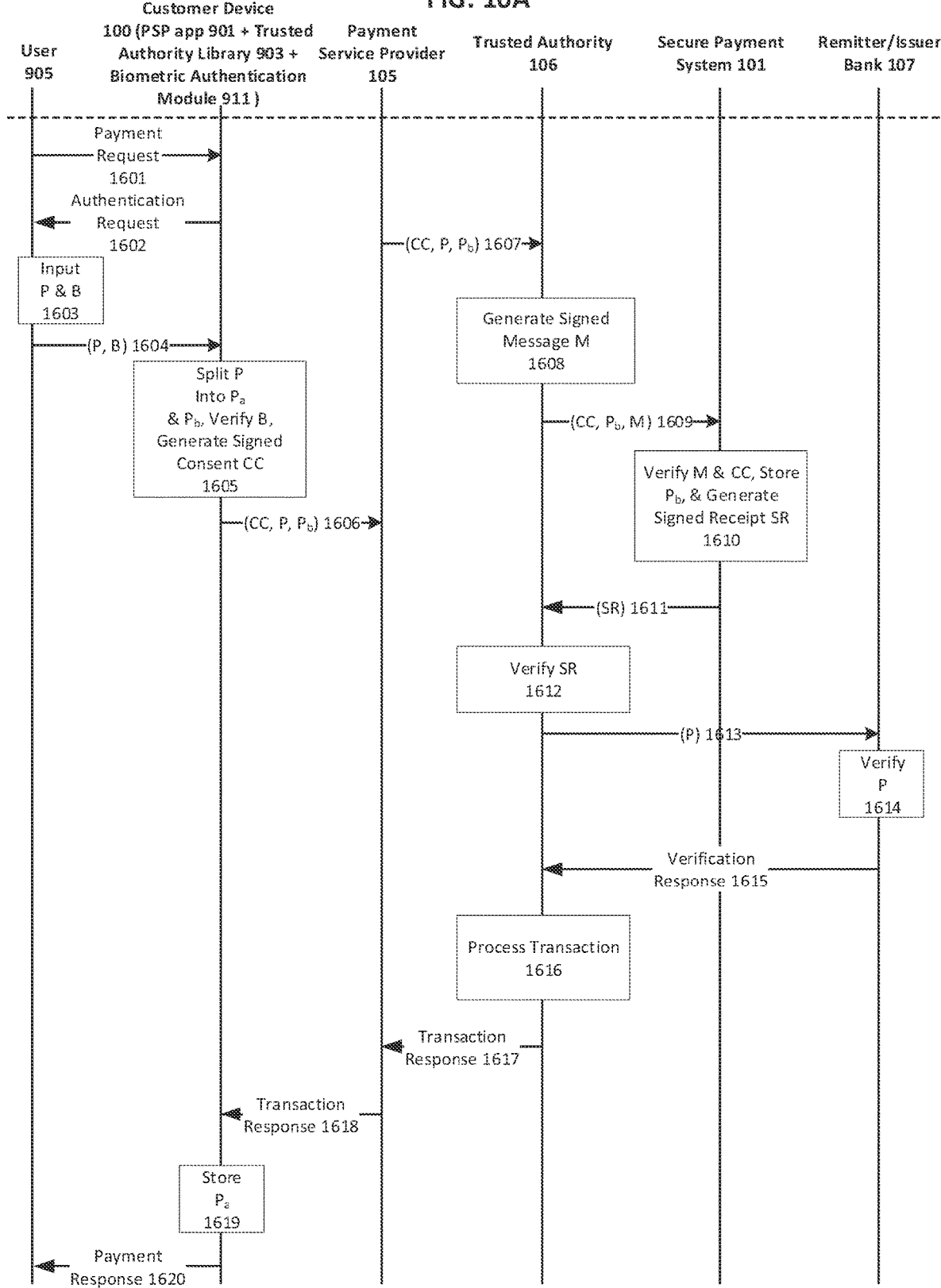

FIG. 12 is a block diagram illustrating an embodiment of a configuration for onboarding a VPA or bank account using PIN fragments. In FIG. 12, the PSP application 901 in the customer device 100 invokes or requests the trusted authority library 903 to prompt the user 905 to authenticate a transaction. The trusted authority library 903 invokes the biometric authentication module 911 to determine whether the PSP application 901 has been onboarded. In some embodiments, the trusted authority library 903 and the biometric authentication module 911 may be combined into a single component within the PSP application 901. FIG. 16A shows a timing diagram for an embodiment of onboarding a VPA or bank account using PIN fragments. If the PSP application 901 has been onboarded, the PSP application 901 receives 1601 payment request and the trusted authority library 903 prompts 1602 the user 905 to enter 1603 a valid PIN (P), and requests the user 905 to give consent to enable biometric authentication for selected VPA or bank account on the customer device 100. For example, the trusted authority library 903 generates a page on a display of the customer device 100 for the user to enter 1603 the P and to give consent to enable the biometric authentication. At 1604, the trusted authority library 903 on the customer device 100 receives the P entered by the user 905 and splits 1605 the P into two fragments $\{P_a, P_b\}$. For example, the trusted authority library 903 generates a random number $P_a$ and uses a bitwise XOR operator to determine $P_b$, where $P_b=P_a \oplus P$. P can be reconstructed from the fragments $P_a$ and $P_b$ as $P=P_a \oplus P_b$. In addition to the XOR operation, there are other types of operators which can provide equivalent results, such as a modular addition operation (i.e., $P=P_a+P_b$), or a modular multiplication operation.

The trusted authority library 903 creates hash of $P_b$ to obtain $P_{b\_hash\_tal}$ and passes data including $P_a$ and $P_{b\_hash\_tal}$ to the biometric authentication module 911 on the customer device 100. The biometric authentication module 911 receives $P_a$ from the trusted authority library 903, encrypts $P_a$ using the customer symmetric encryption key ($CK_s$) to obtain $P_{a\_enc\_cks}$, and stores $P_{a\_enc\_cks}$ in the local volatile memory of the customer device 100. At 1605, the biometric authentication module 911 on the customer device 100 receives $P_{b\_hash\_tal}$ from the trusted authority library 903, generates a Customer Consent (CC) that includes $P_{b\_hash\_tal}$ and transaction details, such as transaction identifier, transaction amount, merchant, bank account, VPA, etc, and signs the CC using the customer private key ($CK_{pri}$) to obtain a signed consent $CC_{sig\_ckpri}$. The biometric authentication module 911 then encrypts the data $D_1=[CC, CC_{sig\_ckpri}]$ using the public key ($SK_{pub}$) of the secure payment system 101 to obtain $D_{1\_enc\_skpub}$ and returns $D_{1\_enc\_skpub}$ to the trusted authority library 903. In some embodiments, the biometric authentication module 911 verifies and authenticates biometric data B input 1603 on the customer device 100 after the user has given consent for enabling biometric authentication to retrieve and/or access the customer symmetric encryption key ($CK_s$) and the customer private key ($CK_{pri}$) from the secure storage 606 of the customer device 100 for performing encryption and digitally signing data as described herein.

At 1605, the trusted authority library 903 on the customer device 100 encrypts PIN P using the public key ($TK_{pub}$) of the trusted authority 106 to obtain $P_{en\_tkub}$ and encrypts PIN fragment $P_b$ using the public key ($SK_{pub}$) of the secure payment system 101 to obtain $P_{b\_enc\_skpub}$. The trusted authority library 903 returns the set [$D_{1\_enc\_skpub}$, $P_{enc\_tkpub}$, $P_{b\_enc\_skpub}$] to the PSP application 901. The PSP application 901 forwards 1606 [$D_{1\_enc\_skpub}$, $P_{enc\_tkpub}$, $P_{b\_enc\_skpub}$] over the secure network or channel to the payment service provider 105, which then routes it to the trusted authority 106.

The trusted authority 106 receives [$D_{1\_enc\_skpub}$, $P_{enc\_tkpub}$, $P_{b\_enc\_skpub}$] from the PSP application 901 via the payment service provider 105 and creates a message $M_1 = $ [$D_{1\_enc\_skpub}$, $P_{b\_enc\_skpub}$]. The Trusted authority 106 digitally signs message $M_1$ using the private key ($TK_{pri}$) of the trusted authority 106 to obtain 1608 a signed message $M_{1\_sig\_tkpri}$. The trusted authority 106 sends 1609 the set [$M_1$, $M_{1\_sig\_tkpri}$] over the secure network or channel to the secure payment system 101.

The secure payment system 101 receives [$M_1$, $M_{1\_sig\_tkpri}$] from the trusted authority 106. At 1610, the secure payment system 101 verifies $M_{1\_sig\_tkpri}$ against $M_1$ using the public key ($TK_{pub}$) of the trusted authority 106, decrypts $D_{1\_enc\_skpub}$ (contained in $M_1$) using the private key ($SK_{pri}$) of the secure payment system 101 to obtain $D_1$, verifies $CC_{sig\_ckpri}$ (contained in $D_1$) against CC (contained in $D_1$) using the customer public key ($CK_{pub}$), decrypts $P_{b\_enc\_skpub}$ (contained in $M_1$) using the private key ($SK_{pri}$) of the secure payment system 101 to obtain the PIN fragment $P_b$, creates a hash of $P_b$ to obtain $P_{b\_hash\_sp}$, verifies that $P_{b\_hash\_sp}$ matches $P_{b\_hash\_tal}$ included in the customer consent CC (contained in $D_1$), and stores an encrypted $P_b$ for the selected VPA or bank account in the storage of the secure payment system 101. At 1610, the secure payment system 101 generates a receipt (SR) that includes the transaction details along with $P_{b\_hash\_sp}$, signs the SR using the private key ($SK_{pri}$) of the secure payment system 101 to obtain a signed receipt $SR_{sig\_skpri}$, creates a message $M_1 = $ [$SR, SR_{sig\_skpri}$], and encrypts the message $M_1$, using the public key ($TK_{pub}$) of the trusted authority 106 to obtain $M_{1'\_enc\_tkpub}$. The secure payment system 101 sends 1611 a response, including $M_{1'\_enc\_tkpub}$ over the secure network or channel to the trusted authority 106. In some embodiments, the trusted authority 106 and the secure payment system 101 may be combined into a single entity in the configuration shown in FIG. 12.

The trusted authority 106 decrypts $P_{enc\_tkpub}$ using the private key ($TK_{pri}$) of the trusted authority to obtain P and encrypts P using the public key ($IK_{pub}$) of the issuing bank 107 to obtain $P_{enc\_ikpub}$. At 1612, the trusted authority 106 decrypts $M_{1'\_enc\_tkpub}$ using the private key ($TK_{pri}$) of the trusted authority 106 to obtain $M_1$, verifies $SR_{sig\_skpri}$ (contained in $M_1$) against SR (contained in $M_1$) using the public key ($SK_{pub}$) of the secure payment system 101, and verifies the transaction details included in SR (contained in $M_1$). The trusted authority 106 sends 1613 the $P_{enc\_ikpub}$ over the secure network or channel to the issuing bank 107. The issuing bank 107 decrypts the $P_{enc\_ikpub}$ using a private key ($IK_{pri}$) of the issuing bank 107 to obtain P and verifies 1614 that P is correct for the selected VPA or bank account. The issuing bank 107 sends 1615 a response based on verifying that P is correct over the secure network or channel to the trusted authority 106. The trusted authority 106 completes processing 1616 the transaction with other participating entities and sends 1617 a response indicating successful completion of the transaction over the secure network to the payment service provider 105, which then routes 1618 it to the PSP application 901 on the customer device 100.

The PSP application 901 receives the response from the trusted authority 106 and passes the response to the trusted authority library 903, which in turn passes the response to the biometric authentication module 911. If the response is indicative of success, at 1619, the biometric authentication module 911 stores $P_{a\_enc\_cks}$ in the storage 606 of the customer device 100 and deletes $P_{a\_enc\_cks}$ from the local volatile memory of the customer device 100. The customer device 100 provides 1620 the user 905 with a payment response.

In FIG. 16A, the communication including exchange of data described herein between the trusted authority 106 and the secure payment system 101 may occur in parallel with the communication including exchange of data described herein between the trusted authority 106 and the issuing bank 107 in some embodiments to reduce execution time. This is because the communication between the trusted authority 106 and the secure payment system 101 and the communication between the trusted authority 106 and the issuing bank 107 are independent of each other.

In an alternative implementation, FIG. 16B shows a timing diagram for another embodiment of onboarding a VPA or bank account using PIN fragments. Some of the data exchange or communication between components in FIG. 16B take similar form as has been described above with reference to FIG. 16A, so like terminology have been used to indicate similar functionality. In FIG. 16B, the biometric authentication module 911 on the customer device 100 may exchange data directly with the secure payment system 101. This path is shown as indicated by the bidirectional dashed line 1201 in FIG. 12, for example. In FIG. 16B, the trusted authority library 903 on the customer device 100 splits 1625 the PIN P input by the user into two fragments $\{P_a, P_b\}$ by generating a random number $P_a$ and using the bitwise XOR operator to compute $P_b = P_a \oplus P$. The trusted authority library 903 creates hash of $P_b$ to obtain $P_{b\_hash\_tal}$, encrypts PIN fragment $P_b$ using the public key ($SK_{pub}$) of the secure payment system 101 to obtain $P_{b\_enc\_skpub}$, and passes data including [$P_a$, $P_{b\_hash\_tal}$, $P_{b\_enc\_skpub}$] to the biometric authentication module 911. The biometric authentication module 911 encrypts PIN fragment $P_a$ using the customer symmetric encryption key ($CK_s$) to obtain $P_{a\_enc\_cks}$, and stores $P_{a\_enc\_cks}$ in the local volatile memory of the customer device 100. At 1625, the biometric authentication module 911 on the customer device 100 generates a Customer Consent (CC) that includes $P_{b\_hash\_tal}$ and transaction details, signs the CC using the customer private key ($CK_{pri}$) to obtain a signed $CC_{sig\_ckpri}$, encrypts the data $D_1 = [CC, CC_{sig\_ckpri}]$ using the public key ($SK_{pub}$) of the secure payment system 101 to obtain $D_{1\_enc\_skpub}$ and sends 1626 [$D_{1\_enc\_skpub}$, $P_{b\_enc\_skpub}$] over the secure network or channel to the secure payment system 101. At 1627, the secure payment system 101 decrypts $D_{1\_enc\_skpub}$ using the private key ($SK_{pri}$) of the secure payment system 101 to obtain $D_1$, verifies $CC_{sig\_ckpri}$ (contained in $D_1$) against CC (contained in $D_1$) using the customer public key ($CK_{pub}$), decrypts $P_{b\_enc\_skpub}$ using the private key ($SK_{pri}$) of the secure payment system 101 to obtain the PIN fragment $P_b$, creates a hash of $P_b$ to obtain $P_{b\_hash\_sp}$, verifies that $P_{b\_hash\_sp}$ matches $P_{b\_hash\_tal}$ included in customer consent CC (contained in $D_1$), and stores an encrypted $P_b$ for the selected VPA or bank account in the storage of the secure payment system 101. At 1627, the secure payment system 101 generates a receipt (SR) that includes the transaction details along with $P_{b\_hash\_sp}$, signs the SR using the private key ($SK_{pri}$) of the secure payment system 101 to obtain a signed receipt $SR_{sig\_skpri}$, creates a message $M_{1'} = [SR, SR_{sig\_skpri}]$, and encrypts the message $M_{1'}$ using the public key ($TK_{pub}$) of the trusted authority 106 to obtain $M_{1'\_enc\_tkpub}$. At 1628, the secure payment system 101 sends a response, including $M_{1'\_enc\_tkpub}$ over the secure network or channel to the biometric authentication module 911 on the customer device 100. The biometric authentication module 911 returns $M_{1'\_enc\_tkpub}$ to the trusted authority library 903 on the customer device 100. The trusted authority library 903 encrypts PIN P using the public key ($TK_{pub}$) of the trusted authority 106 to obtain $P_{enc\_tkpub}$ and returns [$P_{enc\_tkpub}$, $M_{1'\_enc\_tkpub}$] to the PSP application 901 on the customer device 100. The PSP application 901 sends 1629 [$P_{enc\_tkpub}$, $M_{1'\_enc\_tkpub}$] over the secure network or channel to the payment service provider 105 which in turn routes 1630 the same to the trusted authority 106. After the receipt of [$P_{enc\_tkpub}$, $M_{1'\_enc\_tkpub}$] by the trusted authority 106, the communication including exchange of data between the trusted authority 106 and the issuing bank 107 and the communication including exchange of data between the trusted authority 106 and the user 905 via the payment service provider 105 and the PSP application 901 on the customer device 100 continues as described earlier with reference to FIG. 16A.

In an alternative implementation of FIG. 12, the trusted authority library 903 may split the PIN P into three fragments $\{P_a, P_b, P_c\}$ using the bitwise XOR operation. For example, the trusted authority library 903 generates a random number $P_a$, computes $P_{a'} = P \oplus P_a$, again generates a random number $P_b$, and computes $P_c = P_{a'} \oplus P_b$. PIN P can be later reconstructed as $P = P_a \oplus P_b \oplus P_c$, and $P_a$, $P_b$, and $P_c$ are interchangeable. $P_a$ may be encrypted and stored on the customer device 100, $P_b$ may be encrypted and stored on the secure payment system 101, and $P_c$ may be encrypted and stored on the trusted authority 106. In general, any sensitive information Z (such as PIN P) may be split by an entity into N fragments $\{Z_1, Z_2, \ldots, Z_N\}$ in such a way that only certain subsets of the N fragments are required to reconstruct Z. From these N fragments, M shares are created $\{S_1, S_2, \ldots, S_M\}$, such that $Si \subseteq \{Z_1, Z_2, \ldots, Z_N\}$ for all $I \in \{1, \ldots, M\}$ in such a way that only certain subsets of the M shares, are required to reconstruct Z. Each of the M shares is then distributed to the M entities, namely, the customer device 100, the secure payment system 101, the trusted authority 106, and the remitter/issuer bank 107. These distributed storage schemes increase the difficulty of stealing Z by requiring access to a plurality of secure systems in order to reconstruct Z. It should be understood that although techniques including data splitting, recovery, data fragment updating, and distributed authorization are described herein in the context of payment information, the same techniques may be applied to other sensitive information, such as PIN.

In some embodiments, the VPA or bank account may be onboarded within the PSP application 901 on the customer device 100 using PIN tokenization and the biometric authentication on the customer device 100 is performed using PIN tokenization. The configuration for onboarding VPA or bank account using PIN tokenization is the same as the one shown in FIG. 12. In FIG. 12, the PSP application 901 in the customer device 100 invokes or requests the trusted authority library 903 to prompt the user 905 to authenticate a transaction. The trusted authority library 903 invokes the biometric authentication module 911 to confirm that the PSP application 901 has been onboarded.

FIG. 17A shows a timing diagram for an embodiment of onboarding VPA or bank account using PIN tokenization. If the PSP application 901 has been onboarded, the PSP application 901 receives 1701 payment request and the trusted authority library 903 on the customer device 100 prompts 1702 the user 905 to enter 1703 a valid PIN (P), and requests the user 905 to give consent to enable biometric authentication for selected VPA or bank account on the customer device 100. The trusted authority library 903 on the customer device 100 receives 1704 the PIN P entered by the user 905 and invokes the biometric authentication module 911. At 1705, the biometric authentication module 911 on the customer device 100 generates a Customer Consent (CC) that includes the transaction details and signs the CC using the customer private key ($CK_{pri}$) to obtain a signed consent $CC_{sig\_ckpri}$. The biometric authentication module 911 proceeds to encrypt the data $D_2$=[CC, $CC_{sig\_ckpri}$] using the public key ($SK_{pub}$) of the secure payment system 101 to obtain $D_{2\_enc\_skpub}$ and returns $D_{2\_enc\_skpub}$ to the trusted authority library 903. In some embodiments, at 1705, the biometric authentication module 911 verifies and authenticates biometric data B input 1703 on the customer device 100 after the user has given consent for enabling biometric authentication to retrieve and/or access the customer symmetric encryption key ($CK_s$) and the customer private key ($CK_{pri}$) from the secure storage 606 of the customer device 100 for performing encryption and digitally signing data as described herein.

The trusted authority library 903 on the customer device 100 encrypts PIN P using the public key ($TK_{pub}$) of the trusted authority 106 to obtain $P_{enc\_tkpub}$ and returns a set [$D_{2\_enc\_skpub}$, $P_{enc\_tkpub}$] to the PSP application 901. The PSP application 901 on the customer device 100 routes 1706 [$D_{2\_enc\_skpub}$, $P_{enc\_tkpub}$] over the secure channel to payment service provider 105, which then routes 1707 the same to the trusted authority 106. The trusted authority 106 receives [$D_{2\_enc\_skpub}$, $P_{enc\_tkpub}$], decrypts $P_{enc\_tkpub}$ using the using the private key ($TK_{pri}$) of the trusted authority 106 to obtain P, and encrypts P using the public key ($IK_{pub}$) of the issuing bank 107 to obtain $P_{enc\_ikpub}$. The trusted authority 106 sends 1708 the $P_{enc\_ikpub}$ over the secure network or channel to the issuing bank 107.

The issuing bank 107 decrypts the $P_{enc\_ikpub}$ using a private key ($IK_{pri}$) of the issuing bank 107 to obtain P and verifies 1709 that P is correct for the selected VPA or bank account. The issuing bank 107 further generates an Authentication Token (T), creates and stores a hash of T to obtain $T_{hash\_ib}$ for the selected VPA or bank account, and encrypts T using the public key ($TK_{pub}$) of the trusted authority 106 to obtain $T_{enc\_tkpub}$. The issuing bank 107 forwards 1710 a response including $T_{enc\_tkpub}$ over the secure channel to the trusted authority 106.

At 1711, the trusted authority 106 receives $T_{enc\_tkpub}$ and decrypts $T_{enc\_tkpub}$ using the private key ($TK_{pri}$) of the trusted authority 106 to obtain T. The trusted authority 106 proceeds to split the T into two fragments $\{T_a, T_b\}$. For example, the trusted authority 106 generates a random number $T_a$ and uses a bitwise XOR operator to determine $T_b$, where $T_b = T_a \oplus T$. The fragments $T_a$ and $T_b$ are interchangeable and T can be reconstructed from the fragments $T_a$ and $T_b$ as $T = T_a \oplus T_b$. In addition to the XOR operation, there are other types of operators which can provide equivalent results, such as a modular addition operation (i.e., $T = T_a + T_b$), or a modular multiplication operation. At 1711, the trusted authority 106 encrypts fragment $T_b$ using the public key ($SK_{pub}$) of the secure payment system 101 to obtain $T_{b\_enc\_skpub}$, creates a message $M_2 = [D_{2\_enc\_skpub}, T_{b\_enc\_skpub}]$, and digitally signs the message $M_2$ using the private key ($TK_{pri}$) of the trusted authority 106 to obtain a signed message $M_{2\_sig\_tkpri}$. The trusted authority 106 sends 1712 the set [$M_2$, $M_{2\_sig\_tkpri}$] over the secure network or channel to the secure payment system 101.

The secure payment system 101 receives [$M_2$, $M_{2\_sig\_tkpri}$] from the trusted authority 106. At 1713, the secure payment system 101 verifies $M_{2\_sig\_tkpri}$ against $M_2$ using the public key ($TK_{pub}$) of the trusted authority 106, decrypts $D_{2\_enc\_skpub}$ (contained in $M_2$) using the private key ($SK_{pri}$) of the secure payment system 101 to obtain $D_2$, verifies $CC_{sig\_ckpri}$ (contained in $D_2$) against CC (contained in $D_2$) using the customer public key ($CK_{pub}$), decrypts $T_{b\_enc\_skpub}$ (contained in $M_2$) using the private key ($SK_{pri}$) of the secure payment system 101 to obtain the fragment $T_b$, encrypts $T_b$ and stores it for the selected VPA or bank account, and creates a hash of $T_b$ and $CK_{pub}$ to obtain $T_{b\_hash\_sp}$ and $CK_{pub\_hash\_sp}$ respectively. At 1713, the secure payment system 101 further generates a receipt (SR) that includes the transaction details along with $T_{b\_hash\_sp}$ and $CK_{pub\_hash\_sp}$, signs the SR using the private key ($SK_{pri}$) of the secure payment system 101 to obtain a signed receipt $SR_{sig\_skpri}$, creates a message $M_2$ = [$CK_{pub}$, SR, $SR_{sig\_skpri}$], and encrypts the message $M_{2'}$ using the public key ($TK_{pub}$) of the trusted authority 106 to obtain $M_{2'\_enc\_tkpub}$ The secure payment system 101 sends 1714 a response including $M_{2'\_enc\_tkpub}$ over the secure channel to the trusted authority 106.

At 1715, the trusted authority 106 decrypts $M_{2'\_enc\_tkpub}$ using the private key ($TK_{pri}$) of the trusted authority 106 to obtain message $M_{2'}$, verifies $SR_{sig\_skpri}$ (contained in $M_{2'}$) against SR (contained in $M_{2'}$) using the public key ($SK_{pub}$) of the secure payment system 101, verifies the transaction details included in SR (contained in $M_{2'}$), creates a hash of $T_b$ to obtain $T_{b\_hash\_tab}$, verifies that $T_{b\_hash\_tab}$ matches $T_{b\_hash\_sp}$ included in SR (contained in $M_{2'}$), creates a hash of $CK_{pub}$ (contained in $M_{2'}$) to obtain $CK_{pub\_hash\_tab}$, and verifies that $CK_{pub\_hash\_tab}$ matches $CK_{pub\_hash\_sp}$ included in SR (contained in $M_{2'}$). The trusted authority 106 further encrypts fragment $T_a$ using the $CK_{pub}$ (contained in $M_{2'}$) to obtain $T_{a\_enc\_ckpub}$ and signs $T_{a\_enc\_ckpub}$ using a private key ($TK_{pri}$) of the trusted authority 106 to obtain $T_{a\_enc\_ckpub\_sig\_tkpri}$. The trusted authority 106 completes processing of a transaction with other participating entities and sends a response including [$T_{a\_enc\_ckpub}$, $T_{a\_enc\_ckpub\_sig\_tkpri}$] over a secure channel to the payment service provider 105. The payment service provider 105 passes 1716 the response [$T_{a\_enc\_ckpub}$, $T_{a\_enc\_ckpub\_sig\_tkpri}$] over a secure channel to the PSP application 901 in the customer device 100, which then routes 1717 the same to the trusted authority library 903 in the customer device 100. At 1718, the trusted authority library 903 verifies $T_{a\_enc\_cpub\_sig\_tkpri}$ against $T_{a\_enc\_ckpub}$ using the public key ($TK_{pub}$) of the trusted authority 106 and passes the response $T_{a\_enc\_ckpub}$ to the biometric authentication module 911 in the customer device 100. If the response is indicative of success, at 1718, the biometric authentication module 911 decrypts $T_{a\_enc\_ckpub}$ using the customer private key ($CK_{pri}$) to obtain the fragment $T_a$, encrypts $T_a$ using a customer symmetric encryption key ($CK_s$) to obtain $T_{a\_enc\_cks}$ and stores $T_{a\_enc\_cks}$ on the storage 606 of the customer device 100. The customer device 100 provides 1719 the user 905 with a payment response.

In an alternative implementation, FIG. 17B shows a timing diagram for another embodiment of onboarding a VPA or bank account using PIN tokenization. Some of the data exchange or communication between components in FIG. 17B take similar form as has been described above with reference to FIG. 17A, so like terminology have been used to indicate similar functionality. In FIG. 17B, the biometric authentication module 911 on the customer device 100 sends the customer public key ($CK_{pub}$) to the trusted authority library 903. The trusted authority library 903 encrypts $CK_{pub}$ and PIN P using the public key ($TK_{pub}$) of the trusted authority 106 to obtain $CK_{pub\_enc\_tkpub}$ and $P_{enc\_tkpub}$ respectively and returns the set [$CK_{pub\_enc\_tkpub}$, $P_{enc\_tkpub}$] to the PSP application 901. At 1724, the PSP application 901 on the customer device 100 sends [$CK_{pub\_enc\_tkpub}$, $P_{enc\_tkpub}$] over the secure channel to the payment service provider 105, which in turn routes 1725 the same to the trusted authority 106. The above steps in FIG. 17B are implemented as an alternative to steps from 1705 to 1707 in FIG. 17A. The trusted authority 106 decrypts $P_{enc\_tkpub}$ using the using the private key ($TK_{pri}$) of the trusted authority 106 to obtain P, and encrypts P using the public key ($IK_{pub}$) of the issuing bank 107 to obtain $P_{enc\_ikpub}$. The trusted authority 106 sends 1726 the $P_{enc\_ikpub}$ over the secure network or channel to the issuing bank 107. At 1727, the issuing bank 107 decrypts the $P_{enc\_ikpub}$ using a private key ($IK_{pri}$) of the issuing bank 107 to obtain P and verifies that P is correct for the selected VPA or bank account. The issuing bank 107 further generates an Authentication Token (T), creates and stores a hash of T to obtain $T_{hash\_ib}$ for the selected VPA or bank account, and encrypts T using the public key ($TK_{pub}$) of the trusted authority 106 to obtain $T_{enc\_tkpub}$. The issuing bank 107 forwards 1728 a response including $T_{enc\_tkpub}$ over the secure channel to the trusted authority 106.

The following steps in FIG. 17B are implemented as an alternative to steps from 1711 to 1719 in FIG. 17A. In FIG. 17B, at 1729, the trusted authority 106 decrypts $T_{enc\_tkpub}$ using the private key ($TK_{pri}$) of the trusted authority 106 to obtain T and splits T into two fragments $\{T_a, T_b\}$ by generating a random number $T_a$ and using a bitwise XOR operator to determine $T_b$, where $T_b=T_b\oplus T$. The fragments $T_a$ and $T_b$ are interchangeable and T can be reconstructed from the fragments $T_a$ and $T_b$ as $T=T_a\oplus T_b$. The trusted authority 106 decrypts $CK_{pub\_enc\_tkpub}$ using the private key ($TK_{pri}$) of the trusted authority 106 to obtain customer public key $CK_{pub}$, encrypts fragment $T_a$ using $CK_{pub}$ to obtain $T_{a\_enc\_ckpub}$, encrypts fragment $T_b$ using the public key ($SK_{pub}$) of the secure payment system 101 to obtain $T_{b\_enc\_skpub}$, creates a message $M_{2a}$=[$T_{a\_enc\_ckpub}$, $T_{b\_enc\_skpub}$], and digitally signs the message $M_{2a'}$ using the private key ($TK_{pri}$) of the trusted authority 106 to obtain a signed message $M_{2a'\_sig\_tkpri}$. The trusted authority 106 completes processing of the transaction and sends 1730 a response including [$M_{2a'}$, $M_{2a'\_sig\_tkpri}$] over the secure channel to the payment service provider 105, which in turn passes the same to the PSP application 901 on the customer device 100.

The PSP application passes the response [$M_{2a'}$, $M_{2a'\_sig\_tkpri}$] to the trusted authority library 109 on the customer device 100. At 1732, the trusted authority library 109, after verifying $M_{2a'\_sig\_tkpri}$ against $M_{2a'}$ using the public key ($TK_{pub}$) of the trusted authority 106, passes the response [$M_{2a'}$, $M_{2a'\_sig\_nkpri}$] to biometric authentication module 911 on the customer device 100. If the response is indicative of successful verification of $M_{2a'\_sig\_tkpri}$ against $M_{2a'}$ using the key ($TK_{pub}$), the biometric authentication module 911 creates a hash of $T_{b\_enc\_skpub}$ (contained in $M_{2a'}$) to obtain $T_{b\_enc\_skpub\_hash\_sp}$, generates a Customer Consent (CC) which includes the transaction details along with $T_{b\_enc\_skpub\_hash\_sp}$, signs CC using the customer private key $CK_{pri}$ to obtain $CC_{sig\_ckpri}$, encrypts the data $D_2$=[CC, $CC_{sig\_ckpri}$] using the public key ($SK_{pub}$) of the secure payment system 101 to obtain $D_{2\_enc\_skpub}$, and sends 1733 [$D_{2\_enc\_skpub}$, $T_{b\_enc\_skpub}$] to the secure payment system 101 over the secure channel.

At 1734, the secure payment system 101 decrypts $D_{2\_enc\_skpub}$ using the private key ($SK_{pri}$) of the secure payment system 101 to obtain $D_2$, verifies $CC_{sig\_ckpri}$ (contained in $D_2$) against CC (contained in $D_2$) using the customer public key $CK_{pub}$, creates a hash of $T_{b\_enc\_skpub}$ to obtain $T_{b\_enc\_skpub\_hash\_spb}$, verifies that $T_{b\_enc\_skpub\_hash\_spb}$ matches $T_{b\_enc\_skpub\_hash\_sp}$ (contained in $D_2$), decrypts $T_{b\_enc\_skpub}$ using private key ($SK_{pri}$) of the secure payment system 101 to obtain $T_b$, stores an encrypted $T_b$ for the selected VPA or bank account, creates a hash of $T_b$ to obtain $T_{b\_hash\_sab}$, generates a receipt (SR) that includes the transaction details along with the $T_{b\_hash\_sab}$, digitally signs SR using the private key ($SK_{pri}$) of the secure payment system 101 to obtain a signed receipt $SR_{sig\_skpri}$, creates a message $M_{2b}$=[SR,$SR_{sig\_skpri}$], and encrypts the message $M_{2b'}$ using the customer public key (CKb) to obtain $M_{2b'\_enc\_ckpub}$. The secure payment system 101 sends 1735 a response including $M_{2b'\_enc\_ckpub}$ over the secure channel to the biometric authentication module 911 on the customer device 100.

At 1736, the biometric authentication module 911 proceeds to decrypt $M_{2b'\_enc\_ckpub}$ using the customer private key $CK_{pri}$ to obtain $M_{2b'}$, verifies $SR_{sig\_skpri}$ (contained in $M_{2b'}$) against SR contained in $M_{2b'}$) using the public key ($SK_{pub}$) of the secure payment system 101. The biometric authentication module 911 decrypts $T_{a\_enc\_ckpub}$ using customer private key $CK_{pri}$ to obtain $T_a$, encrypts $T_a$ using the customer symmetric encryption key ($CK_s$) to obtain $T_{a\_enc\_cks}$ and stores the $T_{a\_enc\_cks}$ on the storage 606 of the customer device 100. The biometric authentication module 911 retrieves and/or allows access to $CK_s$ and $CK_{pri}$ on the secure storage 606 in response to a successful biometric authentication of the user 905 on the customer device 100.

After the PSP application 901 and VPA or bank account have been successfully onboarded, the transaction may now be authenticated by the user 905 using the biometric authentication on the customer device 100.

Figure 13:
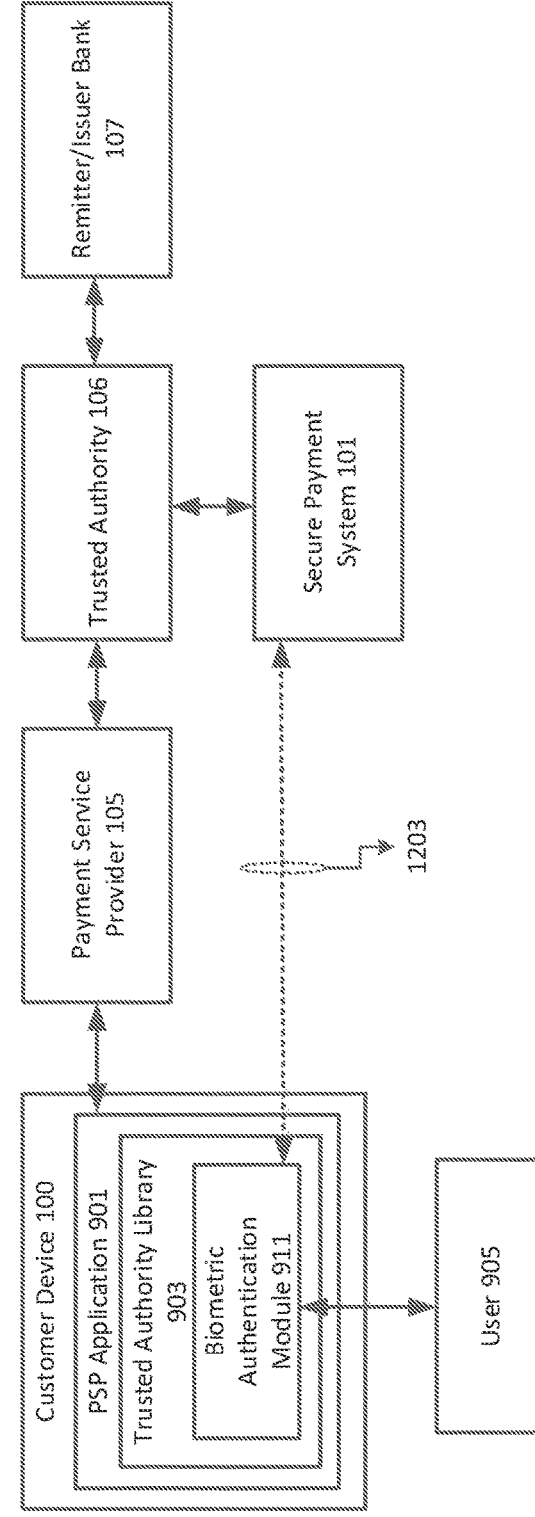
FIG. 13 is a block diagram illustrating an embodiment of a configuration facilitating biometric authentication for a transaction using PIN fragments.
Figure 18A:
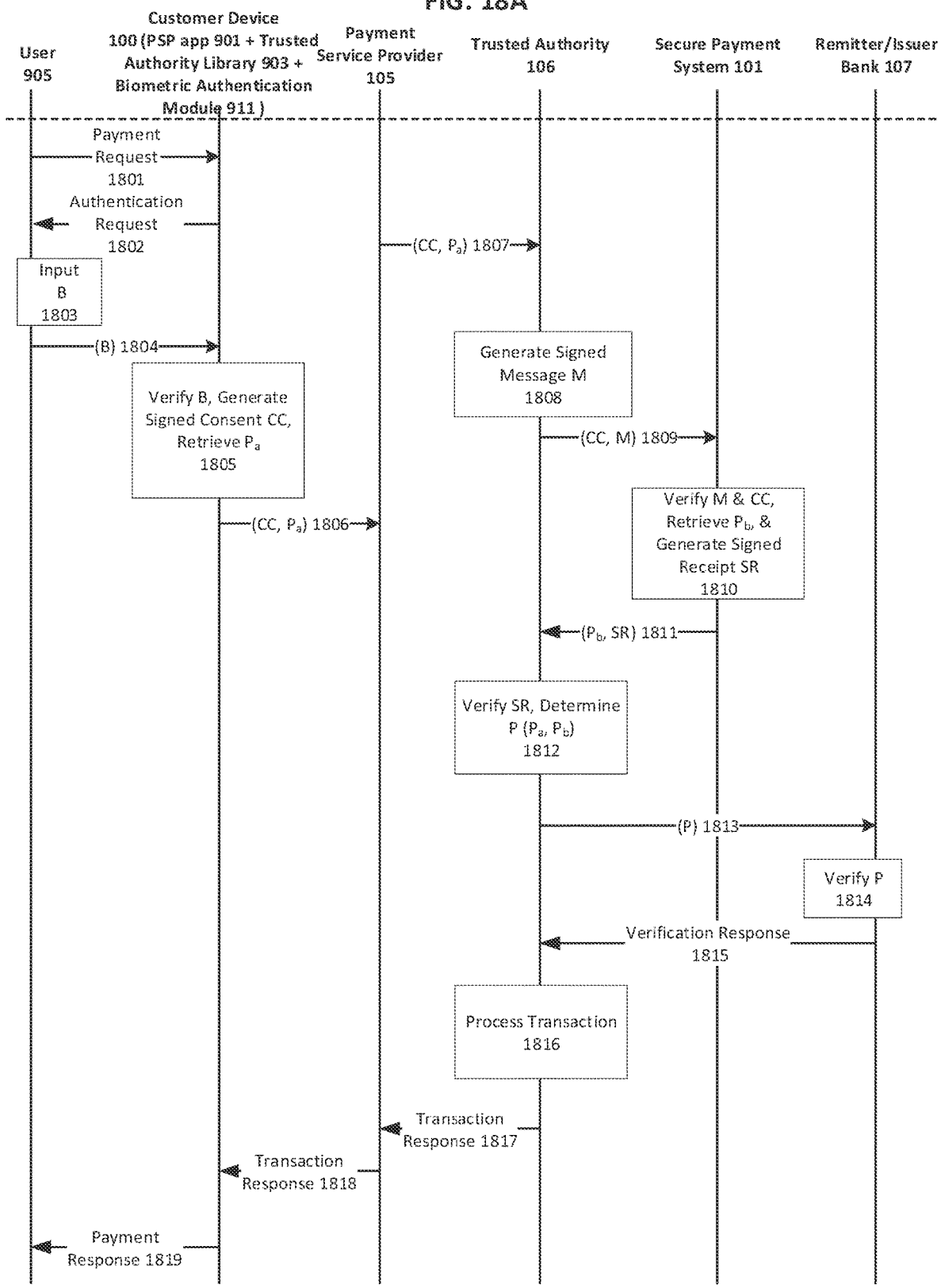
FIGS. 18A and 18B show a timing diagram of a biometric authentication mechanism for facilitating a transaction using PIN fragments in accordance with some embodiments.

FIG. 13 is a block diagram illustrating an embodiment of a configuration for a biometric authentication mechanism for facilitating a transaction using PIN fragments. In FIG. 13, the PSP application 901 in the customer device 100 invokes or requests the trusted authority library 903 to prompt the user 905 to authenticate a transaction. The trusted authority library 903 invokes the biometric authentication module 911 to determine whether the PSP application 901 and VPA or bank account have been successfully onboarded. In some embodiments, the trusted authority library 903 and the biometric authentication module 911 may be combined into a single component within the PSP application 901. FIG. 18A shows a timing diagram for an embodiment of a biometric authentication mechanism for facilitating a transaction using PIN fragments. If the PSP application 901 and VPA or bank account have been successfully onboarded, the PSP application 901 receives 1801 payment request and the biometric authentication module 911 prompts 1802 the user 905 to input or scan their biometric information on the customer device 100 by generating an authentication request. After the biometric information is input 1803, subsequently received 1804 and authenticated, the biometric authentication module 911 has access to retrieve the customer symmetric encryption key ($CK_s$) and the customer private key ($CK_{pri}$) from the secure storage 606 of the customer device 100 for performing encryption and digitally signing data as described herein.

At 1805, the biometric authentication module 911 generates Customer Consent (CC) that includes transaction details, such as transaction identifier, transaction amount, merchant, bank account, VPA, etc. The biometric authentication module 911 digitally signs CC using the customer private key ($CK_{pri}$) to obtain $CC_{sig\_ckpri}$, retrieves and decrypts $P_{a\_enc\_cks}$ (locally stored on the customer device 100) using the customer symmetric encryption key ($CK_s$) to obtain a PIN fragment $P_a$, encrypts the data $D_3$=[CC, $CC_{sig\_ckpri}$] using the public key ($SK_{pub}$) of the secure payment system 101 to obtain $D_{3\_enc\_skpub}$ and returns [$D_{3\_enc\_skpub}$, $P_a$] to the trusted authority library 903.

The trusted authority library 903 encrypts $P_a$ using the public key ($TK_{pub}$) of the trusted authority 106 to obtain $P_{a\_enc\_tkpub}$ and returns [$D_{3\_enc\_skpub}$, $P_{a\_enc\_tkpub}$] to the PSP application 901. The PSP application 901 sends 1806 [$D_{3\_enc\_skpub}$, $P_{a\_enc\_tkpub}$] over the secure network or channel to the payment service provider 105, which then routes 1807 it to the trusted authority 106. The trusted authority 106 receives [$D_{3\_enc\_skpub}$, $P_{a\_enc\_tkpub}$], creates 1808 a message $M_3$=[$D_{3\_enc\_skpub}$], digitally signs $M_3$ using the private key ($TK_{pri}$) of the trusted authority 106 to obtain $M_{3\_sig\_tkpri}$. The trusted authority 106 sends 1809 the set [$M_3$, $M_{3\_sig\_tkpri}$] over the secure network or channel to the secure payment system 101.

At 1810, the secure payment system 101 receives [$M_3$, $M_{3\_sig\_tkpri}$] from the trusted authority 106, verifies $M_{3\_sig\_tkpri}$ against $M_3$ using the public key ($TK_{pub}$) of the trusted authority 106, decrypts $D_{3\_enc\_skpub}$ (contained in $M_3$) using the private key ($SK_{pri}$) of the secure payment system 101 to obtain $D_3$, verifies $CC_{sig\_ckpri}$ (contained in $D_3$) against CC (contained in $D_3$) using the customer public key ($CK_{pub}$) locally stored on the secure payment system 101, retrieves decrypted $P_b$ from the storage of the secure payment system 101, creates a hash of $P_b$ to obtain $P_{b\_hash\_sp}$, generates a receipt (SR) that includes $P_{b\_hash\_sp}$ and transaction details, digitally signs SR using the private key ($SK_{pri}$) of the secure payment system 101 to obtain $SR_{sig\_skpri}$, creates a message $M_{3'}$=[$P_b$,SR,$SR_{sig\_skpri}$], and encrypts the message $M_{3'}$ using the public key ($TK_{pub}$) of the trusted authority 106 to obtain $M_{3'\_enc\_tkpub}$ The secure payment system 101 sends 1811 a response including $M_{3'\_enc\_tkpub}$ over the secure network or channel to the trusted authority 106. In some embodiments, the trusted authority 106 and the secure payment system 101 may be combined into a single entity in the configuration shown in FIG. 13.

At 1812, the trusted authority 106 decrypts $M_{3'\_enc\_tkpub}$ using the private key ($TK_{pri}$) of the trusted authority to obtain $M_{3'}$ =[$P_b$,SR,$SR_{sig\_skpri}$], decrypts $P_{a\_enc\_tkpub}$ using the private key ($TK_{pri}$) to obtain $P_a$, reconstructs P from $P_a$ and $P_b$ (contained in $M_{3'}$) using the bitwise XOR operation as follows P=$P_a \oplus P_b$, and encrypts the reconstructed P using the public key ($IK_{pub}$) of the issuing bank 107 to obtain $P_{enc\_ikpub}$. The trusted authority 106 verifies $SR_{sig\_skpri}$ (contained in $M_{3'}$) against SR (contained in $M_{3'}$) using the public key ($SK_{pub}$) of the secure payment system 101, verifies the transaction details included in SR (contained in $M_{3'}$), creates a hash of $P_b$ (contained in $M_{3'}$) to obtain $P_{b\_hash\_tab}$, and verifies that $P_{b\_hash\_tab}$ matches $P_{b\_hash\_sp}$ included in SR (contained in $M_{3'}$). The trusted authority 106 sends 1813 $P_{enc\_ikpub}$ over the secure network or channel to the issuing bank 107.

At 1814, the issuing bank 107 decrypts the $P_{enc\_ikpub}$ using a private key ($IK_{pri}$) of the issuing bank 107 to obtain P and verifies that P is correct for the selected VPA or bank account. The issuing bank 107 sends 1815 a response based on verifying that P is correct over the secure network or channel to the trusted authority 106. The trusted authority 106 completes 1816 processing the transaction with other participating entities and sends 1817 a response indicating successful completion of the transaction over the secure network to the payment service provider 105, which then routes 1818 it to the PSP application 901 on the customer device 100. The PSP application 901 receives the response from the trusted authority 106 and passes the response to the trusted authority library 903, which in turn passes the response to the biometric authentication module 911. If the response is indicative of an error or failure, the biometric authentication module 911 deletes $P_{a\_enc\_cks}$ from the storage 606 of the customer device 100 such that VPA or bank account needs to be onboarded again. The customer device 100 provides 1819 the user 905 with a payment response. In some embodiments, the data fragments used to reconstruct P are updated periodically, for example, after a specified number of payment transactions, to reduce the window of time an attacker has to steal two or more fragments to reconstruct PIN P. The fragments can be updated any number of times using schemes as described herein, without having to reconstruct and re-split P.

Figure 18B:
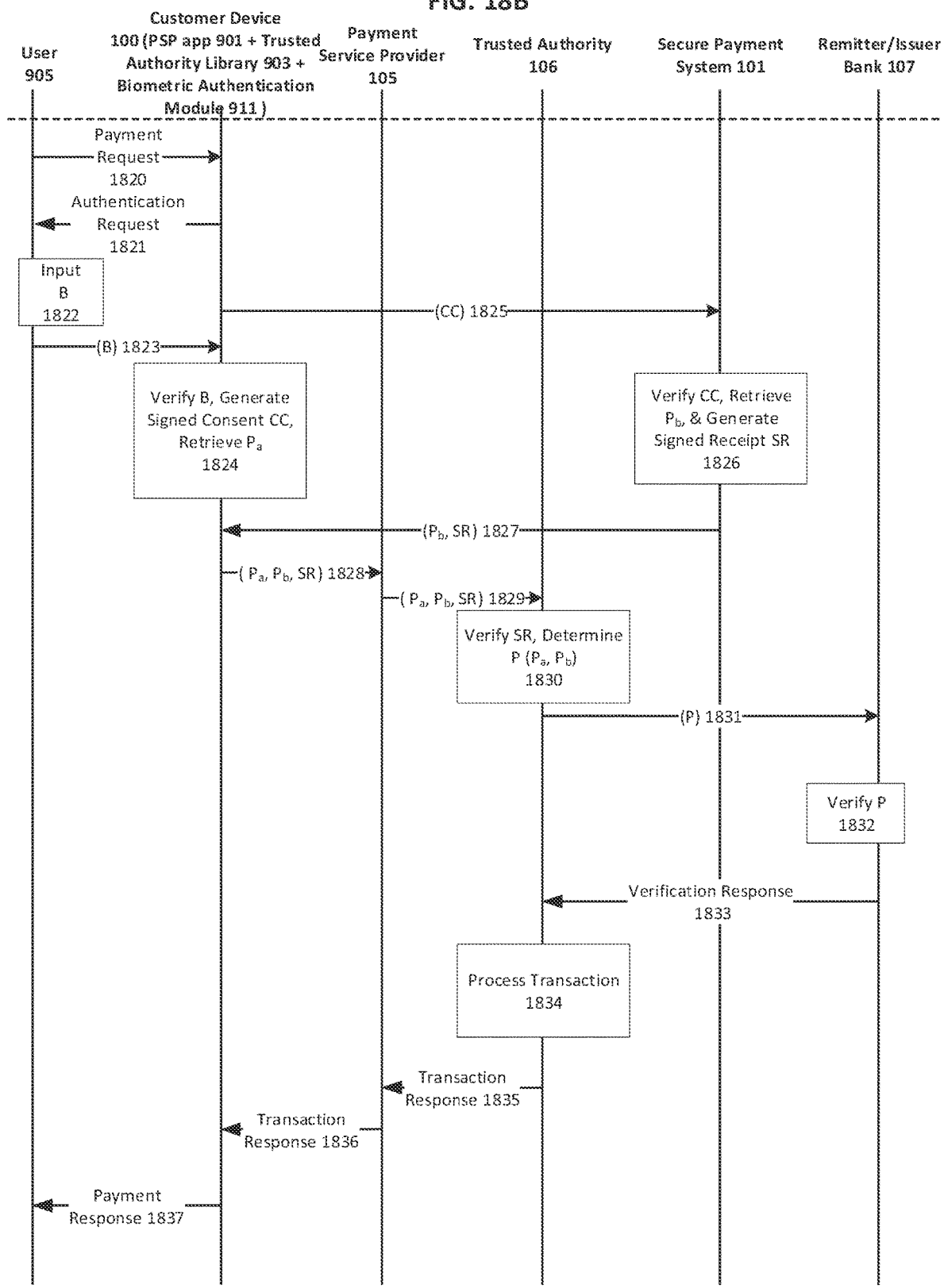

In an alternative implementation, FIG. 18B shows a timing diagram for another embodiment of a biometric authentication mechanism for facilitating a transaction using PIN fragments. Some of the data exchange or communication between components in FIG. 18B take similar form as has been described above with reference to FIG. 18A, so like terminology have been used to indicate similar functionality. In FIG. 18B, the biometric authentication module 911 may exchange data directly with the secure payment system 101. This direct path is shown as indicated by the bidirectional dashed line 1203 in FIG. 13, for example. In such an alternative implementation of FIG. 18B, the biometric authentication module 911 may generate 1824 the Customer Consent (CC) that includes transaction details, digitally sign CC using the customer private key ($CK_{pri}$) to obtain $CC_{sig\_ckpri}$, decrypt $P_{a\_enc\_cks}$ using the customer symmetric encryption key ($CK_s$) to obtain $P_a$, encrypt the message $M_{3a}$=[CC, $CC_{sig\_ckpri}$] using the public key ($SK_{pub}$) of the secure payment system 101 to obtain $M_{3a\_enc\_skpub}$, and send 1825 $M_{3a\_enc\_skpub}$ over the secure network or channel to the secure payment system 101. At 1826, the secure payment system 101 decrypts $M_{3a\_enc\_skpub}$ using the private key ($SK_{pri}$) of the secure payment system 101 to obtain $M_{3a}$, verifies $CC_{sig\_ckpri}$ (contained in $M_{3a}$) against CC (contained in $M_{3a}$) using the customer public key ($CK_{pub}$), retrieves decrypted $P_b$, creates a hash of $P_b$ to obtain $P_{b\_hash\_sp}$, generates a receipt (SR) that includes $P_{b\_hash\_sp}$, digitally signs SR using the private key ($SK_{pri}$) of the secure payment system 101 to obtain $SR_{sig\_skpri}$, creates a message $M_{3a'}$= [$P_b$,SR,$SR_{sig\_skpri}$], encrypts the message $M_{3a'}$ using the public key ($TK_{pub}$) of the trusted authority 106 to obtain $M_{3a\_enc\_tkpub}$, and sends 1827 $M_{3a\_enc\_tkpub}$ over the secure network or channel to the biometric authentication module 911. The biometric authentication module 911 returns [$P_a$, $M_{3a'\_enc\_tkpub}$] to the trusted authority library 903. The trusted authority library 903 encrypts $P_a$ using the public key ($TK_{pub}$) of the trusted authority 106 to obtain $P_{a\_enc\_tkpub}$ and the trusted authority library 903 returns $[P_{a\_enc\_tkpub}, M_{3a'\_enc\_tkpub}]$ to the PSP application 901. The PSP application 901 sends 1828 $[P_{a\_enc\_tkpub}, M_{3a'\_enc\_tkpub}]$ over the secure network or channel to the payment service provider 105, which in turn routes 1829 the same to the trusted authority 106. After the receipt of $[P_{a\_enc\_tkpub}, M_{3a'\_enc\_tkpub}]$ by the trusted authority 106, the communication including exchange of data between the trusted authority 106 and the issuing bank 107 and the communication including exchange of data between the trusted authority 106 and the user 905 via the payment service provider 105 and the PSP application 901 on the customer device 100 continues as described earlier with reference to FIG. 18A.

In an alternative implementation of FIG. 13, the trusted authority 106 may reconstruct the PIN P from three fragments $\{P_a, P_b, P_c\}$ using the bitwise XOR operation as $P=P_a \oplus P_b \oplus P_c$. In one example, $P_a$ may be received from the customer device 100, $P_b$ may be received from the secure payment system 101, and $P_c$ may be stored on the trusted authority 106. In general, the sensitive information Z (such as PIN P) can be reconstructed by an entity from certain subsets of the M shares $\{S_1, S_2, \ldots, S_M\}$ distributed to the M entities, namely, the customer device 100, the secure payment system 101, the trusted authority 106, and remitter/issuer Bank 107, where $S_i \neg \{Z_1, Z_2, \ldots, Z_N\}$ for all $I \in \{1, \ldots, M\}$, and $\{Z_1, Z_2, \ldots, Z_N\}$ are fragments of Z, such that only certain subsets of the N fragments can be used to reconstruct Z and certain subsets of the M shares can be used to reconstruct Z. These distributed storage schemes increase the difficulty of stealing Z by requiring access to a plurality of secure systems in order to reconstruct Z.

Figure 19A:
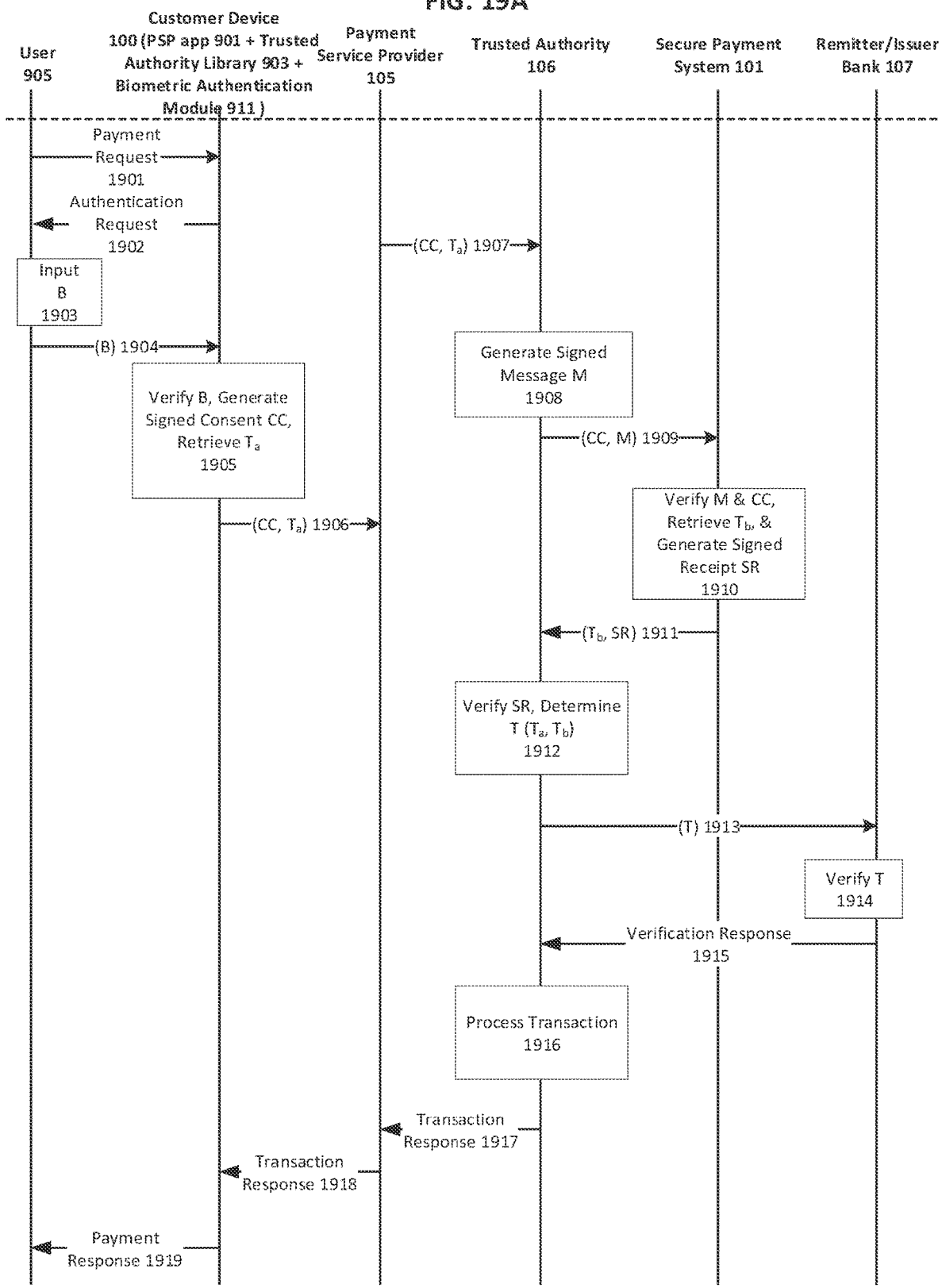

In some embodiments, a transaction may be facilitated using PIN tokenization. The configuration of a biometric authentication mechanism for facilitating a transaction using PIN tokenization is the same as the one shown in FIG. 13. In FIG. 13, the PSP application 901 in the customer device 100 invokes or requests the trusted authority library 903 to prompt the user 905 to authenticate a transaction. The trusted authority library 903 invokes the biometric authentication module 911 to confirm whether the PSP application 901 and VPA or bank account have been onboarded successfully. FIG. 19A shows a timing diagram for an embodiment of a biometric authentication mechanism for facilitating a transaction using PIN tokenization. If the PSP application 901 and VPA or bank account have been successfully onboarded, the PSP application 901 receives 1901 payment request and the biometric authentication module 911 prompts 1902 the user 905 to input or scan their biometric information on the customer device 100 by generating an authentication request. After the biometric information is input 1903, subsequently received 1904, and authenticated, the biometric authentication module 911 has access to retrieve the customer symmetric encryption key ($CK_s$) and the customer private key ($CK_{pri}$) from the secure storage 606 of the customer device 100 for performing encryption and digitally signing data as described herein At 1905, the biometric authentication module 911 generates Customer Consent (CC) that includes transaction details, such as transaction identifier, transaction amount, merchant, bank account, VPA, etc. The biometric authentication module 911 digitally signs CC using the customer private key ($CK_{pri}$) to obtain $CC_{sig\_ckpri}$, retrieves and decrypts $T_{a\_enc\_cks}$ (locally stored on the customer device 100) using the customer symmetric encryption key ($CK_s$) to obtain a token fragment $T_a$, encrypts the data $D_4=[CC, CC_{sig\_ckpri}]$ using the public key ($SK_{pub}$) of the secure payment system 101 to obtain $D_{4\_enc\_skpub}$ and returns $[D_{4\_enc\_skpub}, T_a]$ to the trusted authority library 903 on the customer device 100.

The trusted authority library 903 encrypts $T_a$ using the public key ($TK_{pub}$) of the trusted authority 106 to obtain $T_{a\_enc\_tkpub}$ and returns $[D_{4\_enc\_skpub}, T_{a\_enc\_tkpub}]$ to the PSP application 901. The PSP application 901 on the customer device 100 sends 1906 $[D_{4\_enc\_skpub}, T_{a\_enc\_tkpub}]$ over the secure network or channel to the payment service provider 105, which then routes 1907 it to the trusted authority 106. The trusted authority 106 receives $[D_{4\_enc\_skpub}, T_{a\_enc\_tkpub}]$, creates 1908 a message $M_4=[D_{4\_enc\_skpub}]$, digitally signs $M_4$ using the private key ($TK_{pri}$) of the trusted authority 106 to obtain $M_{4\_sig\_tkpri}$. The trusted authority 106 sends 1909 the set $[M_4, M_{4\_sig\_tkpri}]$ over the secure network or channel to the secure payment system 101.

At 1910, the secure payment system 101 receives $[M_4, M_{4\_sig\_tkpri}]$ from the trusted authority 106, verifies $M_{4\_sig\_tkpri}$ against $M_4$ using the public key ($TK_{pub}$) of the trusted authority 106, decrypts $D_{4\_enc\_skpub}$ (contained in $M_4$) using the private key ($SK_{pri}$) of the secure payment system 101 to obtain $D_4$, verifies $CC_{sig\_ckpri}$ (contained in $D_4$) against CC (contained in $D_4$) using the customer public key ($CK_{pub}$) locally stored on the secure payment system 101, retrieves decrypted $T_b$ from the storage of the secure payment system 101, creates a hash of $T_b$ to obtain $T_{b\_hash\_sp}$, generates a receipt (SR) that includes $T_{b\_hash\_sp}$ and transaction details, digitally signs SR using the private key ($SK_{pri}$) of the secure payment system 101 to obtain $SR_{sig\_skpri}$, creates a message $M_{4'}=[T_b, SR, SR_{sig\_skpri}]$, and encrypts the message $M_{4'}$ using the public key ($TK_{pub}$) of the trusted authority 106 to obtain $M_{4'\_enc\_tkpub}$. The secure payment system 101 sends 1911 a response including $M_{4'\_enc\_tkpub}$ over the secure network or channel to the trusted authority 106.

At 1912, the trusted authority 106 decrypts $M_{4'\_enc\_tkpub}$ using the private key ($TK_{pri}$) of the trusted authority to obtain $M_{4'}$, $[T_b, SR, SR_{sig\_skpri}]$, decrypts $T_{a\_enc\_tkpub}$ using the private key ($TK_{pri}$) to obtain $T_a$, reconstructs T from $T_a$ and $T_b$ (contained in $M_{4'}$) using the bitwise XOR operation as follows $T=T_a \oplus T_b$, and encrypts the reconstructed T using the public key ($IK_{pub}$) of the issuing bank 107 to obtain $T_{enc\_ikpub}$. The trusted authority 106 verifies $SR_{sig\_skpri}$ (contained in $M_{4'}$) against SR (contained in $M_{4'}$) using the public key ($SK_{pub}$) of the secure payment system 101, verifies the transaction details included in SR (contained in $M_4$), creates a hash of $T_b$ (contained in $M_{4'}$) to obtain $T_{b\_hash\_tab}$, and verifies that $T_{b\_hash\_tab}$ matches $T_{b\_hash\_sp}$ included in SR (contained in $M_{4'}$). The trusted authority 106 sends 1913 $T_{enc\_ikpub}$ over the secure network or channel to the issuing bank 107.

At 1914, the issuing bank 107 decrypts the $T_{enc\_ikpub}$ using a private key ($IK_{pri}$) of the issuing bank 107 to obtain T, hashes T to obtain $T_{hash}$, and verifies that $T_{hash}$ matches $T_{hash\_ib}$ stored for the selected VPA or bank account. The issuing bank 107 sends 1915 a response based on verifying that T is correct over the secure network or channel to the trusted authority 106. The trusted authority 106 completes 1916 processing the transaction with other participating entities and sends 1917 a response indicating successful completion of the transaction over the secure network to the payment service provider 105, which then routes 1918 it to the PSP application 901 on the customer device 100. The PSP application 901 receives the response from the trusted authority 106 and passes the response to the trusted authority library 903, which in turn passes the response to the biometric authentication module 911. If the response is indicative of an error or failure, the biometric authentication module 911 deletes $T_{a\_enc\_cks}$ from the storage 606 of the customer device 100 such that VPA or bank account needs to be onboarded again. The customer device 100 provides 9819 the user 905 with a payment response. In some embodiments, the issuing bank 107 revokes the authentication token T and reissues a new one periodically, for example, after a specified number of payment transactions, to reduce the window of time an attacker has to use a stolen authentication token T.

In an alternative implementation, FIG. 19B shows a timing diagram for another embodiment of a biometric authentication mechanism for facilitating a transaction using PIN tokenization. Some of the data exchange or communication between components in FIG. 19B take similar form as has been described above with reference to FIG. 19A, so like terminology have been used to indicate similar functionality. In FIG. 19B, the biometric authentication module 911 may exchange data directly with the secure payment system 101. This direct path is shown as indicated by the bidirectional dashed line 1203 in FIG. 13, for example. In such an alternative implementation of FIG. 19B, the biometric authentication module 911 may generate 1924 the Customer Consent (CC) that includes transaction details, digitally sign CC using the customer private key ($CK_{pri}$) to obtain $CC_{sig\_ckpri}$, decrypt $T_{a\_enc\_cks}$ using the customer symmetric encryption key ($CK_s$) to obtain $T_a$, encrypt the message $M_{4a}=[CC, CC_{sig\_ckpri}]$ using the public key ($SK_{pub}$) of the secure payment system 101 to obtain $M_{4a\_enc\_skpub}$, and send 1925 $M_{4a\_enc\_skpub}$ over the secure network or channel to the secure payment system 101. At 1926, the secure payment system 101 decrypts $M_{4a\_enc\_skpub}$ using the private key ($SK_{pri}$) of the secure payment system 101 to obtain $M_{4a}$, verifies $CC_{sig\_ckpri}$ (contained in $M_{4a}$) against CC (contained in $M_{4a}$) using the customer public key ($CK_{pub}$), retrieves decrypted $T_b$, creates a hash of $T_b$ to obtain $T_{b\_hash\_sp}$, generates a receipt (SR) that includes $T_{b\_hash\_sp}$, digitally signs SR using the private key ($SK_{pri}$) of the secure payment system 101 to obtain $SR_{sig\_skpri}$, creates a message $M_{4a'} = [T_b, SR, SR_{sig\_skpri}]$, encrypts the message $M_{4a'}$ using the public key ($TK_{pub}$) of the trusted authority 106 to obtain $M_{4a'\_enc\_tkpub}$, and sends 1927 $M_{4a'\_enc\_tkpub}$ over the secure network or channel to the biometric authentication module 911. The biometric authentication module 911 returns [$T_a$, $M_{4a'\_enc\_tkpub}$] to the trusted authority library 903. The trusted authority library 903 encrypts $T_a$ using the public key ($TK_{pub}$) of the trusted authority 106 to obtain $T_{a\_enc\_tkpub}$ and the trusted authority library 903 returns [$T_{a\_enc\_tkpub}$, $M_{4a'\_enc\_tkpub}$] to the PSP application 901. The PSP application 901 sends 1928 [$T_{a\_enc\_tkpub}$, $M_{4a'\_enc\_tkpub}$] over the secure network or channel to the payment service provider 105, which in turn routes 1929 the same to the trusted authority 106. After the receipt of [$T_{a\_enc\_tkpub}$, $M_{4a'\_enc\_tkpub}$] by the trusted authority 106, the communication including exchange of data between the trusted authority 106 and the issuing bank 107 and the communication including exchange of data between the trusted authority 106 and the user 905 via the payment service provider 105 and the PSP application 901 continues as described earlier with reference to FIG. 19A.

In some embodiments, additional information may be used by participating entities, to assess the risk-level of the transaction. Such additional information may include, but is not limited to, the following: whether a customer device 100 has biometric hardware available for use, whether a user 905 has enrolled their biometric data and granted permission for its use, whether a user 905 has recently modified their enrolled biometric data, and whether a user 905, who had enrolled for biometric authentication, chose to authenticate using a PIN. In FIGS. 14-19, any ordering of steps is shown for illustrative simplicity only, and, as such, is not intended to limit the scope of the present disclosure to any specific order of steps. Unless otherwise noted, steps shown to take place in a certain order can also take place in a reversed order or simultaneously, in alternate embodiments. Note that in FIGS. 14-19, boxes denote functional blocks while arrows denote the transmission of data (although transmission of data can be incorporated into the functional blocks as well). Receiving data from a user can comprise allowing a user to type in the data as an input to the customer device 100. Sending data to a user can comprise displaying information on the screen of the customer device 100.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for authenticating transactions using biometric authentication, the method comprising:
receiving, by a user device, a preconfigured biometric data for a transaction from a user;
responsive to a successful authentication of the preconfigured biometric data, accessing, by the user device, a private key of the user from a secure storage of the user device and generating a message for the transaction, wherein the message comprises a first transaction data indicative of a user consent and a second transaction data indicative of a digital signature generated for the user consent for the transaction and signed using the private key of the user;
sending, by the user device, a prestored first Personal Identification Number (PIN) fragment associated with a PIN of the user to a trusted authority server and the message for the transaction to one of the trusted authority server and a secure payment server;
receiving, by the secure payment server, the message for the transaction from one of the user device and the trusted authority server;
verifying, by the secure payment server, the digital signature for the user consent retrieved from the message by using a prestored public key of the user;
responsive to verifying the digital signature for the user consent, retrieving, by the secure payment server, a prestored second PIN fragment associated with the PIN of the user; and
transmitting, by the secure payment server, the second PIN fragment to one of the user device and the trusted authority server, wherein the trusted authority server determines the PIN by using the second PIN fragment and the first PIN fragment received from the user device, transmits the determined PIN to an issuance entity for verification, and processes the transaction upon receiving a response from the issuance entity that the verification of the determined PIN is correct.

2. The method of claim 1, wherein upon receiving the message from the user device and transmitting the prestored second PIN fragment to the user device, the user device transmits the first PIN fragment and the second PIN fragment to the trusted authority server for determining the PIN.

3. The method of claim 1, further comprising, receiving, by the user device, a response indicating a successful completion of the transaction.

4. The method of claim 1, further comprising, determining the PIN by using a third PIN fragment along with the first PIN fragment and the second PIN fragment, wherein the third PIN fragment is retrieved from the trusted authority server.

5. The method of claim 1, wherein the preconfigured biometric data of the user is received on obtaining a confirmation about onboarding of a Payment Service Provider (PSP) application and one of a Virtual Payment Address (VPA) or a bank account.

6. The method of claim 5, further comprising enabling onboarding of one or more of the VPA and the bank account for the PSP application.

7. The method of claim 5, wherein the onboarding of the PSP application further comprises:
generating, a symmetric encryption key and a public-private key pair for the user of the user device, wherein a public key of the public-private key pair is transmitted to one of the trusted authority server and the secure payment server; and
storing, by the secure payment server, the public key of the public-private key pair.

8. The method of claim 7, wherein the symmetric encryption key and the public-private key pair are stored on the user device in order to be used during subsequent biometric authentication.

9. The method of claim 5, wherein the onboarding of the Virtual Payment Address (VPA) or the bank account comprises:
receiving, by the user device, a request for authenticating a transaction, wherein in receipt of the request, the user provides the PIN, consent for enabling biometric authentication, and a preconfigured biometric data for a specific VPA or bank account;
splitting, by the user device, the PIN into a plurality of PIN fragments;
verifying, by the user device, the preconfigured biometric data of the user, wherein upon verification, a first PIN fragment of the plurality of PIN fragments is encrypted using a stored symmetric encryption key and stored in the user device;
generating, by the user device, a digital signature for the consent using a private key of the user, wherein data comprising the consent along with the generated digital signature, and a second PIN fragment of the plurality of PIN fragments is transmitted to one of the trusted authority server and the secure payment server; and
verifying by the secure payment server, the digital signature for the consent using a prestored public key of the user, wherein the second PIN fragment is stored against the specific VPA or the bank account in the secure payment server.

10. The method of claim 9, wherein when the data is transmitted to the trusted authority server, the data further comprises the PIN received from the user.

11. The method of claim 10, wherein upon receiving the PIN from the user device, transmitting the PIN from the trusted authority server to an issuance entity for verifying the PIN and processing the transaction.

12. A method of authenticating transactions using biometric authentication based on Personal Identification Number (PIN) tokens, the method comprising:
receiving, by a user device, a preconfigured biometric data for a transaction from a user;
responsive to a successful authentication of the preconfigured biometric data, accessing, by the user device, a private key of the user from a secure storage of the user device and generating a message for the transaction, wherein the message comprises a first transaction data indicative of a user consent and a second transaction data indicative of a digital signature generated for the user consent for the transaction and signed using the private key of the user;

sending, by the user device, a prestored first token fragment associated with an authorized PIN to a trusted authority server and the message for the transaction to one of the trusted authority server and a secure payment server;

receiving, by the secure payment server, the message for the transaction from one of the user device and the trusted authority server;

verifying, by the secure payment server, the digital signature for the user consent retrieved from the message by using a prestored public key of the user;

responsive to verifying the digital signature for the user consent, retrieving, by the secure payment server, a prestored second token fragment associated with the authorized PIN; and transmitting, by the secure payment server, the second token fragment to one of the user device and the trusted authority server, wherein the trusted authority server determines an authorized token for the user by using the second token fragment and the first token fragment retrieved from the user device, transmits the determined authorized token to an issuance entity for verification, and processes the transaction upon receiving a response from the issuance entity that the verification of the determined authorized token is correct.

13. The method of claim 12, wherein upon receiving the message from the user device and transmitting the prestored second token fragment to the user device, the user device transmits the first token fragment and the second token fragment to the trusted authority server for determining the authorized token.

14. The method of claim 12, further comprising receiving, by the user device, a response indicating a successful completion of the transaction.

15. The method of claim 12 further comprising determining the authorized token by using a third token fragment along with the first token fragment and the second token fragment, wherein the third token fragment is retrieved from the trusted authority server.

16. The method of claim 12, wherein the preconfigured biometric data of the user is received on obtaining a confirmation about onboarding of a Payment Service Provider (PSP) application and one of a Virtual Payment Address (VPA) or a bank account.

17. The method of claim 16, further comprising enabling onboarding of one or more of the VPA and the bank account for the PSP application.

18. The method of claim 16, wherein the onboarding of the PSP application comprises:
generating, a symmetric encryption key and a public-private key pair for the user of the user device, wherein a public key of the public-private key pair is transmitted to one of the trusted authority server and the secure payment server; and
storing, by the secure payment server, the public key of the public-private key pair.

19. The method of claim 18, wherein the symmetric encryption key and the public-private key pair are stored on the user device in order to be used during subsequent biometric authentication.

20. The method of claim 16, wherein the onboarding of the Virtual Payment Address (VPA) or the bank account comprises one of a first VPA onboarding technique and a second VPA onboarding technique.

21. The method of claim 20, wherein onboarding of the Virtual Payment Address (VPA) or a bank account using the first VPA onboarding technique comprises:
receiving, by the user device, a request for authenticating a transaction, wherein in receipt of the request, the user provides a PIN, consent for enabling biometric authentication, and a preconfigured biometric data for a specific VPA or bank account;
verifying, by the user device, the preconfigured biometric data of the user and generating a digital signature for the consent using a private key of the user, wherein the PIN, the consent along with the generated digital signature is transmitted to the trusted authority server;
transmitting, by the trusted authority server, the PIN to an issuance entity, wherein the issuance entity verifies the PIN and generates an authentication token for the verified PIN and transmits the authentication token to the trusted authority server;
splitting, by the trusted authority server, the authentication token into a plurality of token fragments, wherein a second token fragment and the consent along with associated digital signature is transmitted to the secure payment server;
verifying, by the secure payment server, the digital signature for the consent using a prestored public key of the user, wherein the second token fragment is stored against the specific VPA or the bank account in the secure payment server; and
transmitting, by the trusted authority server, a first token fragment to the user device, wherein the first token fragment is encrypted using a stored symmetric encryption key of the user and stored in the user device.

22. The method of claim 20, wherein onboarding of the Virtual Payment Address (VPA) or a bank account using the second VPA onboarding technique comprises:
receiving, by the user device, a request for authenticating a transaction, wherein in receipt of the request, the user provides a PIN, consent for enabling biometric authentication, and a preconfigured biometric data for a specific VPA or bank account;
transmitting, by the user device, the PIN to the trusted authority server;
transmitting, by the trusted authority server, the PIN to an issuance entity, wherein the issuance entity verifies the PIN and generates an authentication token for the verified PIN and transmits the authentication token to the trusted authority server;
splitting, by the trusted authority server, the authentication token into a plurality of token fragments, wherein a first token fragment and a second token fragment is transmitted to the user device;
verifying, by the user device, the preconfigured biometric data of the user, wherein a consent along with a digital signature for the consent is generated using a private key of the user;
transmitting, by the user device, the consent along with associated digital signature and the second token fragment to the secure payment server;
verifying by the secure payment server, the digital signature for the consent using a prestored public key of the user, wherein the second token fragment is stored against the specific VPA or the bank account in the secure payment server; and
upon successful verification, storing, by the user device, the first token fragment encrypted using a stored symmetric encryption key of the user in the user device.

23. A system for authenticating transactions based on Personal Identification Number (PIN) fragments, comprising:
- a user device;
- a secure payment server; and
- a trusted authority server;
- each one of the user device, the secure payment server, and the trusted authority server comprising:
  - a processor; and
  - a memory communicatively coupled to the processor, wherein the memory stores processor instructions, which, on execution, causes the processor to:
    - receive, by the user device, a preconfigured biometric data for a transaction from a user;
    - responsive to a successful authentication of the preconfigured biometric data, access, by the user device, a private key of the user from a secure storage of the user device and generate a message for the transaction, wherein the message comprises a first transaction data indicative of a user consent and a second transaction data indicative of a digital signature generated for the user consent for the transaction and signed using the private key of the user;
    - send, by the user device, a prestored first PIN fragment associated with a PIN of the user to the trusted authority server and the message for the transaction to one of the trusted authority server and the secure payment server;
    - receive, by the secure payment server, the message for the transaction from one of the user device and the trusted authority server;
    - verify, by the secure payment server, the digital signature for the user consent retrieved from the message by using a prestored public key of the user;
    - responsive to verifying the digital signature for the user consent, retrieve, by the secure payment server, a prestored second PIN fragment associated with the PIN of the user; and
    - transmit, by the secure payment server, the second PIN fragment to one of the user device and the trusted authority server, wherein the trusted authority server determines the PIN by using the second PIN fragment and the first PIN fragment retrieved from the user device, transmits the determined PIN to an issuance entity for verification, and processes the transaction upon receiving a response from the issuance entity that the verification of the determined PIN is correct.

24. A system for authenticating transactions based on Personal Identification Number (PIN) tokens, comprising:
- a user device;
- a secure payment server; and
- a trusted authority server;
- each one of the user device, the secure payment server, and the trusted authority server comprising:
  - a processor; and
  - a memory communicatively coupled to the processor, wherein the memory stores processor instructions, which, on execution, causes the processor to:
    - receive, by the user device, a preconfigured biometric data for a transaction from a user;
    - responsive to a successful authentication of the preconfigured biometric data, access, by the user device, a private key of the user from a secure storage of the user device and generate a message for the transaction, wherein the message comprises a first transaction data indicative of a user consent and a second transaction data indicative of a digital signature generated for the user consent for the transaction and signed using the private key of the user;
    - send, by the user device, a prestored first token fragment associated with an authorized PIN to the trusted authority server and the message for the transaction to one of the trusted authority server and the secure payment server;
    - receive, by the secure payment server, the message for the transaction from one of the user device and the trusted authority server;
    - verify, by the secure payment server, the digital signature for the user consent retrieved from the message by using a prestored public key of the user;
    - responsive to verifying the digital signature for the user consent, retrieve, by the secure payment server, a prestored second token fragment associated with the authorized PIN; and
    - transmit, by the secure payment server, the second token fragment to one of the user device and the trusted authority server, wherein the trusted authority server determines an authorized token for the user by using the second token fragment and the first token fragment retrieved from the user device, transmits the determined authorized token to an issuance entity for verification, and processes the transaction upon receiving a response from the issuance entity that the verification of the determined authorized token is correct.

* * * * *